United States Patent
Marques

(10) Patent No.: US 12,375,351 B2
(45) Date of Patent: *Jul. 29, 2025

(54) UNIFIED PROGRAMMABLE DYNAMIC CONTEXT-AWARE CONFIGURATION

(71) Applicant: Adriano Monteiro Marques, Cedar Park, TX (US)

(72) Inventor: Adriano Monteiro Marques, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,335

(22) Filed: Nov. 26, 2024

(65) Prior Publication Data

US 2025/0184221 A1 Jun. 5, 2025

Related U.S. Application Data

(63) Continuation-in-part of application No. 18/600,535, filed on Mar. 8, 2024, now Pat. No. 12,192,168.

(Continued)

(51) Int. Cl.
*H04L 41/0816* (2022.01)
*H04L 41/084* (2022.01)

(52) U.S. Cl.
CPC ........ *H04L 41/0816* (2013.01); *H04L 41/084* (2013.01)

(58) Field of Classification Search
CPC .......................... H04L 41/0816; H04L 41/084
See application file for complete search history.

(56) References Cited

U.S. PATENT DOCUMENTS

| 521,453 | A |   | 6/1894 | Adams |   |
|---|---|---|---|---|---|
| 6,012,088 | A | * | 1/2000 | Li | ...................... H04L 12/2898 709/219 |

(Continued)

FOREIGN PATENT DOCUMENTS

| EP | 1125421 B1 | 6/2006 |
|---|---|---|
| EP | 3646573 B1 | 5/2020 |
| JP | 4668775 B2 | 4/2011 |

OTHER PUBLICATIONS

Web: "How do you implement DNS geolocation for dynamic and static content?", Domain Name System (DNS), Dec. 12, 2023, 06 pages, [Downloaded on Jan. 4, 2020] Retrieved from [URL: https://www.linkedin.com/advice/0/how-do-you-implement-dns-geolocation-dynamic].

(Continued)

*Primary Examiner* — Jimmy H Tran
(74) *Attorney, Agent, or Firm* — Lowenstein Sandler LLP

(57) ABSTRACT

A method includes receiving, by a processing device, a dynamic configuration file. The processing device loads the dynamic configuration file in memory. The method further includes receiving, by the processing device from a first input component, a first request for a configuration resource. The first request includes first environment data associated with the first input component. The method further includes identifying, by the processing device based on the configuration resource of the first request, a dynamic variable in the dynamic configuration file. The dynamic variable includes one or more algorithmically-defined rules. The method further includes executing, by the processing device, at least one of the one or more algorithmically-defined rules of the dynamic variable to determine, based on the first environment data, a first configuration response to the first request. The method further includes providing, by the processing device, the first configuration response to the first input component.

20 Claims, 26 Drawing Sheets

Related U.S. Application Data

(60) Provisional application No. 63/604,350, filed on Nov. 30, 2023.

(56) References Cited

U.S. PATENT DOCUMENTS

| | | | | |
|---|---|---|---|---|
| 6,014,660 | A * | 1/2000 | Lim | H04L 61/4511 709/200 |
| 6,023,724 | A * | 2/2000 | Bhatia | H04L 41/0677 709/224 |
| 6,028,848 | A * | 2/2000 | Bhatia | H04M 11/06 370/257 |
| 6,029,203 | A * | 2/2000 | Bhatia | H04L 45/00 709/248 |
| 6,052,803 | A * | 4/2000 | Bhatia | H04L 9/40 714/49 |
| 6,070,191 | A * | 5/2000 | Narendran | G06F 9/5083 714/E11.015 |
| 6,094,659 | A * | 7/2000 | Bhatia | H04L 12/5692 707/999.01 |
| 6,108,330 | A * | 8/2000 | Bhatia | H04Q 11/0457 370/352 |
| 6,118,768 | A * | 9/2000 | Bhatia | H04Q 11/0471 370/254 |
| 6,173,322 | B1 | 1/2001 | Hu | |
| 6,272,523 | B1 * | 8/2001 | Factor | G06F 9/505 709/201 |
| 6,360,256 | B1 * | 3/2002 | Lim | G06F 11/3495 709/227 |
| 6,396,830 | B2 * | 5/2002 | Aravamudan | H04L 61/4511 370/352 |
| 6,411,966 | B1 * | 6/2002 | Kwan | H04L 61/58 |
| 6,560,634 | B1 * | 5/2003 | Broadhurst | H04L 61/00 709/219 |
| 6,643,694 | B1 * | 11/2003 | Chernin | H04L 41/0253 709/217 |
| 6,684,243 | B1 * | 1/2004 | Euget | H04L 61/5014 709/217 |
| 6,701,329 | B1 * | 3/2004 | Esibov | H04L 61/5076 |
| 6,741,853 | B1 * | 5/2004 | Jiang | H04M 3/4938 455/445 |
| 6,769,031 | B1 * | 7/2004 | Bero | H04L 61/5076 709/217 |
| 6,802,068 | B1 * | 10/2004 | Guruprasad | H04L 9/40 709/227 |
| 6,836,806 | B1 * | 12/2004 | Raciborski | H04L 65/1101 707/E17.108 |
| 6,865,594 | B1 * | 3/2005 | Belissent | H04L 61/5076 709/206 |
| 6,888,836 | B1 * | 5/2005 | Cherkasova | H04L 67/1038 370/400 |
| 6,895,431 | B1 * | 5/2005 | Bero | H04L 41/12 709/221 |
| 6,961,783 | B1 * | 11/2005 | Cook | H04L 63/0236 709/227 |
| 7,003,562 | B2 * | 2/2006 | Mayer | H04L 63/102 703/21 |
| 7,007,080 | B2 * | 2/2006 | Wilson | H04L 61/5084 709/221 |
| 7,010,585 | B2 | 3/2006 | Asami | |
| 7,013,343 | B2 * | 3/2006 | Shigezumi | H04L 63/0236 709/225 |
| 7,027,582 | B2 * | 4/2006 | Khello | H04M 7/0075 455/433 |
| 7,117,227 | B2 * | 10/2006 | Call | A61L 2/10 709/219 |
| 7,304,984 | B2 * | 12/2007 | Butler | H04L 65/1043 370/395.2 |
| 7,330,908 | B2 | 2/2008 | Jungck | |
| 7,352,853 | B1 * | 4/2008 | Shen | H04Q 3/0062 379/201.12 |
| 7,359,987 | B2 * | 4/2008 | Stahura | H04L 61/4511 709/228 |
| 7,441,045 | B2 * | 10/2008 | Skene | G06F 9/505 709/201 |
| 7,478,148 | B2 * | 1/2009 | Neerdaels | H04L 61/59 726/11 |
| 7,636,936 | B2 * | 12/2009 | Wright | G06F 21/604 713/153 |
| 7,720,997 | B1 * | 5/2010 | Gourlay | H04L 12/5692 709/245 |
| 7,734,730 | B2 * | 6/2010 | McCanne | H04L 61/45 709/219 |
| 7,818,435 | B1 * | 10/2010 | Jellinek | H04L 67/2895 709/219 |
| 8,296,451 | B2 * | 10/2012 | Lowery | H04L 67/568 709/224 |
| 8,489,637 | B2 | 7/2013 | Patil | |
| 8,522,034 | B2 * | 8/2013 | Erlingsson | H04N 1/32144 713/160 |
| 8,645,517 | B2 * | 2/2014 | Stolorz | H04L 41/22 709/219 |
| 8,725,836 | B2 * | 5/2014 | Lowery | H04L 67/1095 709/217 |
| 8,856,222 | B2 * | 10/2014 | McCanne | H04L 67/108 709/236 |
| 9,021,070 | B2 * | 4/2015 | Selgas | G06F 3/0482 717/172 |
| 9,396,476 | B2 * | 7/2016 | Walker | G06F 16/9535 |
| 9,467,461 | B2 * | 10/2016 | Balderas | H04L 63/1416 |
| 9,479,422 | B2 | 10/2016 | Sundaresan et al. | |
| 9,906,605 | B2 | 2/2018 | Nguyen et al. | |
| 10,027,537 | B1 * | 7/2018 | Nice | H04L 41/0813 |
| 10,212,123 | B2 | 2/2019 | Baughman et al. | |
| 10,284,520 | B2 | 5/2019 | Reddy | |
| 10,440,059 | B1 * | 10/2019 | McCarty | H04L 63/1433 |
| 10,516,751 | B1 * | 12/2019 | Morton | H04L 69/08 |
| 10,521,453 | B1 * | 12/2019 | Bush | H04L 61/4552 |
| 10,666,608 | B2 | 5/2020 | Townsend et al. | |
| 10,728,206 | B2 | 7/2020 | Dhanabalan | |
| 10,728,287 | B2 | 7/2020 | Foxhoven et al. | |
| 10,826,748 | B2 * | 11/2020 | Alao | H04N 21/64707 |
| 10,893,017 | B2 | 1/2021 | George, IV | |
| 10,931,786 | B1 * | 2/2021 | Vasquez | H04L 67/5681 |
| 10,985,998 | B1 * | 4/2021 | Gujar | H04L 61/4541 |
| 1,112,859 | A1 | 9/2021 | Johnson | |
| 11,128,597 | B1 * | 9/2021 | Johnson | H04L 9/0643 |
| 11,269,781 | B1 | 3/2022 | Lercari et al. | |
| 11,336,519 | B1 * | 5/2022 | Greenwood | H04L 41/0816 |
| 11,570,278 | B1 * | 1/2023 | Uthaman | H04L 41/0894 |
| 11,641,410 | B1 * | 5/2023 | Uthaman | H04L 43/50 709/218 |
| 11,757,703 | B1 * | 9/2023 | Hotinger | H04L 41/0896 709/224 |
| 2006/0190602 | A1 * | 8/2006 | Canali | H04L 67/1021 709/226 |
| 2009/0113075 | A1 * | 4/2009 | Migault | H04L 61/5061 709/245 |
| 2012/0191874 | A1 * | 7/2012 | Robinson | H04L 61/4552 709/245 |
| 2013/0238785 | A1 | 9/2013 | Hawk | |
| 2013/0297596 | A1 * | 11/2013 | Mouline | G06F 16/9537 707/723 |
| 2014/0280916 | A1 * | 9/2014 | Balasubramanian | H04L 61/457 709/224 |
| 2014/0304412 | A1 * | 10/2014 | Prakash | H04L 69/40 709/226 |
| 2015/0215276 | A1 * | 7/2015 | Bhagwat | H04L 61/5014 709/220 |
| 2015/0244671 | A1 * | 8/2015 | Sinn | H04L 61/4511 709/245 |
| 2015/0256424 | A1 * | 9/2015 | Kaliski, Jr. | H04L 61/10 709/224 |
| 2015/0295882 | A1 * | 10/2015 | Kaliski, Jr. | H04L 61/4511 709/217 |
| 2015/0350154 | A1 * | 12/2015 | Myla | H04L 61/4511 709/245 |
| 2015/0350229 | A1 * | 12/2015 | Mitchell | H04L 63/1416 726/23 |

(56) References Cited

U.S. PATENT DOCUMENTS

| | | | | |
|---|---|---|---|---|
| 2015/0370866 | A1* | 12/2015 | Schneider | H04L 61/3015 |
| | | | | 707/706 |
| 2016/0028847 | A1* | 1/2016 | Bradshaw | H04L 61/58 |
| | | | | 709/213 |
| 2016/0087937 | A1* | 3/2016 | Rodriguez | G06F 21/335 |
| | | | | 709/223 |
| 2016/0294773 | A1* | 10/2016 | Yu | H04L 63/1425 |
| 2016/0308819 | A1* | 10/2016 | Gupta | H04L 61/4511 |
| 2016/0352680 | A1* | 12/2016 | Elsharif | H04L 61/4511 |
| 2017/0041292 | A1* | 2/2017 | Stern | H04L 63/20 |
| 2017/0054761 | A1* | 2/2017 | Schryver | G06F 16/2379 |
| 2017/0078453 | A1* | 3/2017 | Stevens | H04L 67/01 |
| 2017/0331788 | A1* | 11/2017 | Lemon | G06F 16/90335 |
| 2018/0091479 | A1* | 3/2018 | Yu | H04L 63/20 |
| 2018/0324137 | A1* | 11/2018 | Tuliani | H04L 61/4511 |
| 2018/0337885 | A1* | 11/2018 | Singh | H04L 41/0226 |
| 2019/0068466 | A1* | 2/2019 | Chagam Reddy | H04L 47/83 |
| 2019/0097933 | A1* | 3/2019 | Rutkowski | H04L 41/40 |
| 2019/0132281 | A1* | 5/2019 | Sawyer | H04L 47/122 |
| 2019/0166215 | A1* | 5/2019 | Johnson | H04L 67/02 |
| 2020/0036778 | A1* | 1/2020 | Flavel | H04L 69/321 |
| 2020/0213277 | A1* | 7/2020 | Rudnik | H04L 12/4641 |
| 2020/0220839 | A1* | 7/2020 | Sawyer | H04L 45/74 |
| 2020/0314067 | A1* | 10/2020 | Rudnik | H04L 63/0272 |
| 2020/0366637 | A1* | 11/2020 | Dhanabalan | H04L 67/101 |
| 2021/0037047 | A1* | 2/2021 | O'Hara | H04L 63/1458 |
| 2021/0067493 | A1* | 3/2021 | Vixie | H04L 61/4511 |
| 2021/0092134 | A1* | 3/2021 | Ludwig | H04L 63/1416 |
| 2021/0105248 | A1* | 4/2021 | Brown | H04L 67/02 |
| 2021/0234763 | A1* | 7/2021 | Fang | H04W 12/088 |
| 2021/0377314 | A1* | 12/2021 | Miller | H04L 63/20 |
| 2022/0029998 | A1 | 1/2022 | Cleary et al. | |
| 2022/0123994 | A1* | 4/2022 | Chen | H04L 45/04 |
| 2022/0182354 | A1* | 6/2022 | Fayed | H04L 61/5007 |
| 2023/0136308 | A1* | 5/2023 | Huffman | G06F 21/554 |
| | | | | 709/221 |
| 2023/0231856 | A1* | 7/2023 | Kaliski, Jr. | H04L 63/123 |
| | | | | 726/4 |
| 2023/0254281 | A1* | 8/2023 | Alam | H04L 63/0236 |
| | | | | 726/4 |
| 2023/0291738 | A1* | 9/2023 | Pelzel | H04L 67/1012 |
| 2023/0328033 | A1* | 10/2023 | Silverline | H04L 63/20 |
| | | | | 726/11 |
| 2024/0022541 | A1* | 1/2024 | Lee | H04L 61/4541 |
| 2024/0073196 | A1* | 2/2024 | Gurinaviciuté | H04L 63/20 |
| 2024/0121265 | A1* | 4/2024 | Holloway | H04L 63/1466 |
| 2024/0163256 | A1* | 5/2024 | Olumofin | H04L 63/0263 |
| 2024/0223016 | A1 | 7/2024 | Staring et al. | |
| 2024/0265057 | A1* | 8/2024 | Kol | G06F 9/4555 |
| 2024/0308443 | A1* | 9/2024 | Kim | H04W 4/48 |
| 2024/0323223 | A1* | 9/2024 | Tymchenko | H04L 63/0236 |
| 2024/0422185 | A1* | 12/2024 | Burton | H04L 63/0236 |

OTHER PUBLICATIONS

Web: "Could a name server resolve IP addresses dynamically based on some strategy?", Server Fault, Sep. 20, 2021, 06 pages, [Downloaded on Apr. 4, 2024] Retrieved from [URL: https://serverfault.com/questions/941506/could-a-name-server-resolve-ip-addresses-dynamically-based-on-some-strategy].

Web: "Use DNS Policy for Geo-Location Based Traffic Management with Primary Servers", Learn, Dec. 12, 2023, 07 pages, [Downloaded on Apr. 4, 2024] Retrieved from [URL: https://learn.microsoft.com/en-us/windows-server/networking/dns/deploy/primary-geo-location].

Web: "apple/pkl", GitHub, 04 pages, [Downloaded on Apr. 4, 2024] Retrieved from [URL: https://github.com/apple/pkl].

Web: "Dynamic DNS", Wikipedia, Apr. 4, 2024, 05 pages, [Downloaded on Apr. 4, 2024] Retrieved from [URL: https://en.wikipedia.org/wiki/Dynamic_DNS].

Youtube: "Introducing Reverse Proxy Servers," Oct. 5, 2012, 5 pages, [Downloaded on Apr. 4, 2024] Retrieved from [URL: https://www.youtube.com/watch?v=9rOU_P5YN_Q].

Youtube: "Anycast vs Global Server Load Balancing on the Brightboard," Dec. 1, 2022, 13 pages, [Downloaded on Apr. 4, 2024] Retrieved from [URL: https://www.youtube.com/watch?v=-2WnHiKPrgE].

Web: "Cloud-Based Primary and Secondary Authoritative DNS", F5, 06 pages, [Downloaded on Apr. 4, 2024] Retrieved from [URL: https://www.f5.com/cloud/products/dns].

Web: "CoreDNS: DNS and Service Discovery", CoreDNS, 04 pages, [Downloaded on Apr. 4, 2024] Retrieved from [URL: https://coredns.io].

Web: "CoreDNS Manual", CoreDNS, 23 pages, [Downloaded on Apr. 4, 2024] Retrieved from [URL: https://coredns.io/manual/toc/#authoritative-serving-from-files].

Web: "Dynamic DNS", Cloud Flare, 4 pages, [Downloaded on Apr. 4, 2024] Retrieved from [URL: https://www.cloudflare.com/learning/dns/glossary/dynamic-dns/].

Web: "Pkl Introduction", 01 page, [Downloaded on Dec. 16, 2024] Retrieved from [https://pkl-lang.org/main/current/introduction/].

International Search Report and Written Opinion for International Application No. PCT/US2024/057804, report mail date Jan. 31, 2025; pp. 1-20.

* cited by examiner

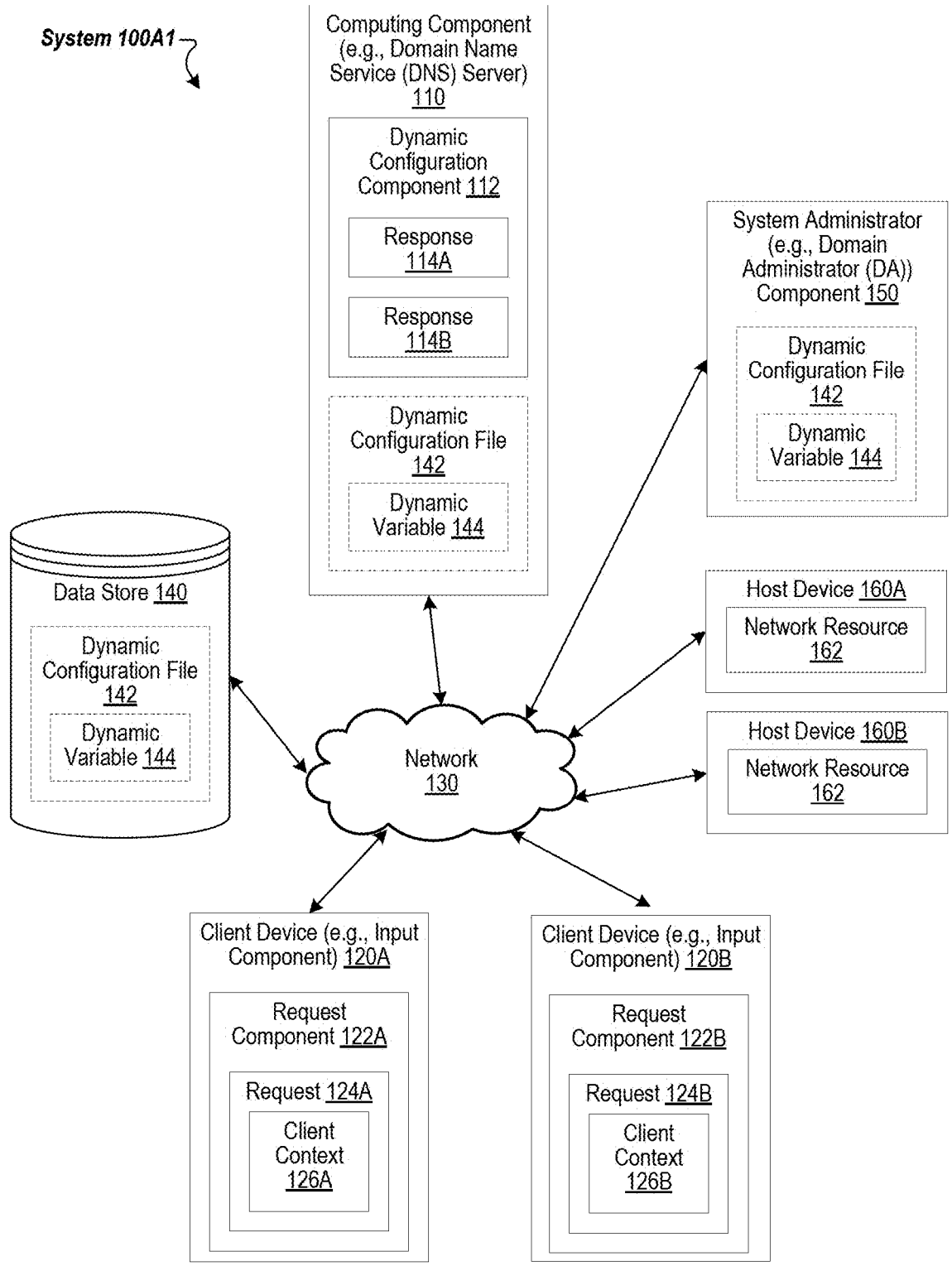
FIG. 1A1

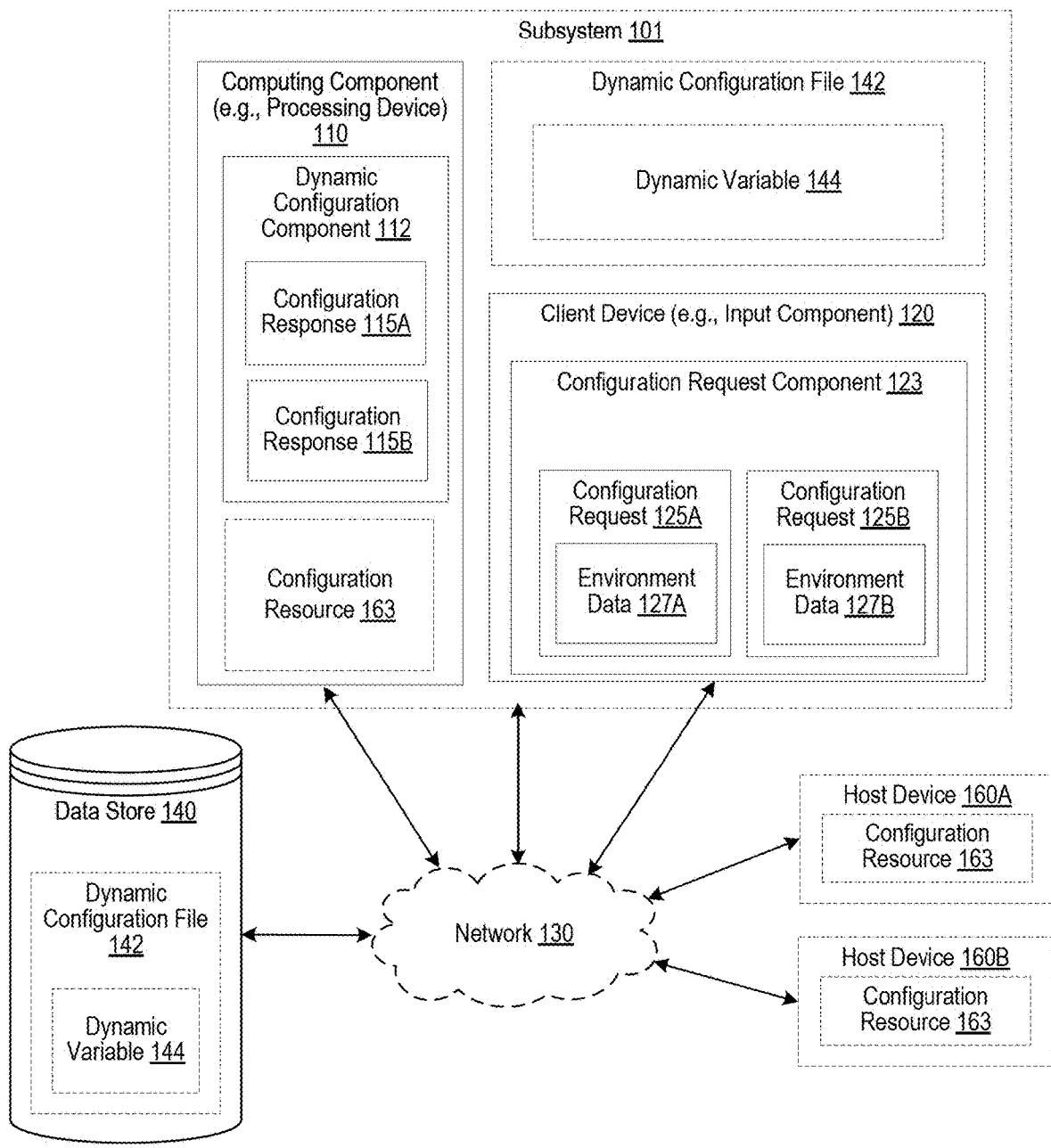
FIG. 1A2

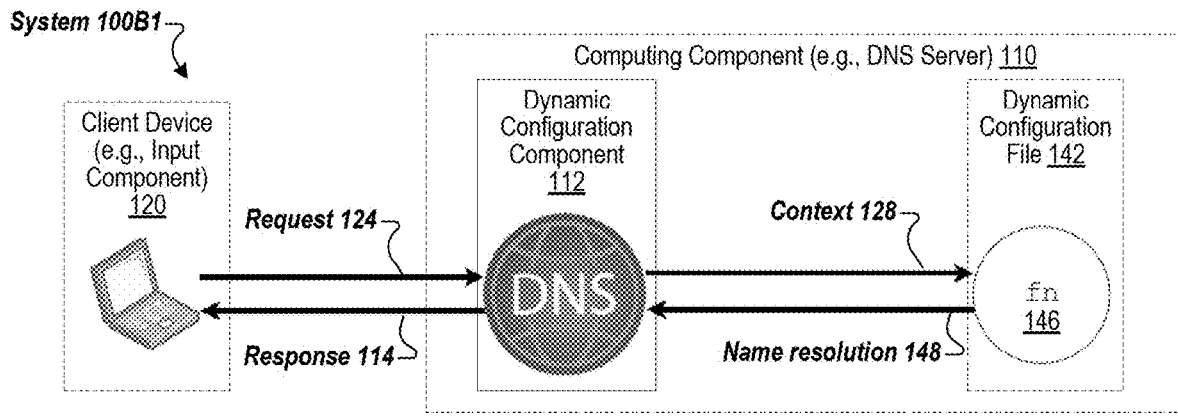
FIG. 1B1
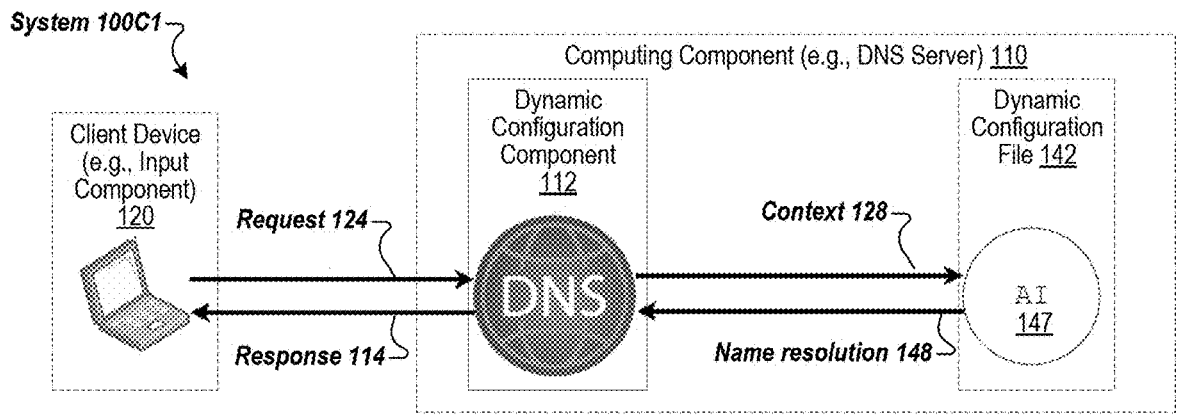
FIG. 1C1
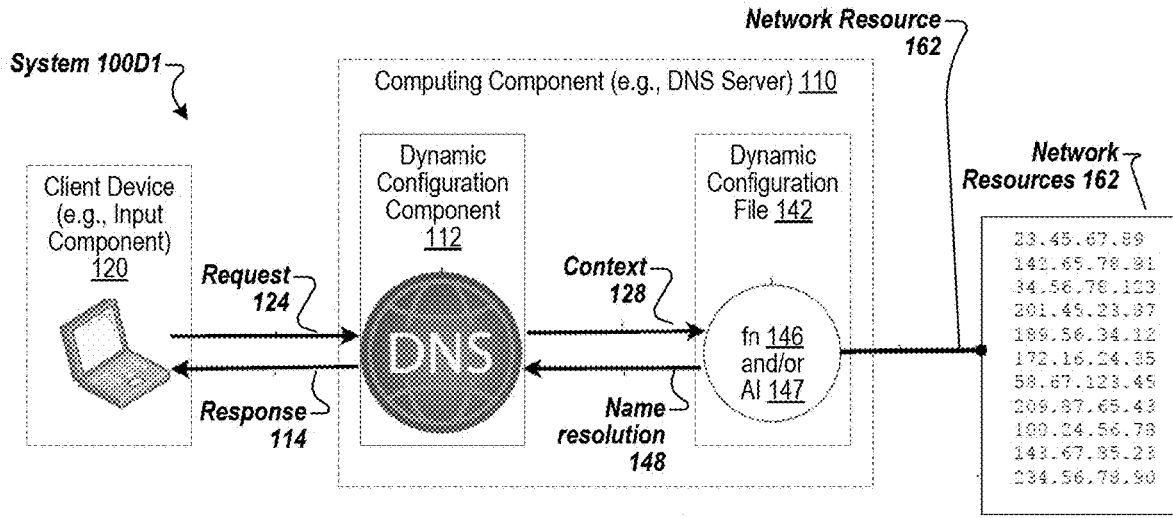
FIG. 1D1

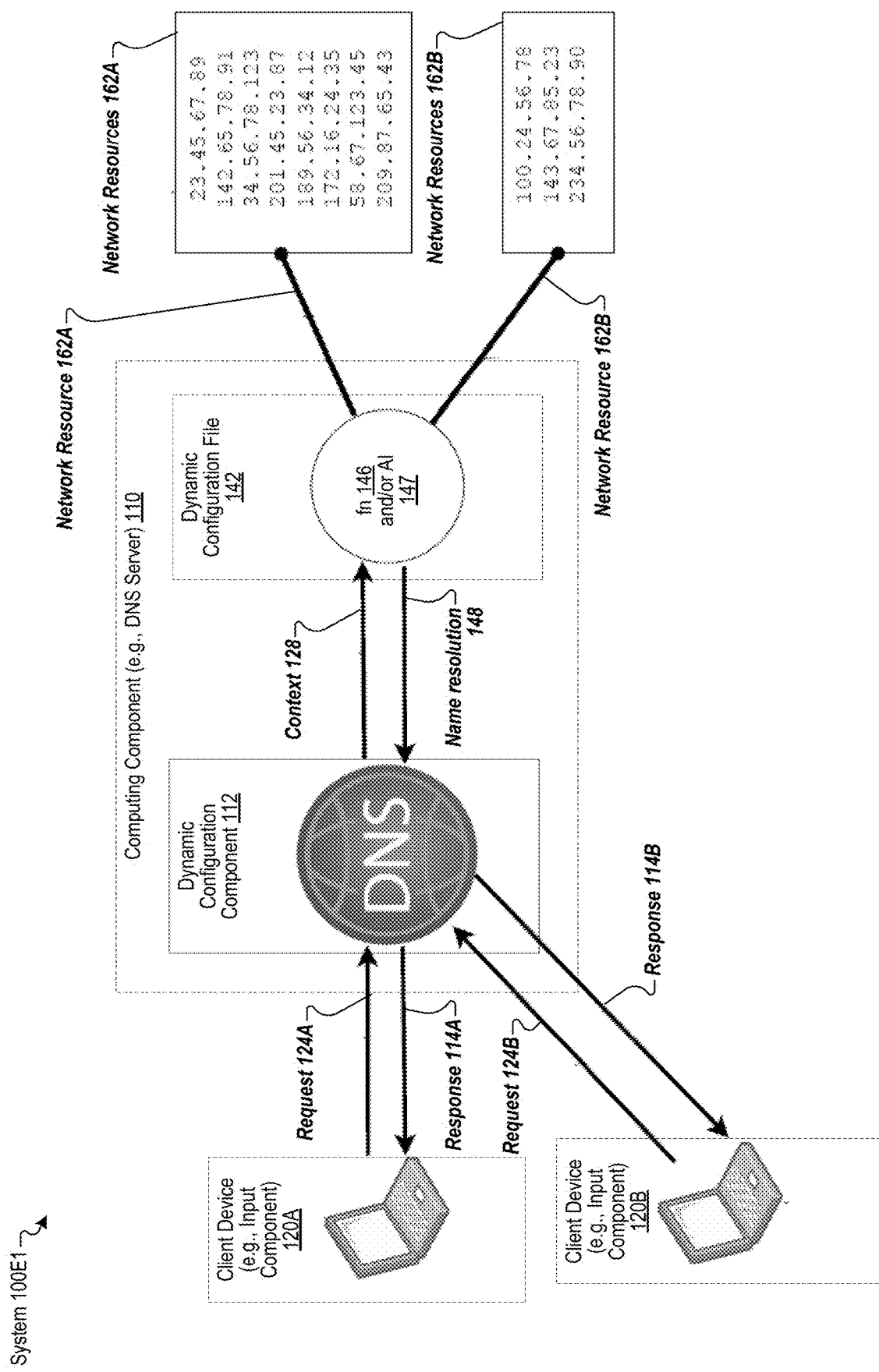
FIG. 1E1

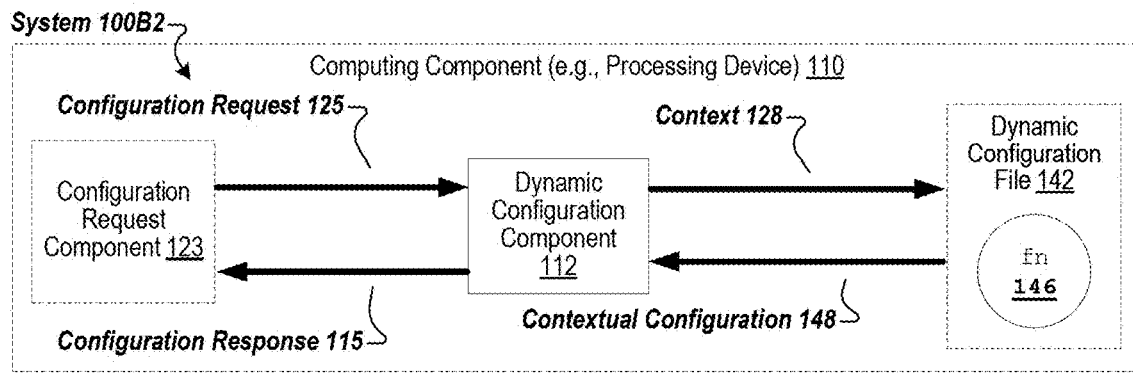
FIG. 1B2
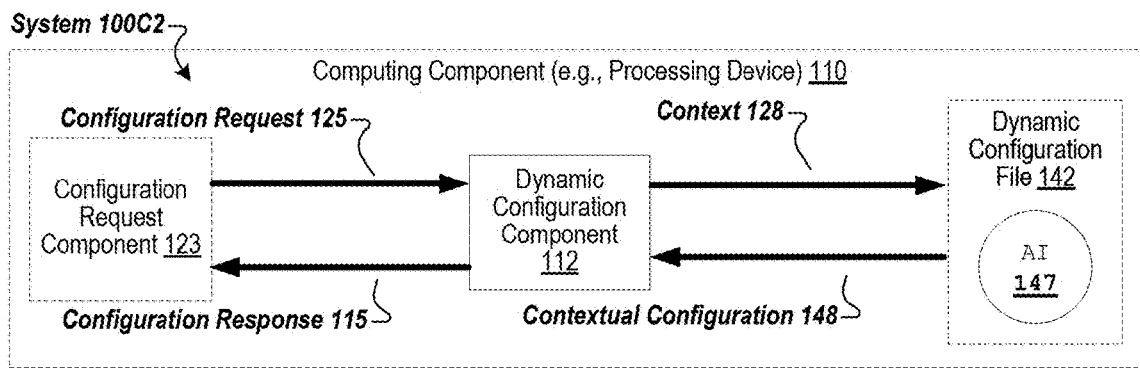
FIG. 1C2
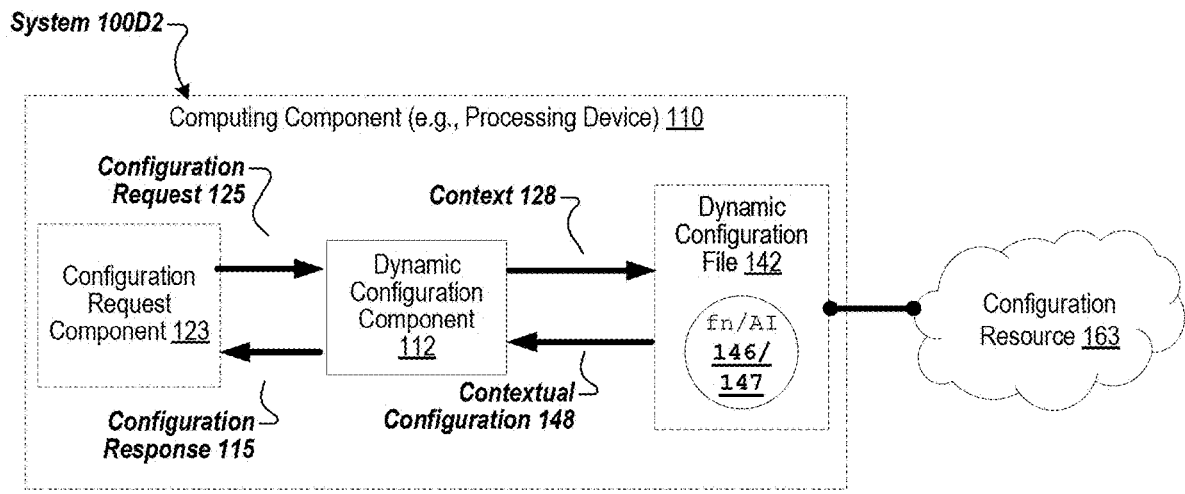
FIG. 1D2

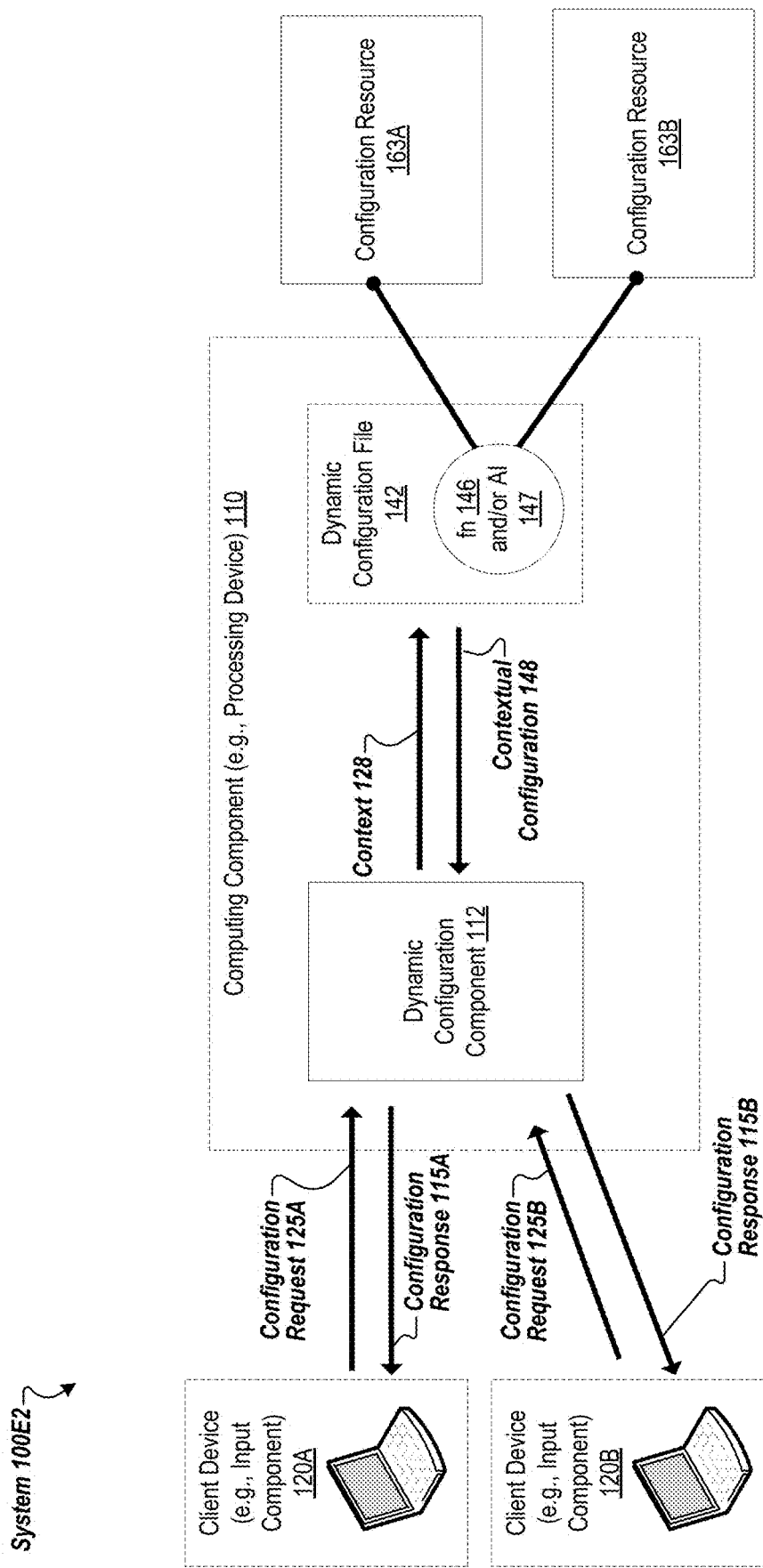
FIG. 1E2

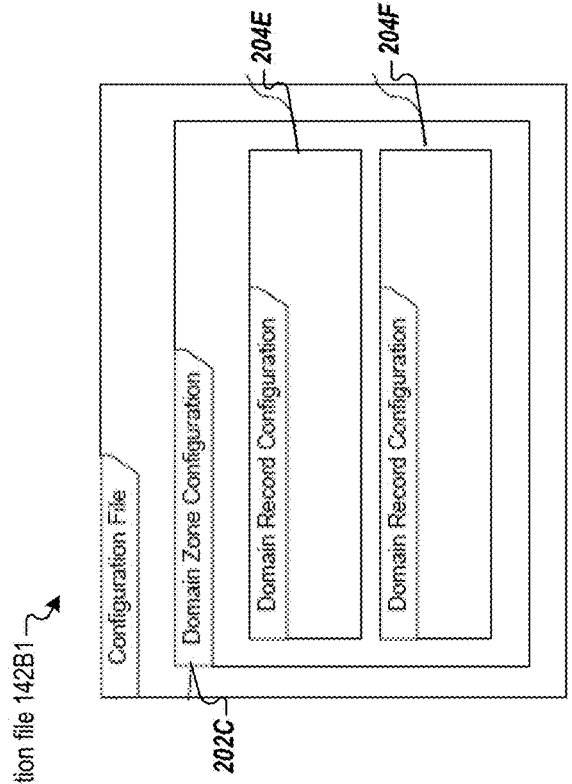
FIG. 2B1
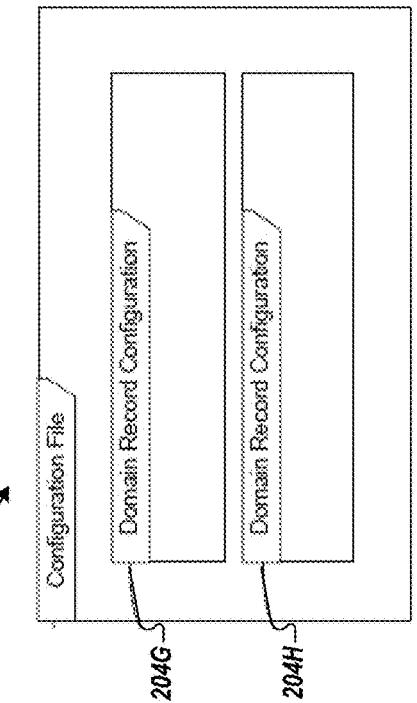
FIG. 2C1
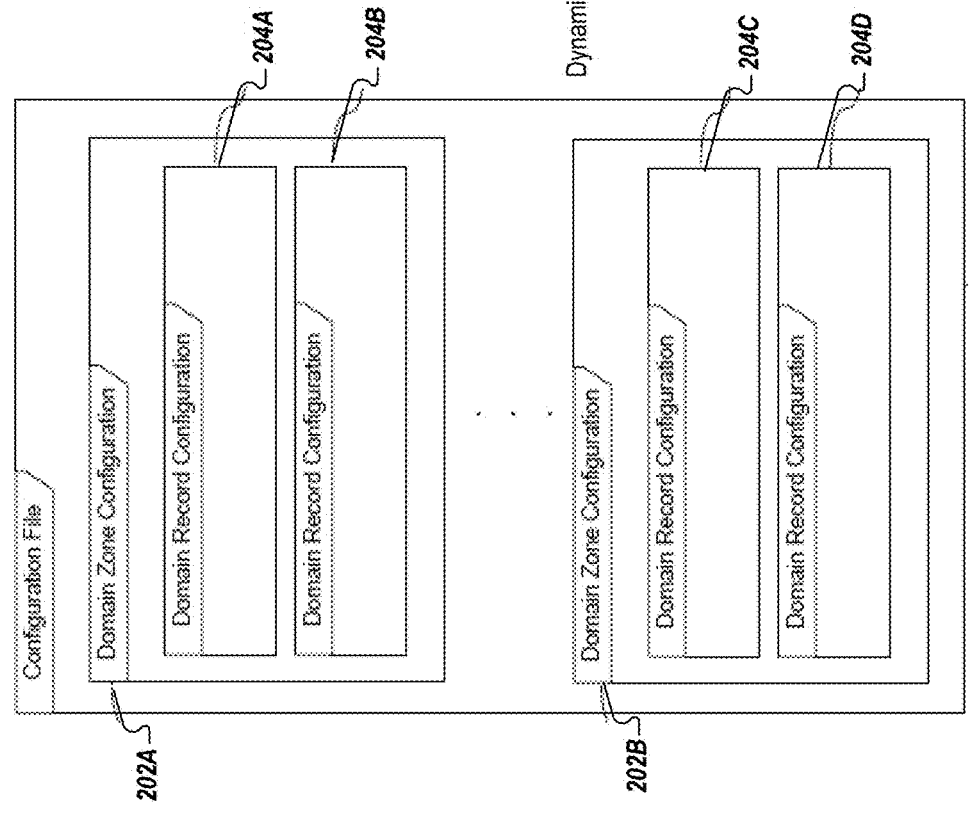
FIG. 2A1

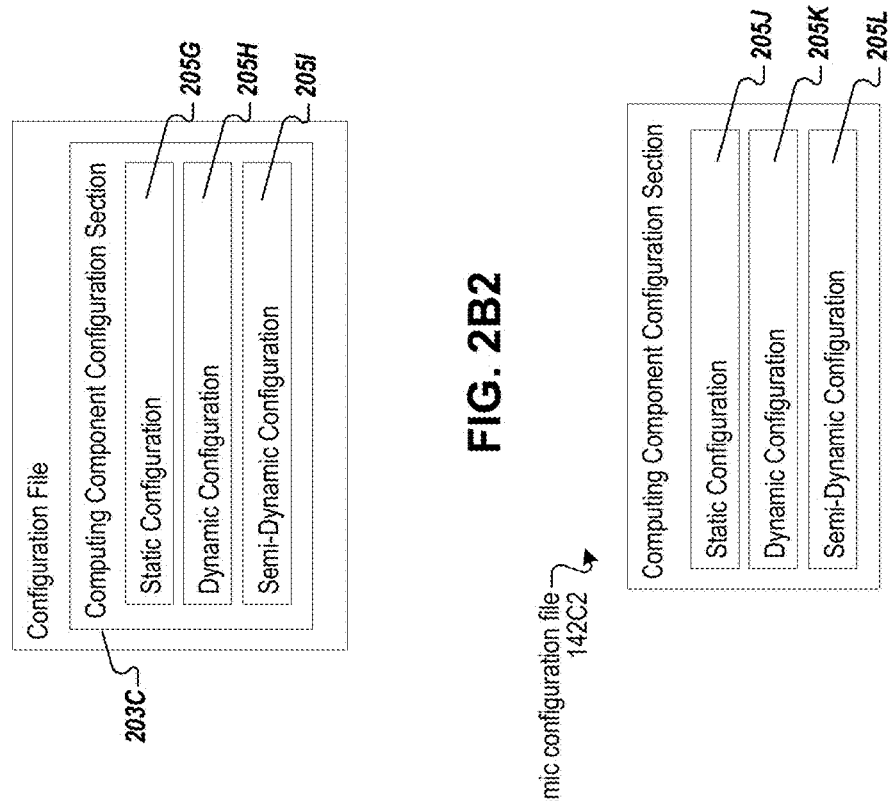
FIG. 2B2
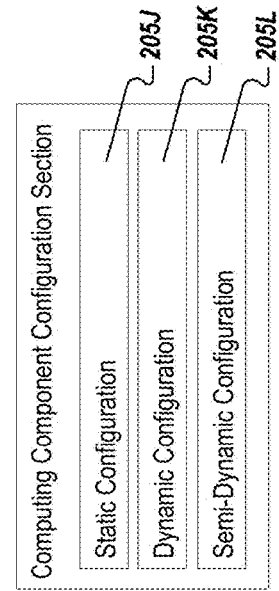
FIG. 2C2
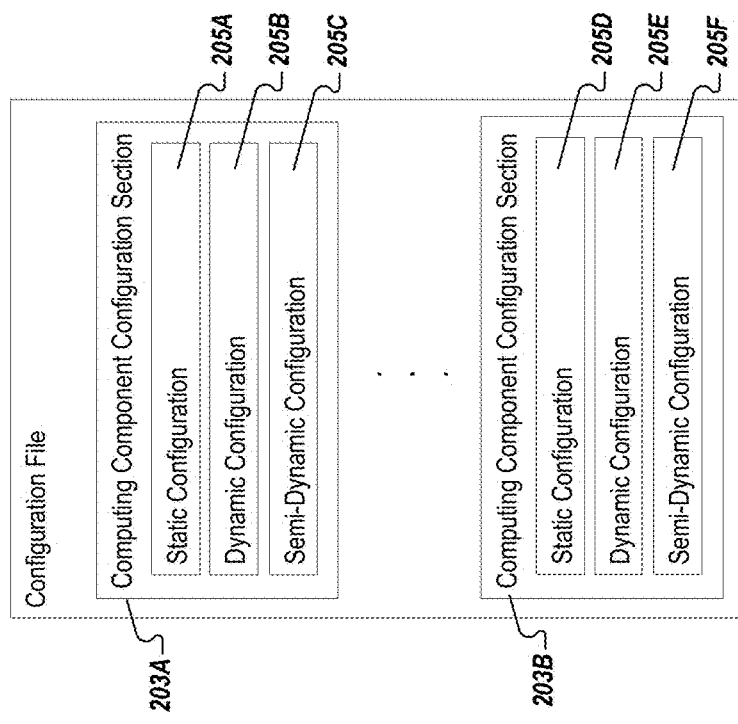
FIG. 2A2

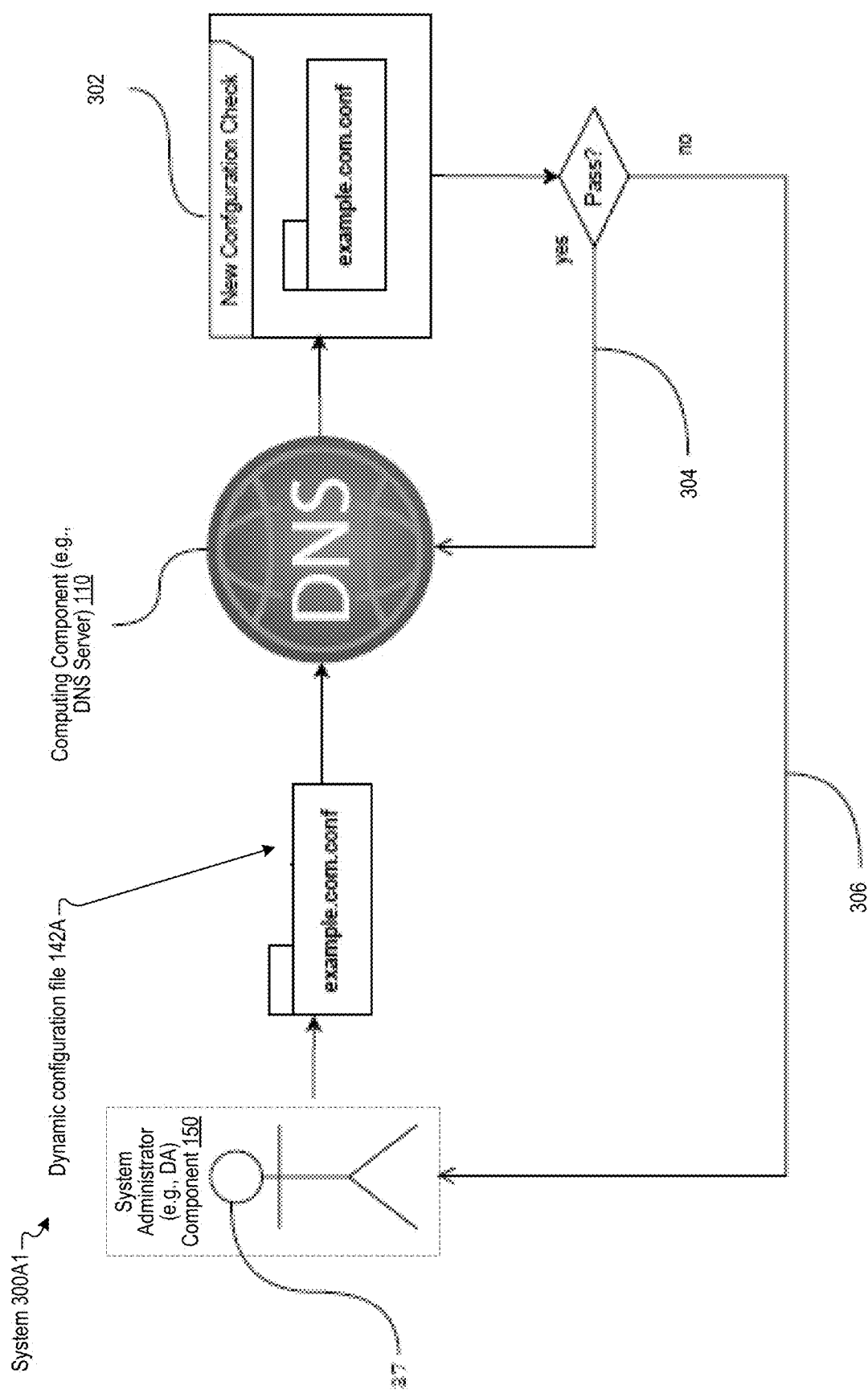
FIG. 3A1

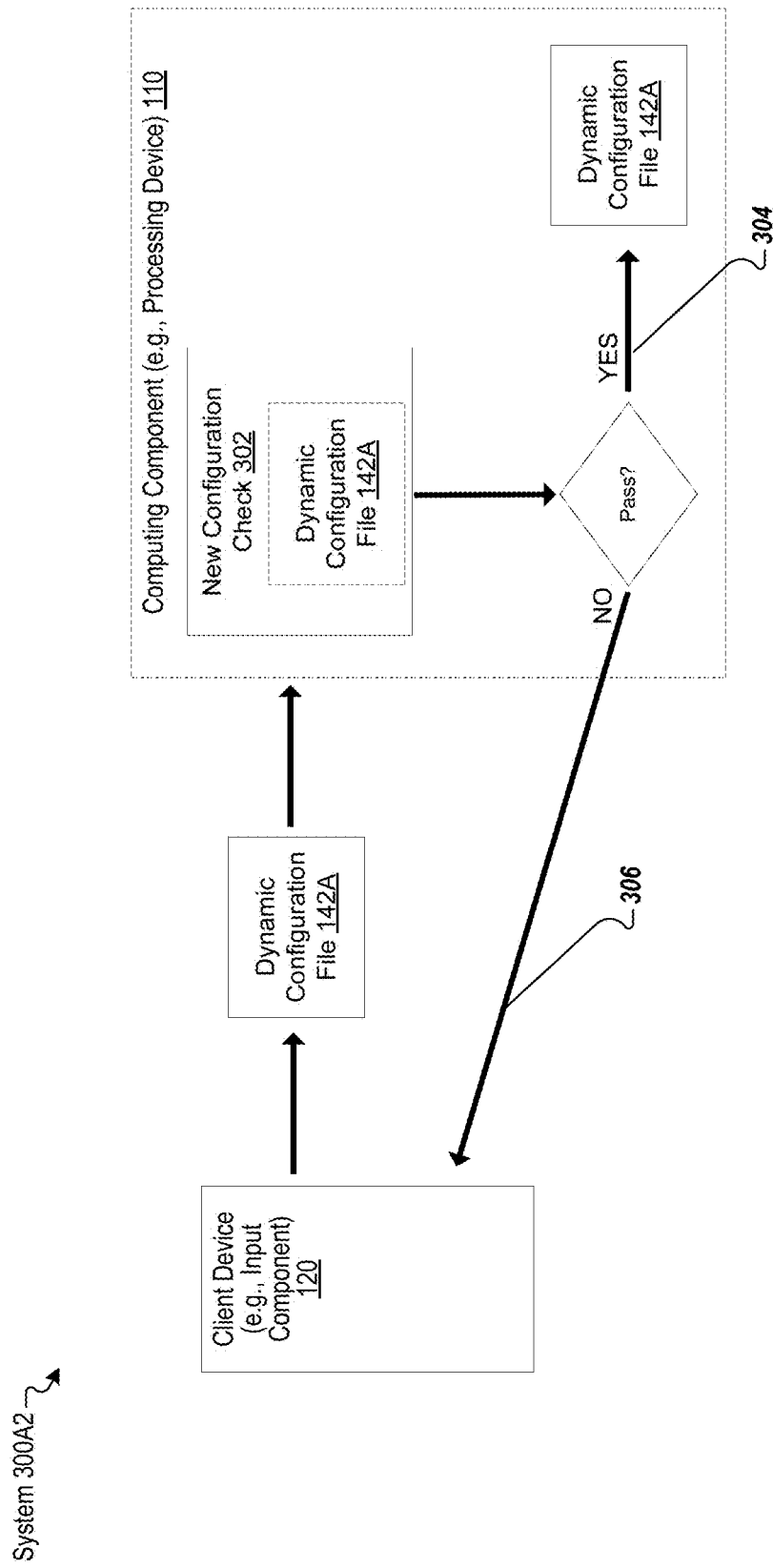
FIG. 3A2

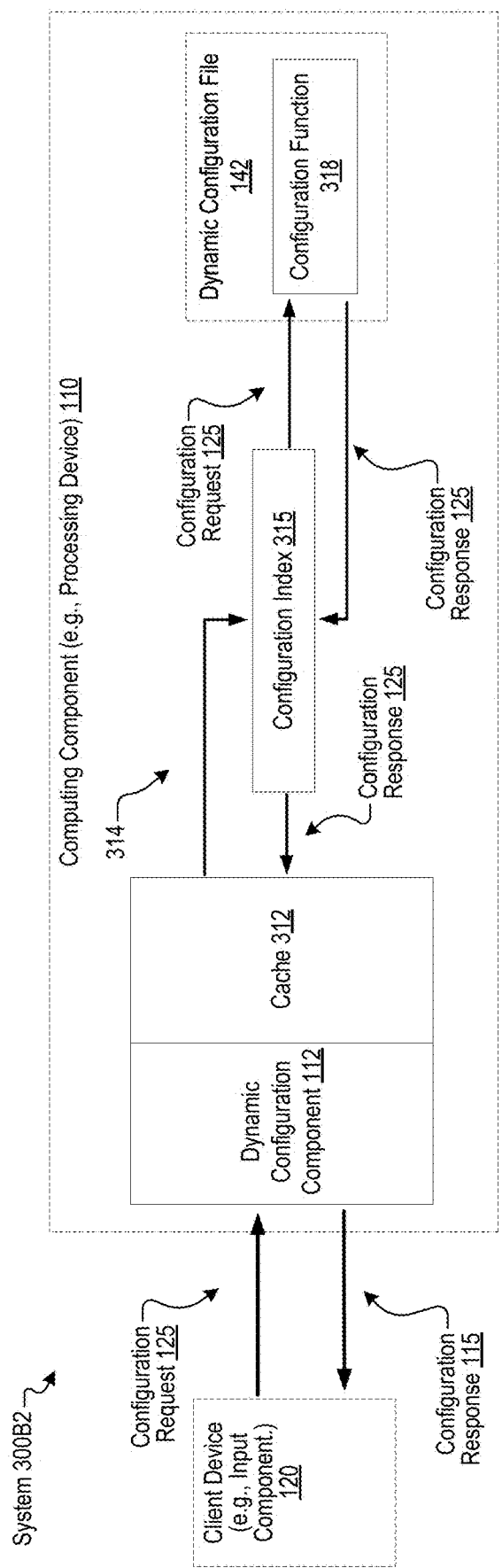
FIG. 3B2

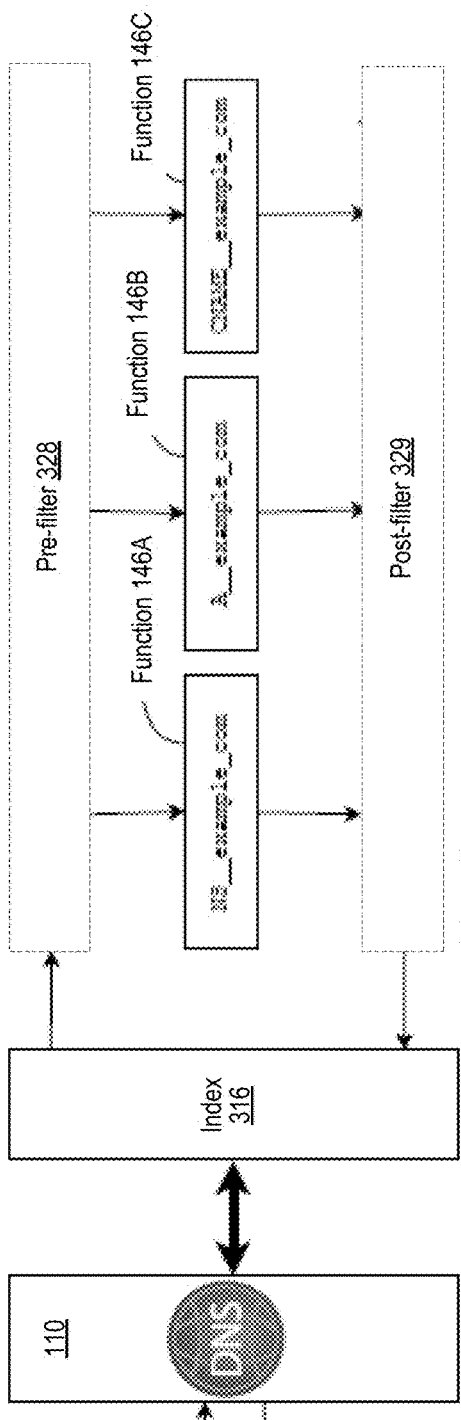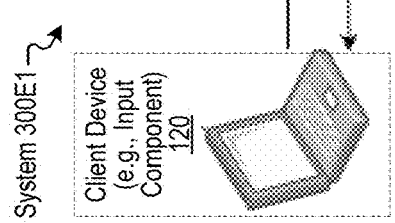
FIG. 3E1
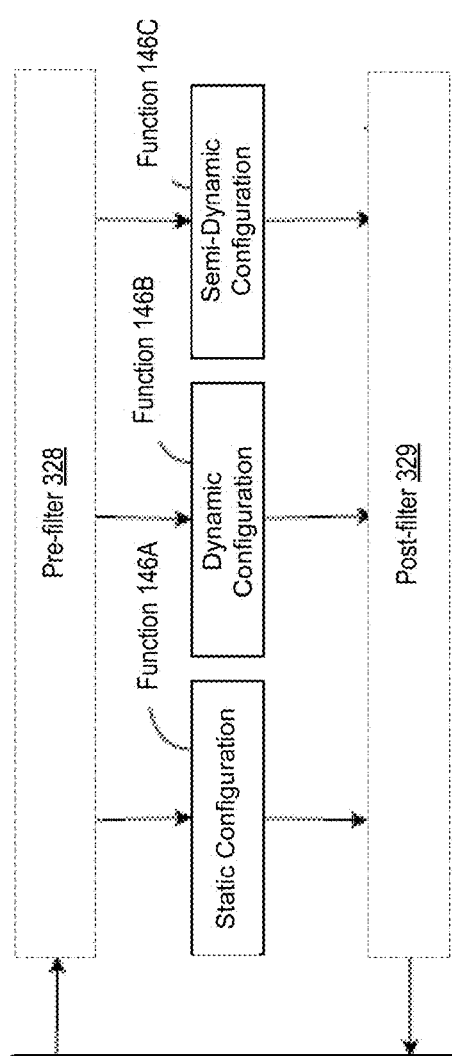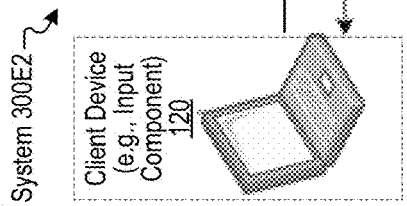
FIG. 3E2

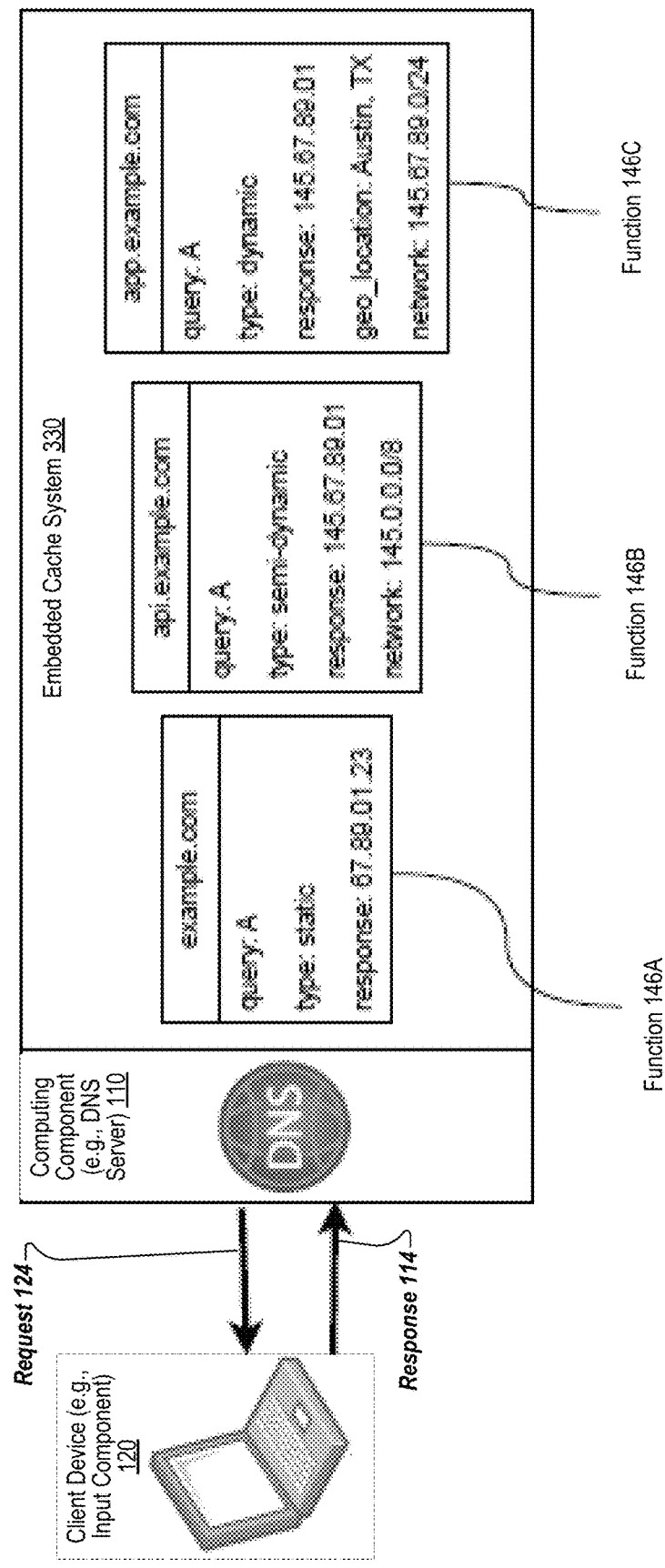
FIG. 3F1

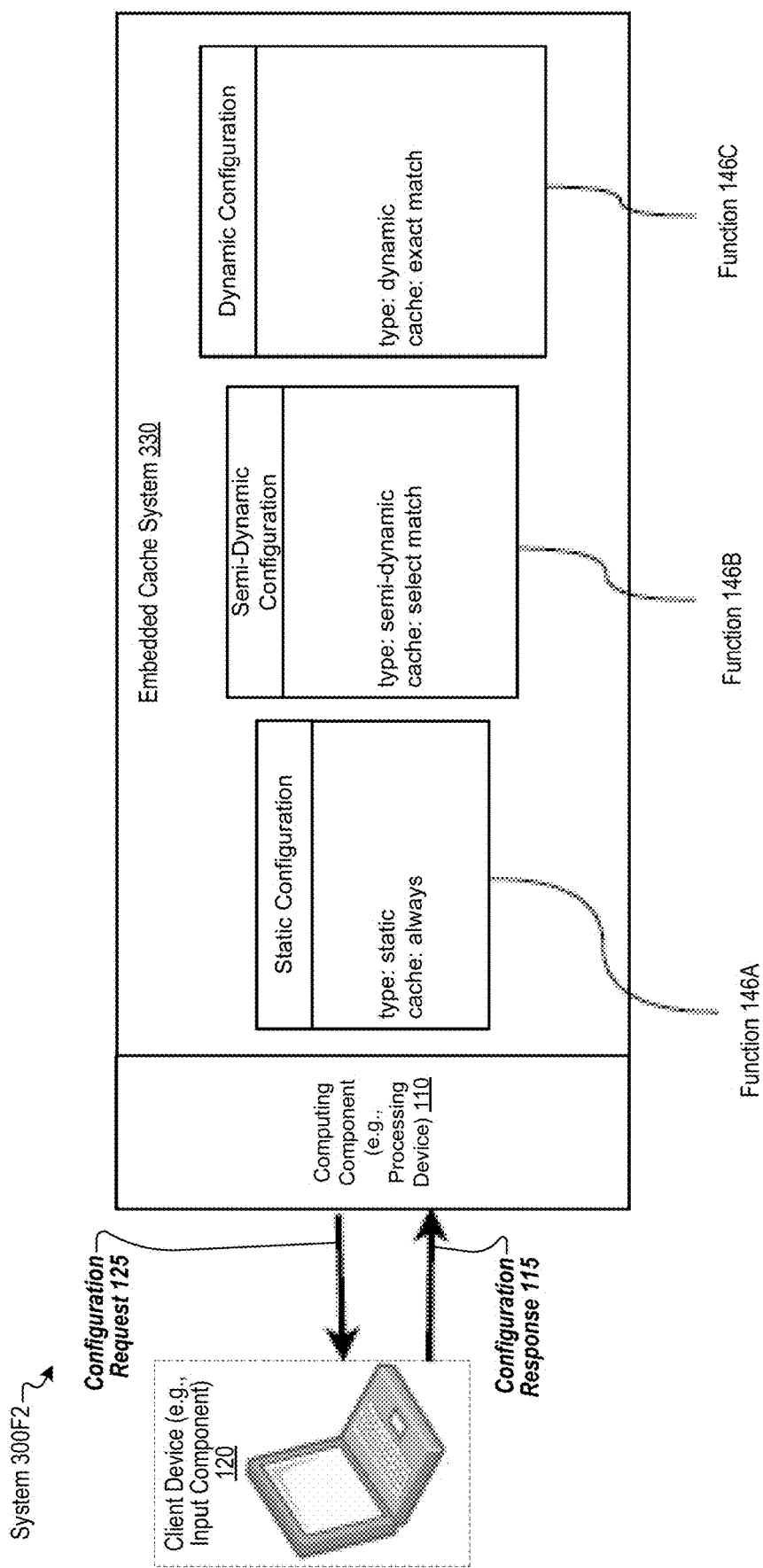
FIG. 3F2

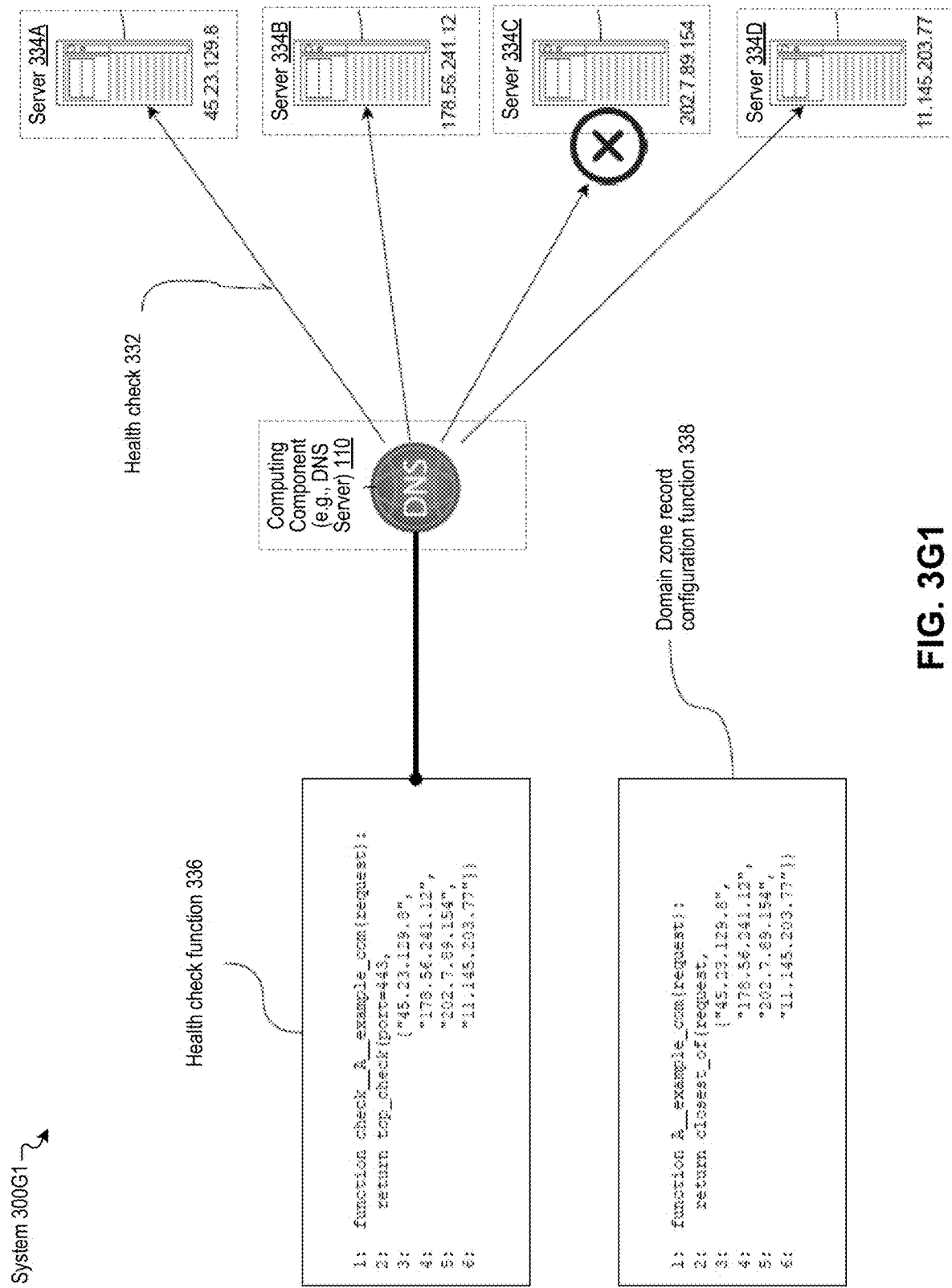
FIG. 3G1

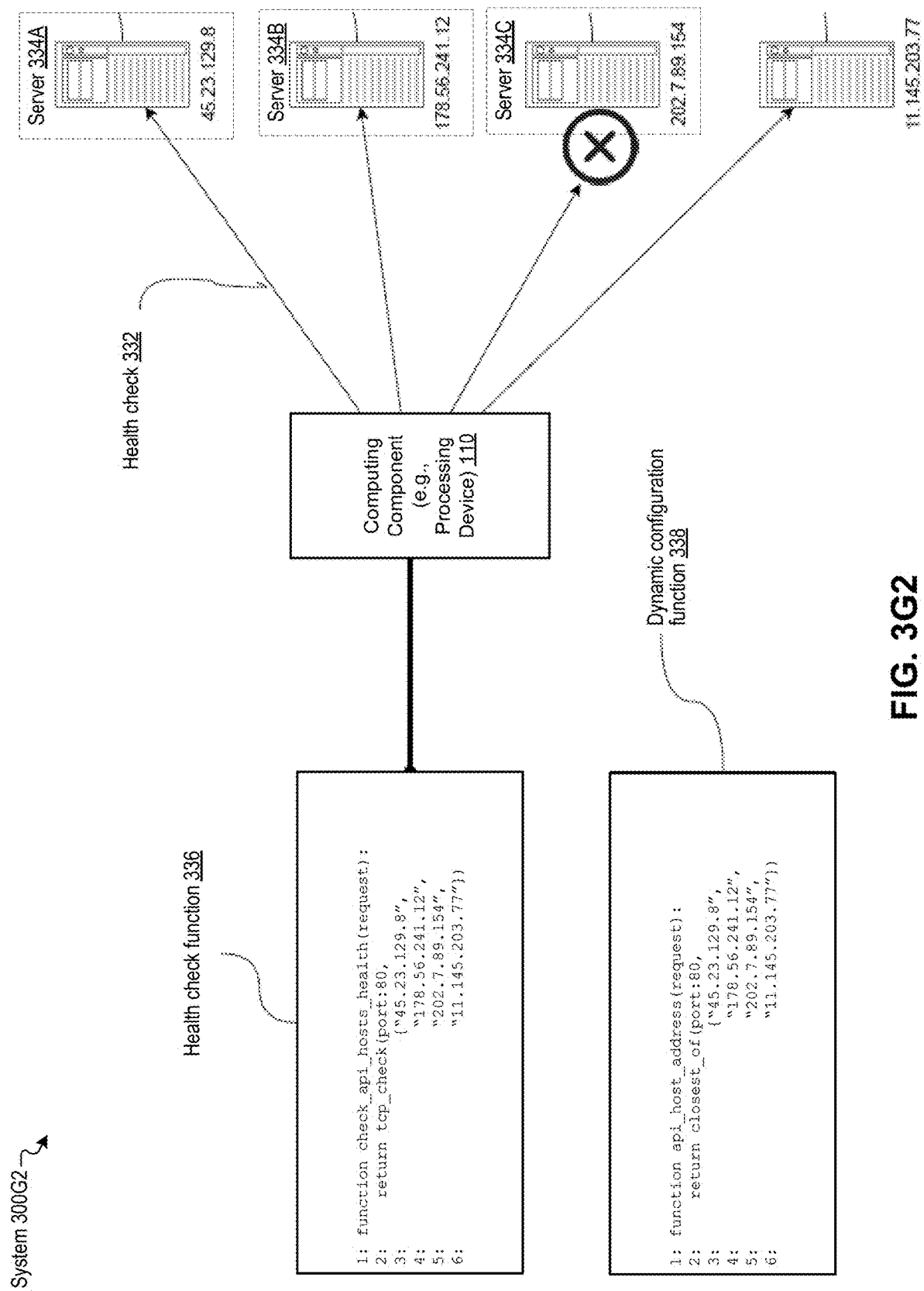
FIG. 3G2

UNIFIED PROGRAMMABLE DYNAMIC CONTEXT-AWARE CONFIGURATION

RELATED APPLICATION

This application is a continuation-in-part of U.S. patent application Ser. No. 18/600,535, filed Mar. 8, 2024, and claims benefit of U.S. Provisional Patent Application No. 63/604,350, filed Nov. 30, 2023, the contents of which are incorporated by reference in their entirety.

TECHNICAL FIELD

Embodiments of the present disclosure relate to configurations, and in particular to unified programmable dynamic context-aware configurations.

BACKGROUND

Devices perform operations responsive to user input. Some computing components create text documents responsive to user input via word processing programs and other applications. Some computing components access hypertext documents and applications of the world wide web via the Internet.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 1A1-E2 illustrate systems associated with unified programmable dynamic context-aware configurations, according to certain embodiments.

FIGS. 2A1-C2 illustrate dynamic configuration files according to certain embodiments.

FIGS. 3A1-G2 illustrate systems associated with unified programmable dynamic context-aware configurations, according to certain embodiments.

DETAILED DESCRIPTION OF EMBODIMENTS

Figure 3B:
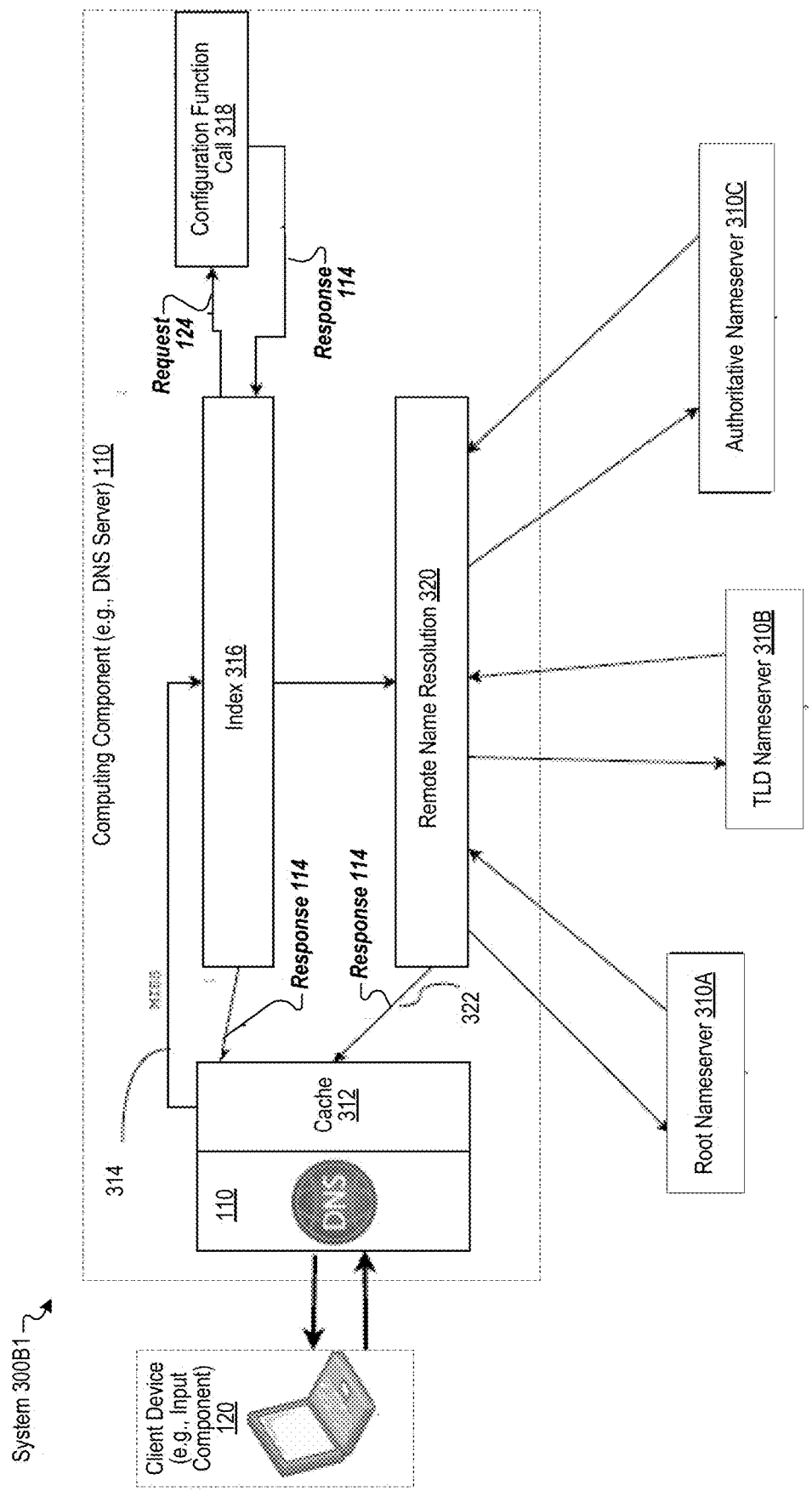

Embodiments described herein are related to unified programmable dynamic context-aware configurations (e.g., for domain name service (DNS), for one or more other services, etc.).

Processing logic may adjust behavior (e.g., settings) based on different operating conditions and requirements. Processing logic may refer to hardware (e.g., systems, devices, smartphones, tablets, laptops, personal computers (PCs), etc.), software (e.g., programs, applications, executable files, etc.), and/or firmware (e.g., embedded software, system software, device software, etc.). For example, processing logic (e.g., executing a word processor program) allows a user to configure the default page size and margins for new documents. As another example, web servers allow a user (e.g., a website administrator) to configure the location of the files within the web server that are to be served through hypertext transfer protocol (HTTP) in response to a request.

Processing logic also communicate and access data via networks. For example, client devices access hypertext documents and applications of the World Wide Web via the Internet (e.g., a global system of interconnected computer networks that uses the Internet protocol (IP) suite).

A network may broadly refer to communication or data exchange (e.g., enabled via devices, components, mechanisms, wireless communication, wired communication, etc.) between entities (e.g., devices, components, remote devices, components within the same device, etc.), whether those entities are remote devices (e.g., exist across distinct physical devices), within the same device (e.g., components within the same device), or even within the same executable process. These entities may include hardware components (e.g., processors, memory modules, sensors, input/output devices, etc.), software elements (e.g., applications, services, functions, threads, etc.), and/or firmware components (e.g., embedded routines, system controllers, etc.). Networks may connect separate devices via wired or wireless communication protocols (e.g., Ethernet, wireless local area network (WLAN), wireless personal area network (WPAN), etc.), facilitating the exchange of data or resources. A network can also encompass intra-device communication, including interactions between distinct processes, threads, and/or components of the same process. For example, inter-process communication may involve mechanisms such as sockets, pipes, shared memory, or operating system message-passing facilities. Within the same process, communication may take the form of function calls, where the main process (or a calling function) issues a request to another function or routine to elicit a response. This behavior is conceptually similar to a client-server interaction in traditional networks, where a client sends a request to a server and awaits a response. Additionally, intra-device communication may leverage hardware-based communication buses (e.g., Peripheral Component Interconnect (PCI), Universal Serial Bus (USB), etc.) or firmware-driven mechanisms to exchange control signals or data. Shared files, file system operations, and other forms of indirect communication may also simulate network-like behavior within a single device. By this broader definition, a network encapsulates any structured method of exchanging information or requests between discrete functional entities, whether distributed across multiple devices, localized within a single system, or even within the same process. Such communication may employ hardware, software, or firmware-based techniques, establishing the abstract nature of network as a medium for interaction and data exchange.

An input component may be any entity, mechanism, or medium that provides data, signals, or input to a system, thereby influencing or directing operations within that system. An input component may include, but is not limited to, physical input components such as keyboards, mice, touchscreens, and scanners, as well as software processes, firmware routines, robotic actions, or network requests. An input component may also include devices or processes that operate autonomously or in response to environmental triggers rather than direct human intervention. Furthermore, an input component may be internal to a device, such as a function call within a software application or a signal from an internal hardware sensor, or external, like a peripheral or another system communicating over a network. An input component may also be a hardware device, such as a smartphone, a tablet, a laptop, a personal computer (PC), a server, a processing device, etc. An input component may be capable of initiating or sending data, commands, or requests to a system, whether through physical interaction, software process, network communication, or other input delivery to influence system behavior. Additionally, while functioning as a source of input, input components may also serve in a capacity to receive or handle output, enabling bidirectional communication and operation. Input components may be capable of either directly processing responses or interacting with output devices in a collaborative manner to manage and facilitate system responses.

DNS is a hierarchical and distributed naming system for computers, services, and other resources in the Internet or other IP networks through which requests to access the World Wide Web are routed and interpreted. DNS associates various information with domain names (e.g., identification strings) assigned to each of the associated entities. DNS translates readily memorized domain names to other information useful in authenticating, configuring, redirecting, locating, or identifying computer services and devices with the underlying network protocols.

Processing logic may allow for behavior adjustment or customization through changes in configuration settings (e.g., configurations). This allows for the same processing logic to adjust and adapt to different usage needs without requiring a completely new processing logic to be created to accommodate for the differences in behavior. For instance, if a user wants to write a document to be printed on A4-sized paper (8.27 inches×11.69 inches) as opposed to standard letter-sized paper (8.5 inches×11 inches), a user may do this through a configuration setting rather than needing an entirely different processing logic executing an entirely different word processor program. As another example, configuration settings allow a web designer to create a new website without needing to implement a specific web server to meet the specific needs of the new website.

The domain zone configuration for a DNS server is another example of a type of configuration setting. The DNS protocol is almost as old as the Internet. Despite some updates and extensions to the protocol since its creation, the foundation upon which the Internet is built shows the limitations imposed by a protocol designed in the 1980s that now must support the Internet's scale. Because of this, many workarounds have been created to circumvent these limitations, such as using multiple records, Anycast Internet Protocol (IP) addresses, and Proxies, but solutions that directly address the inherent DNS limitations are lacking.

One such limitation is the protocol's inability to resolve the same name to only one of multiple different IP addresses on record based on rules that may or may not take into consideration the context of the client or the query. If context-aware routing of a client is required, the task is conventionally handled by an external solution such as a load balancer or a reverse proxy.

One of the causes of these exemplary types of issues is the limited nature of the static configuration files used to define domain zones and records. The static configuration files lend themselves to the easiness of evaluation and greater runtime performance, but at the same time, the static configuration files limit the service and prevent the service from being able to better accommodate a world in which cloud native, Internet of Things (IoT), and artificial intelligence (AI) driven applications are becoming the norm. These static configuration files are used conventionally by virtually all devices as a way to improve user experience and device capability.

Conventionally, static configurations (e.g., static configuration files, conventional configuration files) are often stored as static text files, though they may also be stored in static databases and/or in other static data structures. Regardless of the storage method, conventional configurations are static in nature (e.g., static configuration system) and require direct intervention in order to change an aspect of a given configuration. Needing to manually change configuration systems can be time consuming and inefficient, leading to increased processor overhead, increased energy consumption, and increased bandwidth requirements.

As an example, a conventional domain zone configuration is defined by a static configuration file. In this file, a Domain Administrator (DA) would, for example, define a typical zone record pointing the domain to the IP address of a host that serves the company's website. As the business grows and the number of visitors increases, the website now requires more hosts to distribute the load without impacting the website performance as perceived by its visitors. The DA now has two options: one is to add another copy of the previous record and direct the previous record to the IP address of the additional host intended to help support the extra load; or point the existing record to the IP address of a Hypertext Transfer Protocol Secure (HTTP/S) load balancer or reverse proxy that will distribute the traffic between the nodes that are serving the website.

The first option may save the effort of deploying an additional host with an HTTP/S proxy while allowing for more hosts to support the additional load. In this case, however, the DNS protocol will respond to queries on this domain by returning a list with all the IP addresses available, and the client (or the operating system the client runs on top of) will decide which IP the client will use. This decision is random and will not favor proximity for reduced latency.

Another issue associated with this strategy is that if one of the servers becomes unhealthy, the client will not attempt to switch IPs even though the client already has a list of other hosts from the original DNS query performed. The behavior becomes unpredictable and inefficient.

For that reason, most DAs opt for using an additional HTTP/S load balancer or reverse proxy host to handle the load balancing while leaving only one IP for the record, pointing to the HTTP/S proxy host. One obvious downside of this approach is the additional cost and latency introduced by an intermediary in the communication. Another downside is the introduction of a single point of failure: if the HTTP/S proxy host becomes unhealthy, no visitor can use the site even if all web servers downstream are healthy. The HTTP/S proxy is also a bottleneck, with its capacity limiting the amount of supported downstream web servers. Once that capacity is reached, additional HTTP/S proxies need to be deployed, and additional downstream web servers are attached to it. At this point, the DA is faced again with the previous conundrum: with more than one host responding for the same domain name, how can the traffic be distributed evenly and optimally since the use of multiple hosts for the same domain name does not solve that problem? Once again, due to the limitations in the DNS protocol and the use of static configuration files, the conventional solution lies in another piece of technology, external to the Domain Name System, called Anycast. Anycast allows multiple hosts to respond to the same IP address. By defining the same IP address for all hosts serving as an HTTP/S proxy, the DA can go back to defining a single record with a single IP address and retain full control of the load balancing. Although conventional solutions like Anycast are powerful and efficient, its implementation is expensive and complex while not always solving the latency issue optimally.

Conventional or static configuration files also have a prescribed data type and format, which requires a user to always follow the formatting prescribed for a specific data type in order to ensure data integrity and to prevent programming malfunctions or errors. For example, if a configuration variable associated with a page width (e.g., page_width variable) of a document is set to a numerical data type, the input from the user must be an integer number (e.g., whole numbers without decimals). If the input is not an integer number (e.g., a combination of letters or real numbers including decimals), the program will fail due to the data type formatting requirements. This can be challenging when dealing with specific types of data and puts artificial constraints or limitations on users. For these and other reasons, device engineers conventionally employ validation functions to prevent configuration variables from being set to a data type that is different from the one supported by the device.

Another example data type may include a sequence of alphanumeric characters. One such example of this data type is a configuration variable called domain_name that is used by a web server to define the domain name by which users access a website. In this example, a domain name has a standard format defined by the Internet Engineering Task Form (IETF) as starting with a letter, ending with a letter or digit, and having only letters, digits (numbers), and/or hyphens as interior characters. The IETF further defines a domain name as having no more than 63 characters. For this domain_name variable, a user could provide a domain name with the correct data type (e.g., a string of numbers and letters) but the incorrect configuration (e.g., a string of more than 63 characters, a string that starts with a number, etc.) and this would cause problems in the system. For these and other reasons, device engineers conventionally enforce strict adherence to data types and formats for configuration variables, as the lack of such protection would lead to unpredictable software malfunctions.

As another example, a conventional attempt to optimize DNS query responses includes implementing an intermediary solution that sits between the DNS server and the client, reordering the responses based on a pre-defined priority policy. Unfortunately, reordering the hosts based on priority does not always help because when receiving a list of hosts from a DNS query response, different Operating Systems will process the list differently, with some using the first host in the list while others will perform a random pick. Moreover, this conventional solution continues to work around DNS limitations by adding additional resources instead of focusing on solving the problem at the DNS level, the location in which the root cause is found.

Conventional DNS servers and domain zones rely on static configuration files to operate. Although this strategy has attempted to serve the world up to this point, it is increasingly apparent that this strategy will continue to impose limitations on the future of the Internet, which continues to grow at an exponential rate with the explosive growth of Cloud, IoT, and AI-driven applications. The static configuration hampers the possibility of a smarter name resolution approach, requiring workarounds that increase latency and resource consumption.

In light of the above and other examples, conventional or static configuration solutions enforce strict data types and formatting for each configuration value upon receiving any changes from the user. For instance, conventional or static solutions would prohibit a 64 character-length domain name because the conventional solution strictly enforces both the data type and formatting requirements.

Conventional or static solutions further save the new information (e.g., changes from the user to a configuration value) in a data structure that is accessible by the software during runtime, which would allow behavioral adjustment in accordance with the user input or preferences. However, these conventional solutions have limitations imposed by software and device engineers that are challenging to circumvent. For instance, a website administrator may wish to provide a different website if the user is accessing from a specific set of IP addresses or geographical locations. To accomplish this, a website administrator could not rely on conventional static configuration systems. Conventional static configuration systems restrict application behavior configurations that require workarounds in order to achieve a desired behavior, which increases system complexity that causes increased processing overhead.

The devices, systems, and methods of the unified programmable dynamic context-aware configuration of the present disclosure overcome at least the challenges mentioned above.

In some embodiments, a method (e.g., implementing a unified programmable dynamic context-aware configuration) includes receiving, by a processing device (e.g., a processing device of an input component that includes a software application), a dynamic configuration file. The method further includes loading, by the processing device, the dynamic configuration file in memory. The method further includes receiving, by the processing device from a first input component, a first request for a configuration resource. The first request includes first environment data (e.g., other data to which the software application has access) associated with the first input component. The method further includes identifying, by the processing device based on the configuration resource of the first request, a dynamic variable in the dynamic configuration file. The dynamic variable includes one or more algorithmically-defined rules. The method further includes executing, by the processing device, at least one of the one or more algorithmically-defined rules of the dynamic variable to determine, based on the first environment data, a first configuration response (e.g., a dynamic response in accordance with the data type and format of the dynamic variable) to the first request. The method further includes providing, by the processing device, the first configuration response to the first input component.

Unlike conventional solutions, the present disclosure allows a user to directly introduce new behavior into certain decision-making logic of a processing device (e.g., a software application and/or other computing component) without requiring the implementation of a complex solution (e.g., a plugin) or needing a deep knowledge of the inner workings of the processing device.

The present disclosure implements behavioral and configuration changes without as much complexity as conventional static configuration systems, and also introduces less security concerns than conventional solutions (e.g., a plugin). This may allow the present disclosure to provide a seamless adoption of a unified programmable dynamic context-aware configuration without requiring significant change to the source code.

With a unified programmable dynamic context-aware configuration, flexibility and range of capabilities of devices and/or applications may be increased by allowing the devices and/or applications to dynamically change behavior through rules defined by the user to meet specific requirements and needs. This provides many technical advantages that are particular to each device and/or application. For instance, a database administrator using a dynamic configuration system in a database server may determine specific configuration settings for a wide variety of usage profiles, enabling users to avoid compromises by allowing the configuration to adapt to each specific user's needs.

In addition, some of the load balancing issues observed in various networking services such as webservers, databases, file servers, and DNS servers can be addressed by allowing the configuration of multiple hosts for the same domain record or resource (e.g., website, database, files, domain names, etc.) while only responding to requests (e.g., queries) with the IP address of the host that makes the most sense for the client who issued the request (e.g., query).

This programmable configuration allows the user to implement algorithms (e.g., algorithmically-defined rules) that are executed at the time that a configuration variable is read (e.g., at runtime). The algorithmically-defined rules also consider the context in which the device and/or application is being executed to return the precise configuration value that would work best for that specific situation. A configuration may change during the performance of, but is not limited to, load balancing, adapting the system to different needs in real-time, mitigating attacks, improving efficiency, facilitating authentication and permissions, offering multiple environments under the same system, and/or other implementations.

The unified programmable dynamic context-aware configuration may reimagine the world of device and application development and configuration standards, liberating the user to achieve greater flexibility with a programmable configuration interface that is flexible enough to securely and privately adjust the device and/or application behavior.

With a unified programmable dynamic context-aware configuration, it is possible to use algorithms and/or artificial intelligence (AI) models when a dynamic variable is read from the configuration system, allowing for intelligent evaluation of the state and context of the device and/or application at run-time to return a more optimal configuration for a given situation compared to conventional solutions.

In some embodiments, a method (e.g., implementing a unified programmable dynamic context-aware configuration) includes identifying, by a DNS server, a dynamic configuration file. The method further includes receiving, by the DNS server from a first client device, a first request for a network resource. The first request includes first client context associated with the first client device. The method further includes identifying, by the DNS server based on the network resource of the first request, a dynamic variable in the dynamic configuration file. The dynamic variable includes one or more algorithmically-defined rules. The method further includes determining, by the DNS server based on at least one of the one or more algorithmically-defined rules of the dynamic variable and the first client context, a first response to the first request. The method further includes providing, by the DNS server, the first response to the first client device.

The systems, devices, and methods disclosed herein have technical advantages over conventional solutions. The present disclosure reduces bandwidth used, processor overhead, implementation complexity, and energy consumption of the processing device (e.g., executing a software application, of a DNS server, of a client device), and other devices involved in the process. In some embodiments, a unified programmable dynamic context-aware configuration is disclosed, featuring dynamic and context-aware adaptations. The present disclosure may depart from traditional static configuration files, employing configuration files with full featured programming capabilities and a supporting framework to address some of the limitations of the existing static configuration systems. The present disclosure offers enhanced flexibility, real-time adaptability, and improved responsiveness to evolving conditions and user requirements.

In some embodiments, with a unified programmable dynamic context-aware configuration, some of the load-balancing issues can be addressed by the DNS server by allowing the configuration of multiple hosts for the same domain record while only responding to queries with the IP address of the host that makes the most sense for the client who issued the query. This programmable configuration allows the DA to implement algorithms (e.g., algorithmically-defined rules) that are executed to perform actions before resolving a domain unrelated to load balancing but which has technical advantages, such as protecting the location of servers, mitigating attacks, improving efficiency, offering multiple environments under the same domain name, and many other applications.

The unified programmable dynamic context-aware configuration may reimagine the DNS service and configuration standards, liberating the protocol to achieve a fuller potential with a programmable configuration interface that is flexible enough to securely and privately provide domain name resolutions for the Internet's next generation.

With a unified programmable dynamic context-aware configuration, it is possible to use algorithms or even AI models in the name resolution process such that the context of a query is intelligently evaluated to return the most optimal response for a given situation.

Although some embodiments of the present disclosure are directed to unified programmable dynamic context-aware configurations, in some embodiments, the present disclosure can be used for unified programmable dynamic context-aware configurations for other services, devices, systems, robotic applications, and/or networking equipment. FIGS. 1A1-E illustrate systems 100A1-E associated with unified programmable dynamic context-aware configurations, according to certain embodiments. In some embodiments, two or more components, features, and/or methods of any of systems 100A1-E may be combined in a system 100.

FIG. 1A1 is a block diagram illustrating an exemplary system 100A1 (exemplary system architecture), according to certain embodiments. The system 100 includes computing component (e.g., DNS server) 110, client devices (e.g., input components) 120A-B, data store 140, system administrator (e.g., DA) device 150, and/or host devices 160A-B.

In some embodiments, one or more of the computing component (e.g., DNS server) 110, client devices (e.g., input components) 120A-B, data store 140, system administrator (e.g., DA) device 150, and/or host devices 160A-B are coupled to each other via a network 130. In some embodiments, network 130 is a public network that provides computing component (e.g., DNS server) 110, client devices (e.g., input components) 120A-B, data store 140, system administrator (e.g., DA) device 150, host devices 160A-B, and/or other computing components access to each other. In some embodiments, network 130 is a private network that provides computing component (e.g., DNS server) 110, client devices (e.g., input components) 120A-B, data store 140, system administrator (e.g., DA) device 150, host devices 160A-B, and/or other computing components access to each other. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, wired network, and/or a combination thereof.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing components (e.g., multiple server computers). In some embodiments, the data store 140 stores one or more dynamic configuration files 142. In some embodiments, each dynamic configuration file 142 includes one or more dynamic variables 144 (e.g., domain zone record).

In some embodiments, the client device (e.g., input component) 120 includes a computing component such as Personal Computers (PCs), laptops, mobile phones, smart phones, tablet computers, netbook computers, embedded devices, internet-connected appliances or vehicles, IoT devices in general, etc.

In some embodiments, one or more of computing component (e.g., DNS server) 110, client devices (e.g., input components) 120A-B, system administrator (e.g., DA) device 150, and/or host devices 160A-B includes a computing component such as Personal Computer (PC), laptop computer, mobile phone, smart phone, tablet computer, netbook computer, gateway device, rackmount server, router computer, server computer, mainframe computer, desktop computer, embedded devices, internet-connected appliances or vehicles, IoT devices in general, Graphics Processing Unit (GPU), accelerator Application-Specific Integrated Circuit (ASIC) (e.g., Tensor Processing Unit (TPU)), etc. In some embodiments, one or more of computing component (e.g., DNS server) 110, client devices (e.g., input components) 120A-B, system administrator (e.g., DA) device 150, and/or host devices 160A-B may include one or more operating systems that allow users to one or more of consolidate, generate, view, or edit data, provide directives to other computing components.

In some embodiments, a "user" is represented as a single individual. However, other embodiments of the disclosure encompass a "user" being an entity controlled by users and/or an automated source. In some examples, a set of individual users federated as a group of administrators is considered a "user."

In some embodiments, one or more of computing component (e.g., DNS server) 110 and/or system administrator (e.g., DA) device 150 includes a dynamic configuration component 112. In some embodiments, client devices (e.g., input components) 120A-B each include a request component 122. In some embodiments, the request component 122 generates a request 124 that includes client context 126. In some embodiments, the system administrator (e.g., DA) device 150 provides a dynamic configuration file 142 (that includes one or more dynamic variables 144) to the computing component (e.g., DNS server) 110. In some embodiments, computing component (e.g., DNS server) 110 obtains the dynamic configuration file 142 (that includes one or more dynamic variables 144) from the data store 140. In some embodiments, each host device 160 includes a network resource 162 (e.g., domain record, media file, or other content item).

In some embodiments, the computing component (e.g., DNS server) 110 includes the dynamic configuration component 112. In some embodiments, the dynamic configuration component 112 implements a unified programmable dynamic context-aware configuration. The dynamic configuration component 112 may identify a dynamic configuration file 142 (e.g., stored within computing component (e.g., DNS server) 110, in data store 140, received from system administrator (e.g., DA) device 150, etc.). The dynamic configuration component 112 may receive, from a client device 122A, a request 124A for a network resource 162. The request 124A includes client context 126A associated with the client device (e.g., input component) 120A. The dynamic configuration component 112 identifies, based on the network resource 162 of the request 124A, a dynamic variable 144 in the dynamic configuration file 142. The dynamic variable 144 includes one or more algorithmically-defined rules. The dynamic configuration component 112 determines, based on at least one of the one or more algorithmically-defined rules of the dynamic variable 144 and the first client context 126A, a response 114A to the request 124A and provides the response 114A to the client device (e.g., input component) 120A.

In some embodiments, the dynamic configuration component 112 receives, from client device (e.g., input component) 120B, a request 124B for the network resource 162. The request 124B may include client context 126B associated with the client device (e.g., input component) 120B. The dynamic configuration component 112 identifies, based on the request 124B, the dynamic variable 144 in the dynamic configuration file 142. The dynamic configuration component 112 determines, based on the dynamic variable 144 and the client context 126B, a response 114B to the request 124B and provides the response 114B to the client device (e.g., input component) 120B.

In some embodiments, response 114A is associated with network resource 162 located at host device 160A and response 114B is associated with network resource 162 located at host device 160B.

In some embodiments, one or more devices or components of system 100A1 may be consolidated into the same device (e.g., in the same housing) or system. In some embodiments, one or more devices or components of system 100A1 may be in distinct devices or systems (e.g., remote to each other). For example, computing component 110 and system administrator component 150 may be distinct devices (e.g., computing devices, servers, etc.) or may be in the same device (e.g., same computing device, same server, etc.).

FIG. 1A2 is a block diagram illustrating an exemplary system 100A2 (exemplary system architecture), according to certain embodiments. The system 100A2 includes computing component 110 (e.g., processing device), client device 120 (e.g., input component), data store 140, and/or host devices 160A-B. In some embodiments, a subsystem 101 may include computing component 110 (e.g., processing device) and client device 120 (e.g., input component). In some embodiments, computing component 110 is a processing device and the client device 120 is an input component (e.g., software application) that is executed by the processing device, wherein the processing device and the input component are within the same device. In some embodiments, subsystem 101 is a device (e.g., processing device and input component are hardware within the same housing).

In some embodiments, the computing component 110 is an application that is executed by a processing device of a client device 120 (e.g., input component). In some embodiments, the data store 140 may be a data store (e.g., memory) of client device (e.g., input component) 120. In some embodiments, the computing component (e.g., processing device) 110, client device (e.g., input component) 120, and data store 140 may be part of the same device (e.g., a computer).

In some embodiments, one or more of the computing component (e.g., processing device) 110, client device (e.g., input component) 120, data store 140, and/or host devices 160A-B are coupled to each other via a network 130. In some embodiments, network 130 is a public network that provides computing component (e.g., processing device) 110, client device (e.g., input component) 120, data store 140, host devices 160A-B, and/or other computing components access to each other. In some embodiments, network 130 is a private network that provides computing component (e.g., processing device) 110, client device (e.g., input component) 120, data store 140, host devices 160A-B, and/or other computing components access to each other. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, wired network, and/or a combination thereof.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing components (e.g., multiple server computers). In some embodiments, the data store 140 stores one or more dynamic configuration files 142. In some embodiments, each dynamic configuration file 142 includes one or more dynamic variables 144 (e.g., page_width, domain_name, etc.).

In some embodiments, client device (e.g., input component) 120 and/or host devices 160A-B includes a computing component such as Personal Computer (PC), laptop computer, mobile phone, smart phone, tablet computer, netbook computer, gateway device, rackmount server, router computer, server computer, mainframe computer, desktop computer, embedded devices, internet-connected appliances or vehicles, IoT devices in general, Graphics Processing Unit (GPU), accelerator Application-Specific Integrated Circuit (ASIC) (e.g., Tensor Processing Unit (TPU)), etc. In some embodiments, client device (e.g., input component) 120 and/or host devices 160A-B may include one or more operating systems that allow users to one or more of consolidate, generate, view, or edit data, provide directives to other computing components.

In some embodiments, a "user" is represented as a single individual. However, other embodiments of the disclosure encompass a "user" being an entity controlled by users and/or an automated source. In some examples, a set of individual users federated as a group of administrators is considered a "user."

In some embodiments, computing component (e.g., processing device) 110 includes a dynamic configuration component 112. In some embodiments, client device (e.g., input component) 120 includes a configuration request component 123. In some embodiments, the configuration request component 123 generates a configuration request 125 (e.g., request) that includes environment data 127. In some embodiments, client device (e.g., input component) 120 provides a dynamic configuration file 142 (that includes one or more dynamic variables 144) to the computing component (e.g., processing device) 110. In some embodiments, computing component (e.g., processing device) 110 obtains the dynamic configuration file 142 (that includes one or more dynamic variables 144) from the data store 140. In some embodiments, each host device 160 includes a configuration resource 163. In some embodiments, the computing component (e.g., processing device) 110 includes the configuration resource 163 (e.g., the computing component (e.g., processing device) 110 can access the configuration resource 163 without connecting to network 130).

In some embodiments, the computing component (e.g., processing device) 110 includes the dynamic configuration component 112. In some embodiments, the dynamic configuration component 112 implements a unified programmable dynamic context-aware configuration. The dynamic configuration component 112 may identify a dynamic configuration file 142 (e.g., stored within computing component (e.g., processing device) 110, in data store 140, received from client device (e.g., input component) 120, etc.). The dynamic configuration component 112 may receive, from client device (e.g., input component) 120, a configuration request 125 for configuration resource 163. The configuration request 125 includes environment data 127 associated with the client device (e.g., input component) 120. The dynamic configuration component 112 identifies, based on the configuration resource 163 of the configuration request 125, a dynamic variable 144 in the dynamic configuration file 142. The dynamic variable 144 includes one or more algorithmically-defined rules. The dynamic configuration component 112 determines, based on at least one of the one or more algorithmically-defined rules of the dynamic variable 144 and the environment data 127, a configuration response 115A to the configuration request 125 and provides the configuration response 115A to the client device (e.g., input component) 120.

In some embodiments, configuration response 115A is associated with configuration resource 163 located at host device 160A and configuration response 115B is associated with configuration resource 163 located at host device 160B. In some embodiments, configuration response 115A is in response to a first configuration request, and configuration response 115B is in response to a second configuration request, where the first configuration request and the second configuration request are different.

Referring to FIGS. 1B1-1C1, it is possible to observe what a high-level use of a unified programmable dynamic context-aware configuration can achieve when combined with the DNS protocol.

FIG. 1B1 illustrates a system 100B1 associated with a network resource 162, according to certain embodiments. FIG. 1B1 depicts a configuration using an algorithmic approach in which a domain record is defined by a function. The lifecycle of a request 124 (e.g., DNS query) is represented therein with the client device 120 submits a request 124 (e.g., DNS query) to be resolved by the DNS server 110 (e.g., resolver). The DNS server 110 executes the function (fn) 146 (e.g., dynamic configuration file 142, dynamic variable 144, etc.) responsible for processing requests 124 (e.g., queries) for the domain name (e.g., network resource 162) requested by the client device 120 and passes the context 128 (e.g., request 124 and/or client context 126) as an argument to the function 146. The context 128 may contain information provided by both the request 124 (e.g., query request) and the DNS Server 110. Upon processing the context 128, the function 146 returns the name resolution 148 following the dynamic variable 144 (e.g., algorithm) provided by the system administrator (e.g., DA) device 150 for this domain record (e.g., network resource 162). The DNS server 110 then passes on this response 114 back to the client device 120 which now is able to proceed with the original intention of the client device 120.

FIG. 1C1 illustrates a system 100C1 associated with a network resource 162, according to certain embodiments. FIG. 1C1 depicts a similar scenario as FIG. 1B1, replacing the algorithmic approach with an AI function 147. The lifecycle of a request 124 (e.g., DNS query) is represented therein with the client device 120 submitting a request 124 (e.g., DNS query) to be resolved by the DNS server 110 (e.g., resolver). The DNS server 110 executes the AI function 147 (e.g., dynamic configuration file 142, dynamic variable 144, etc.) responsible for processing requests 124 (e.g., queries) for the domain name (e.g., network resource 162) requested by the client device 120 and passes the context 128 (e.g., request 124 and/or client context 126) as input to the AI function 147. The context 128 contains information provided by both the request 124 (e.g., query request) and the DNS Server 110. Upon processing the context 128, the AI function 147 outputs the name resolution 148 in accordance with the original intents (e.g., dynamic configuration file 142, dynamic variable 144) of the System administrator (e.g., DA) device 150 for this domain record (e.g., network resource 162). The DNS Server 110 then passes on this response 114 back to the client device 120 which now is able to proceed with the original intention of the client device 120.

In a simple example, with a unified programmable dynamic context-aware configuration, a DNS server 110 can be programmed to make a smarter decision on which host device 160, from a list of available servers, is closer to the client device 120 who issued the request 124 (e.g., query) and return only that host device 160 such that all communications with the host device 160 after the name resolution 148 occur with the lowest possible latency (e.g., lower latency than conventional solutions).

FIG. 1D1 illustrates this simple example of an application for the unified programmable dynamic context-aware configuration of a domain record (e.g., network resource 162) that contains multiple available servers (e.g., host devices 160) for a single domain name and a function 146 that returns only the address that is the most appropriate for the context 128 (e.g., request 124 and/or client content 126) of the client device 120.

FIG. 1D1 illustrates a system 100D1 associated with a network resource 162, according to certain embodiments. FIG. 1D1 depicts an example scenario. Whether the function 146 and/or AI 147 in this example is algorithmic, AI-driven, or of any other nature is irrelevant as long as the function 146 and/or AI 147 achieves the intended desire of the system administrator (e.g., DA) device 150 to provide a name resolution 148 of a most appropriate response within given context 128 for the client device 120 that initiated the request 124 (e.g., query). Assuming that the client device 120 is currently assigned with the IP address 34.56.63.84, and that this IP address is part of the context 128 in the request 124 (e.g., query) and in the context 128 (e.g., argument) passed to the function 146 and/or AI 147, the function 146 and/or AI 147 would estimate that of the IPs in the list of available servers (e.g., host devices 160, network resource 162) for that network resource 162 (e.g., domain name), the IP address 34.56.78.123 is the closest one to the client device 120 and achieves the original goal desired by the system administrator (e.g., DA) device 150 when designing the function 146 and/or AI 147. The proximity calculation can be done by employing different strategies, and the similarity of the IP addresses is just one of several potential proximity indicators. That is why a programmable configuration (e.g., function 146 and/or AI 147, dynamic configuration file 142, dynamic variable 144) is better suited for this type of decision making. The IP address 34.56.78.123 is finally fetched from the list, returned to the DNS server 110, and ultimately returned to the client device 120, who is now able to proceed with its original intention.

This is just one of the innumerable possible applications for a unified programmable dynamic context-aware configuration, which would not be limited simply to providing the host address with the lowest latency for a given client device 120. On top of this obvious capability, the system administrator (e.g., DA) device 150 would be empowered with a powerful programming interface with which algorithms can be implemented based on the context of a query to issue responses that align with the interests of the business. Another example would be to serve multiple deployment environments through the same domain name. Yet another is to provide different versions of the same Application Programming Interface (API) under the same domain name. A final example would be to offer a dynamic resolution to other DNS record types that are not necessarily pointing to network addresses, but sometimes of informational or configuration nature such as start of authority (SOA), text (TXT), Canonical Name (CNAME), NS, PTR, etc. Both of these examples may be illustrated in FIG. 1E1.

FIG. 1E1 illustrates a system 100E1 associated with a network resource 162, according to certain embodiments. Assuming that in the first scenario, there are two client devices 120: client device 120A known to be desirous to access the production version of the website (e.g., network resource 162A) and client device 120B known to be desirous to access the staging version of the website (e.g., network resource 162B). The intent of client devices 120A-B is part of the client context 126A-B, which can be explicitly given through request 124A and request 124B (e.g., queries), assumed by the DNS server 110 and added to the context 128 when calling the function 146 and/or AI 147, or identified inside the function 146 and/or AI 147 by any other method provided by the system administrator (e.g., DA) device 150. In this example, the system 100D has two lists of IPs: a list of IPs for host devices 160A providing the production version of the website (e.g., network resources 162A), and a list of IPs for host devices 160B providing the staging version of the website (e.g., network resources 162B). Once the function 146 and/or AI 147 has identified the intention of the client device 120, the function 146 and/or AI 147 picks the most appropriate network resource 162 (e.g., IP address) for the context 128 (e.g., client context 126) of the client device 120, returning the network resource 162 (e.g., IP address) with the lowest latency relative to the client device 120 which also serves the version desired by the client device 120.

Using FIG. 1E1 for the scenario in which different versions of the same website are provided to different client devices 120 using the same domain name, let's assume now that in there are two client devices 120: client device 120A known to be desirous to access version 1.0 of a REST API (e.g., network resource 162A) and client device 120B known to be desirous to access version 1.2 of a REST API (e.g., network resource 162B). The intent of the client devices 120A-B is part of context 128 (e.g., client context 126), which can be explicitly given through the requests 124A-B (e.g., queries), assumed by the DNS server 110 and added to the context 128 when calling the function 146 and/or AI 147, or identified inside the function 146 and/or AI 147 by any other method (e.g., dynamic configuration file 142, dynamic variable 144) provided by the system administrator (e.g., DA) device 150. In this example, the system 100D has two lists of IPs: a list of IPs for host devices 160A providing version 1.0 of REST API (e.g., network resources 162A), and a list of IPs for host devices 160B providing version 1.2 of the REST API (e.g., network resources 162B). Once the function 146 and/or AI 147 has identified the intention of the client, the function 146 and/or AI 147 picks the most appropriate IP address (e.g., network resource 162A or 162B) for the context 128 of the client device 120, returning the IP (e.g., network resource 162) with the lowest latency relative to the client device 120 which also serves the version desired by the client device 120.

In some embodiments, the ultimate goal of a unified programmable dynamic context-aware configuration is to liberate the DNS Server 110 from the limitations imposed by static configuration files and unlock the potential of the DNS protocol to reduce resource consumption and enable a safer, smarter, and more efficient internet (e.g., network 130).

The unified programmable dynamic context-aware configuration may include a file (e.g., dynamic configuration file 142) that contains an algorithm (e.g., dynamic variable 144) defining the domain zone and zone record configurations for a given domain. It is possible for a single file (e.g., dynamic configuration file 142) to contain multiple domain zone configurations. It is also possible for a single file (e.g., dynamic configuration file 142) to contain the configuration of a single zone record or for multiple files to define a single domain zone, with each file (e.g., dynamic configuration file 142) containing a single zone record or any possible combination of files, domain zones, or zone record configurations.

Referring to FIGS. 1B2-C2, it is possible to observe what a high-level use of a unified programmable dynamic context-aware configuration can achieve when combined with a processing device.

FIG. 1B2 illustrates a system 100B2 associated with a configuration resource 163, according to certain embodiments. FIG. 1B2 depicts a configuration using an algorithmic approach in which a configuration value is defined by a function. The lifecycle of a configuration request 125 (e.g., page_width, domain_name, etc.) is represented therein with the configuration request component 123 submitting a configuration request 125 (e.g., page_width, domain_name, etc.) to be resolved by the computing component (e.g., processing device) 110 (e.g., text processor, web server, DNS server, etc.). The computing component (e.g., processing device) 110 executes the function (fn) 146 (e.g., dynamic configuration file 142, dynamic variable 144, etc.) responsible for processing configuration requests 125 for the configuration resource 163 (e.g., application settings) requested by the client device (e.g., input component) 120 and passes the application context 128 (e.g., configuration request 125 and/or environment data 127) as an argument to the function 146. The application context 128 may contain information provided by both the configuration request 125 (e.g., application configuration request) and the computing component (e.g., processing device) 110. Upon processing the context 128, the function 146 returns the contextual configuration 148 (e.g., name resolution, configuration value calculation) following the dynamic variable 144 (e.g., algorithm) provided by the client device (e.g., input component) 120 for this configuration resource 163. The computing component (e.g., processing device) 110 then passes on this configuration response 115 back to the client device (e.g., input component) 120 which now is able to proceed with the original intention of the input component 120.

FIG. 1C2 illustrates a system 100C2 associated with a configuration resource 163, according to certain embodiments. FIG. 1C2 depicts a similar scenario as FIG. 1B2, replacing the algorithmic approach with an AI function 147. The lifecycle of a configuration request 125 (e.g., request for configuration resource, DNS query) is represented therein with the configuration request component 123 submitting a configuration request 125 (e.g., page_width, domain name, etc.) to be resolved by the computing component (e.g., processing device) 110 (e.g., text processor, web server, DNS server, etc.). The computing component (e.g., processing device) 110 executes the AI function 147 (e.g., dynamic configuration file 142, dynamic variable 144, etc.) responsible for processing configuration requests 125 for the configuration resource 163 (e.g., application settings) requested by the client device (e.g., input component) 120 and passes the application context 128 (e.g., configuration request 125 and/or environment data 127) as an argument to the AI function 147. The application context 128 may contain information provided by both the configuration request 125 (e.g., application configuration request) and the computing component (e.g., processing device) 110. Upon processing the context 128, the AI function 147 returns the contextual configuration 148 (e.g., name resolution, configuration value calculation) following the dynamic variable 144 (e.g., algorithm) provided by the client device (e.g., input component) 120 for this configuration resource 163. The computing component (e.g., processing device) 110 then passes on this configuration response 115 back to the client device (e.g., input component) 120 which now is able to proceed with the original intention of the input component 120.

In a simple example, with a unified programmable dynamic context-aware configuration, a computing component (e.g., processing device) 110 can be programmed to make a smarter decision on which host device 160, from a list of available servers, is closer to the client device (e.g., input component) 120 who issued the configuration request 125 (e.g., query) and return only that host device 160 such that all communications with the host device 160 after the contextual configuration 148 (e.g., name resolution) occur with the lowest possible latency (e.g., lower latency than conventional solutions).

FIG. 1D2 illustrates this simple example of an implementation of the unified programmable dynamic context-aware configuration of a domain record (e.g., configuration resource 163) that contains multiple available servers (e.g., host devices 160) for a single domain name and a function 146 that returns only the address that is the most appropriate for the context 128 (e.g., request 124 and/or client content 126) of the client device (e.g., input component) 120.

FIG. 1D2 illustrates a system 100D2 associated with a configuration resource 163, according to certain embodiments. FIG. 1D2 depicts an example scenario. Whether the function 146 and/or AI 147 in this example is algorithmic, AI-driven, or of any other nature is irrelevant as long as the function 146 and/or AI 147 achieves the intended desire of the computing component (e.g., processing device) 110 to provide a contextual configuration 148 of a most appropriate configuration response within given context 128 for the client device (e.g., input component) 120 that initiated the configuration request 125 (e.g., query). Assuming that the client device (e.g., input component) 120 is currently assigned with the IP address 34.56.63.84, and that this IP address is part of the context 128 in the configuration request 125 (e.g., query) and in the context 128 (e.g., argument) passed to the function 146 and/or AI 147, the function 146 and/or AI 147 would estimate that of the IPs in the list of available servers (e.g., host devices 160, configuration resource 163) for that configuration resource 163 (e.g., domain name), the IP address 34.56.78.123 is the closest one to the client device (e.g., input component) 120 and achieves the original goal desired by the client device (e.g., input component) 120 when designing the function 146 and/or AI 147. The proximity calculation can be done by employing different strategies, and the similarity of the IP addresses is just one of several potential proximity indicators. That is why a programmable configuration (e.g., function 146 and/or AI 147, dynamic configuration file 142, dynamic variable 144) is better suited for this type of decision making. The IP address 34.56.78.123 is finally fetched from the list, returned to the computing component (e.g., processing device) 110, and ultimately returned to the client device (e.g., input component) 120, who is now able to proceed with its original intention.

This is just one of the innumerable possible applications for a unified programmable dynamic context-aware configuration, which would not be limited simply to providing the host address with the lowest latency for a given client device (e.g., input component) 120. On top of this obvious capability, the client device (e.g., input component) 120 would be empowered with a powerful programming interface with which algorithms can be implemented based on the context of a query to issue responses that align with the interests of the business. Another example would be to serve multiple deployment environments through the same domain name. Yet another is to provide different versions of the same Application Programming Interface (API) under the same domain name. A final example would be to offer a dynamic resolution to other DNS record types that are not necessarily pointing to network addresses, but sometimes of informational or configuration nature such as start of authority (SOA), text (TXT), Canonical Name (CNAME), NS, PTR, etc. Both of these examples may be illustrated in FIG. 1E2.

FIG. 1E2 illustrates a system 100E2 associated with a configuration resource 163, according to certain embodiments. Assuming that in the first scenario, there are two client devices (e.g., input components) 120: first client device (e.g., input component) 120A known to be desirous to access the production version of the website (e.g., configuration resource 163A) and second client device (e.g., input component) 120B known to be desirous to access the staging version of the website (e.g., configuration resource 163B). The intent of input components 120A-B is part of the context, which can be explicitly given through configuration request 125A and configuration request 125B (e.g., queries), assumed by the computing component (e.g., processing device) 110 and added to the context 128 when calling the function 146 and/or AI 147, or identified inside the function 146 and/or AI 147 by any other method provided by the computing component (e.g., processing device) 110. In this example, the system 100E has two lists of IPs: a list of IPs for host devices 160A providing the production version of the website (e.g., configuration resource 163A), and a list of IPs for host devices 160B providing the staging version of the website (e.g., configuration resource 163B). Once the function 146 and/or AI 147 has identified the intention of the client device (e.g., input component) 120, the function 146 and/or AI 147 picks the most appropriate configuration resource 163 (e.g., IP address) for the context 128 (e.g., environment data 127) of the client device (e.g., input component) 120, returning the configuration resource 163 (e.g., IP address) with the lowest latency relative to the client device (e.g., input component) 120 which also serves the version desired by the client device (e.g., input component) 120.

Using FIG. 1E2 for the scenario in which different versions of the same website are provided to different client devices (e.g., input components) 120 using the same domain name, let's assume now that there are two client devices (e.g., input components) 120: client device (e.g., input component) 120A known to be desirous to access version 1.0 of a REST API (e.g., configuration resource 163A) and client device (e.g., input component) 120B known to be desirous to access version 1.2 of a REST API (e.g., configuration resource 163B). The intent of the client devices (e.g., input components) 120A-B is part of context 128 (e.g., environment data 127), which can be explicitly given through the configuration requests 125A-B (e.g., queries), assumed by the computing component (e.g., processing device) 110 and added to the context 128 when calling the function 146 and/or AI 147, or identified inside the function 146 and/or AI 147 by any other method (e.g., dynamic configuration file 142, dynamic variable 144) provided by the computing component (e.g., processing device) 110. In this example, the system 100F has two lists of IPs: a list of IPs for host devices 160A providing version 1.0 of REST API (e.g., configuration resources 163A), and a list of IPs for host devices 160B providing version 1.2 of the REST API (e.g., configuration resources 163B). Once the function 146 and/or AI 147 has identified the intention of the client, the function 146 and/or AI 147 picks the most appropriate IP address (e.g., configuration resource 163A or 163B) for the context 128 of the client device (e.g., input component) 120, returning the IP (e.g., configuration resource 163) with the lowest latency relative to the client device (e.g., input component) 120 which also serves the version desired by the client device (e.g., input component) 120.

Using FIG. 1E2 for another scenario in which different configuration resources 163 are provided to different client devices (e.g., input components) 120 using the same word processor (e.g., computing component (e.g., processing device) 110), let's assume now that there are two client devices (e.g., input components) 120: fist client device (e.g., input component) 120A known to be desirous to access a word processor configured to produce documents using standard letter size paper (e.g., configuration resource 163A) and second client device (e.g., input component) 120B known to be desirous to access a word processor configured to produce documents using A4 size paper (e.g., configuration resource 163B). The intent of the client devices (e.g., input components) 120A-B is part of context 128 (e.g., environment data 127), which can be explicitly given through the configuration requests 125A-B (e.g., queries), assumed by the word processor (e.g., computing component (e.g., processing device) 110) and added to the context 128 when calling the function 146 and/or AI 147, or identified inside the function 146 and/or AI 147 by any other method (method (e.g., dynamic configuration file 142, dynamic variable 144) provided by the word processor (e.g., computing component (e.g., processing device) 110). Once the function 146 and/or AI 147 has identified the intention of the client device (e.g., input component) 120A-B, the function 146 and/or AI 147 picks the most appropriate paper size (e.g., configuration resource 163A or 163B) for the context 128 of the client devices (e.g., input components) 120A-B, returning the paper size (e.g., configuration resource 163)

with the appropriate paper size relative to the client device (e.g., input component) 120 which also serves the paper size desired by the client device (e.g., input component) 120. It should be noted that the first client device (e.g., input component) 120A and the second client device (e.g., input component) 120B may reflect separate users accessing a computing component (e.g., processing device) 110 on the same device who require different configuration resources 163.

In some embodiments, the ultimate goal of a unified programmable dynamic context-aware configuration is to liberate the computing component (e.g., processing device) 110 from the limitations imposed by static configuration files and unlock the potential of the computing component (e.g., processing device) 110 to reduce resource consumption and enable a safer, smarter, and more efficient use of the computing component (e.g., processing device) 110.

The unified programmable dynamic context-aware configuration may include a file (e.g., dynamic configuration file 142) that contains an algorithm (e.g., dynamic variable 144) defining the application settings for a given computing component (e.g., processing device) 110. It is possible for a single file (e.g., dynamic configuration file 142) to contain multiple application setting configurations. It is also possible for a single file (e.g., dynamic configuration file 142) to contain the configuration of a single application setting or for multiple files to define a single application setting, with each file (e.g., dynamic configuration file 142) containing a single application setting or any possible combination of files, application settings, or application setting configurations.

FIGS. 2A1-C1 illustrate dynamic configuration files 142, according to certain embodiments. FIGS. 2A1-C1 may illustrate three of many possible variations of dynamic configuration files 142. Dynamic configuration file 142A1 of FIG. 2A1 may contain more than one domain zones configurations 202A-B, each one containing different multiple domain zone records 204A-D (e.g., dynamic variables 144). In some embodiments, a domain zone record 204 can be a static or dynamic configuration (e.g., depending on how defined by system administrator (e.g., DA) device 150). FIG. 2B1 illustrates a dynamic configuration file 142B1 that is a single configuration file containing a single domain zone configuration 202C that has multiple distinct domain record configurations 204E-F. FIG. 2C1 illustrates a dynamic configuration file 142C1 that contains distinct domain record configurations 204G-H that are not inside a clearly declared domain zone configuration 202. These examples demonstrate the flexibility of the system that allows a large combination of dynamic configuration file structures that allows the system administrator (e.g., DA) device 150 to properly dimension and separate configurations in a manner that works best for a specific setup.

FIGS. 2A2-C2 illustrate dynamic configuration files 142, according to certain embodiments. FIGS. 2A2-C2 may illustrate three of many possible variations of dynamic configuration files 142. Dynamic configuration file 142A2 of FIG. 2A2 may contain more than one computing component configuration sections 203A-B, each one containing different multiple application settings 205A-F (e.g., dynamic variables 144). In some embodiments, an application setting 205 can be a static, dynamic, or semi-dynamic configuration (e.g., depending on how defined by client device (e.g., input component) 120). FIG. 2B2 illustrates a dynamic configuration file 142B2 that is a single configuration file containing a single application setting configuration 203C that has multiple distinct application settings 205G-I. FIG. 2C2 illustrates a dynamic configuration file 142C2 that contains distinct application settings 205J-L that are not inside a clearly declared computing component configuration section 203. These examples demonstrate the flexibility of the system that allows a large combination of dynamic configuration file structures that allows the input component 120 to properly dimension and separate configurations in a manner that works best for a specific setup.

For the sake of simplicity in this explanation, the term dynamic configuration file 142 may be used to denote a file that contains any of the following: functions; classes; objects; constants; variables (e.g., dynamic variables 144); comments; decorators; arrays; dictionaries; data structures; algorithms; or any other programming structures (written inside one or multiple files) that allows the programmatic and dynamic configuration of application settings.

In some embodiments, the dynamic configuration file 142 may be created by the computing component (e.g., processing device, DNS Server) 110 in the same manner that the computing component (e.g., processing device, DNS Server) 110 creates a domain zone and/or application setting configuration with static files, except that this unified programmable dynamic context-aware configuration allows the computing component (e.g., processing device, DNS Server) 110 to define both static and dynamic application setting configurations.

A configuration file may be shown in Table 1.

TABLE 1

| | | |
|---|---|---|
| 1: $TTL 3600 | | |
| 2: @ | IN SOA | ns1.example.com. admin.example.com. ( |
| 3: | | 2023102402 |
| 4: | | 3600 |
| 5: | | 900 |
| 6: | | 604800 |
| 7: | | 3600 |
| 8: | | ) |
| 9: | | |
| 10: @ | IN NS | ns1.example.com. |
| 11: @ | IN NS | ns2.example.com. |
| 12: @ | IN NS | ns3.example.com. |
| 13: @ | IN NS | ns4.example.com. |
| 14: | | |
| 15: @ | IN A | 45.23.129.8 |
| 16: @ | IN A | 178.56.241.12 |
| 17: @ | IN A | 202.7.89.154 |
| 18: @ | IN A | 11.145.203.77 |
| 19: | | |
| 20: www | IN CNAME | example.com. |

The configuration file shown in Table 1 may be from a DNS server and may be a static configuration file. In this configuration file of Table 1, a fictitious but syntactically correct domain zone configuration for example.com is defined with various different types of domain zone records in the configuration file.

A substantially equivalent of the same configuration written using a unified programmable dynamic context-aware configuration file is shown in a dynamic configuration file 142 shown in Table 2.

TABLE 2

```
1: TTL__example_com = 3600
2:
3: function SOA__example_com(request):
4:     return {"serial_number": 2023102402,
5:         "refresh": TTL__example_com,
6:         "retry": 900,
7:         "expire": 604800,
```

TABLE 2-continued

```
 8:         "default_ttl": TTL__example_com}
 9:
10: function NS__example_com(request):
11:     return {"ns1.example.com",
12:         "ns2.example.com",
13:         "ns3.example.com",
14:         "ns4.example.com"}
15:
16: function A__example_com(request):
17:     return round_robin(request,
18:         {"45.23.129.8",
19:         "178.56.241.12",
20:         "202.7.89.154",
21:         "11.145.203.77"})22:
23: function CNAME__example_com(request):
24:     return "example.com"
```

The dynamic configuration file 142 of Table 2 may define substantially the same basic domain zone configuration for example.com but may allow for the valuation of context when an A query on example.com is sent against this authoritative nameserver. The example function A__example_com(request) (see line 16 of Table 2) is called with the request 124 and environment data 127, and inside the function (e.g., dynamic variable 144), the system administrator (e.g., DA) device 150 decided that the response 114 should prioritize load balancing using the round_robin (see line 17 of Table 2) technique against the IPs of the available host devices 160 responsible for that domain name (see lines 18-21 of Table 2). That is a simple example of dynamic configuration. The programming language used in this dynamic configuration file 142 of Table 2 is just an example and the underlying language or syntax used is irrelevant to the concept of this present disclosure as long as the language provides the elements that allow for the unified programmable dynamic context-aware elements depicted throughout the present disclosure. The domain record configuration defined by the function SOA_example_com(request) (see lines 3-8 of Table 2) represents an example of static domain record configuration. No algorithmic elements inside the function alter the response based on a context. The same behavior is observed in the domain record configurations for NS__example_com(request) (see lines 10-14 of Table 2) and CNAME__example_com(request) (see lines 23-24 of Table 2). The domain record configuration defined by A__example_com(request) (see lines 16-21 of Table 2), however, depicts a dynamic configuration that rotates the response based on the context provided by the computing component (e.g., processing device) 110 through the request argument, letting the function round_robin( ) (line 17 of Table 2) know how to evenly rotate the host devices 160 based on that context. The dynamic configuration file 142 also contains a variable called TTL__example_com (line 1 of Table 2) which has the same effect as the configuration $TTL (line 1 of the static configuration file Table 1). In summary, the dynamic configuration file 142 of Table 2 illustrates an example of how a domain zone and domain zone records may be configured using a unified programmable dynamic context-aware configuration language.

A dynamic zone record configuration varies in behavior based on the context in which a query is executed. Another simplistic example would be a domain zone record containing IP addresses for multiple host devices 160 spread around the world. The dynamic zone record configuration is capable of evaluating the context of the query, understanding which IP addresses would yield the lowest latency for the client, and returning that single IP address as a response to the query. The dynamic nature lies in its ability to make a real-time decision based on any number of factors that the system administrator (e.g., DA) device 150 pre-determined at the time the domain record was created.

In some embodiments, a dynamic configuration file 142 may be illustrated in Table 3.

TABLE 3

```
1: function A__example_com(request):
2:     return closest_of(request,
3:         {"45.23.129.8",
4:         "178.56.241.12",
5:         "202.7.89.154",
6:         "11.145.203.77"})
```

Dynamic configuration file 142 of Table 3 shows how a unified programmable dynamic context-aware domain zone record configuration function called A__example_com(request) (lines 1-6 of Table 3) would be written in a such way that the domain zone record configuration function would return only one IP address from a list of host devices 160 (lines 3-6 of Table 3) that is the closest to the TP address of the client device (e.g., input component) 120 who issued the request 124 (e.g., query), as stored in the request 124 (lines 1-2 of Table 3) provided to the function as an argument and passed along to another function called closest_of (line 2 of Table 3) that compares the geographical location of the client device (e.g., input component) 120 with the geographical location of all host devices 160 in the list provided, returning the IP address, host device 160, and/or configuration resource 163 that would provide the lowest latency relative to the client device (e.g., input component) 120.

A static zone record configuration, in contrast, is a conventional configuration that never evaluates the context and always resolves to the same value. Despite being a programmable configuration, the function returning the response could be static, as not all domain record configurations need a dynamic evaluation at runtime.

In some embodiments, a configuration file 142 may be illustrated in Table 4.

TABLE 4

```
1: function CNAME__example_com(request):
2:     return "example.com"
```

Dynamic configuration file 142 in Table 4 may be an example of a simple static domain zone record configuration named CNAME__example_com(request) (lines 1-2 of Table 4) using the unified programmable dynamic context-aware configuration language. Although the function (e.g., dynamic variable 144) receives the request as an argument (line 1 of Table 4), the function does not make use of the context anywhere inside the function and the function returns a value that is effectively a constant (line 2 of Table 4), never changing regardless of the state in which the configuration is run. The examples in Tables 1-4 illustrate the power and flexibility of a unified programmable dynamic context-aware configuration language that allows for the definition of static and dynamic configurations, permitting the better accommodation of needs and scales across a larger range of use cases while retaining simplicity and easiness of use.

After creating a dynamic configuration file 142 for a domain zone that the system administrator (e.g., DA) device 150 controls, the System administrator (e.g., DA) device 150 submits the dynamic configuration file 142 to the Computing component (e.g., DNS server) 110. The computing component (e.g., processing device) 110 performs checks on the dynamic configuration file 142, and if the dynamic configuration file 142 is in proper working condition, the domain zone configuration becomes available to receive requests 124 (e.g., queries) through the Computing component (e.g., DNS server) 110.

FIGS. 3A-G illustrate systems 300A-G associated with unified programmable dynamic context-aware configurations, according to certain embodiments.

FIG. 3A1 may provide a schematic depiction of submitting a new dynamic configuration file 142 to the computing component (e.g., DNS server) 110. System administrator (e.g., DA) device 150 may generate (e.g., writes) a new dynamic configuration file 142 for the domain example.com named example.com.conf which contains some or all of the relevant domain zone configurations for that domain. The system administrator (e.g., DA) device 150 then submits this new configuration for deployment with the computing component (e.g., DNS server) 110. Before proceeding with the deployment of the dynamic configuration file 142, which contains algorithms (e.g., dynamic variables 144) that could contain bugs, malicious code, or be syntactically incorrect, the computing component (e.g., DNS server) 110 offloads the verification process to a process 302 (e.g., an external isolated process, an internal process, etc.) which then performs all verifications. If the new configuration passes all checks, the new configuration is deployed with the computing component (e.g., DNS server) 110 (see flow 304), replacing any previous configuration if any existed previously. If the new configuration fails any of the checks (see flow 306), the system administrator (e.g., DA) device 150 receives a detailed message explaining which checks failed and the new configuration is discarded without being submitted for deployment with the computing component (e.g., DNS server) 110. There are more elements in this process, which will be explained in more details later in this document.

Upon receiving a request 124 (e.g., query) for which the computing component (e.g., DNS server) 110 is an authoritative nameserver with a unified programmable dynamic context-aware configuration file (e.g., dynamic configuration file 142) for the domain in the request 124 (e.g., query), the computing component (e.g., DNS server) 110 will perform several tasks to handle and respond to the request 124 (e.g., query) properly. In some embodiments, the operations (e.g., core operations) may include one or more of:

1. Check the cache in memory.
2. Failing to retrieve from the cache, the computing component (e.g., DNS server) 110 refers to in-memory index of the computing component (e.g., DNS server) 110 to know which dynamic configuration file 142 should be used to answer this request 124 (e.g., query).
3. The dynamic configuration 142 file is loaded, the appropriate function (e.g., dynamic variable 144) that handles the specific domain record is called, and the context (e.g., client context 126) of the request 124 (e.g., query) is passed on to the function as an argument.
4. The function will perform computation of the function and return the response 114 to the caller (e.g., client device (e.g., input component) 120).
5. If the domain record configuration is of a static nature, the response 114 is stored in the cache (e.g., of the computing component (e.g., DNS server) 110 with the indicated expiration set by the time-to-live (TTL) defined by the system administrator (e.g., DA) device 150 for the record (e.g., network resource 162). If the function is of a dynamic nature, the system administrator (e.g., DA) device 150 can choose to cache the response 114 based on context rules.
6. The response 114 is sent back to the client device (e.g., input component) 120.

FIG. 3A2 may provide a schematic depiction of submitting a new dynamic configuration file 142 to the computing component (e.g., processing device) 110. Client device (e.g., input component) 120 may generate (e.g., writes) a new dynamic configuration file 142 for the application setting page_width which contains some or all of the relevant page size configurations for that computing component (e.g., processing device) 110. The client device (e.g., input component) 120 then submits this new configuration for deployment with the computing component (e.g., processing device) 110. Before proceeding with the deployment of the dynamic configuration file 142, which contains algorithms (e.g., dynamic variables 144) that could contain bugs, malicious code, or be syntactically incorrect, the computing component (e.g., processing device) 110 offloads the verification process to a new configuration check process 302 (e.g., an external isolated process, an internal process, etc.) which then performs all verifications. If the new configuration passes all checks, the new configuration is deployed with the computing component (e.g., processing device) 110 (see flow 304), replacing any previous configuration if any existed previously. If the new configuration fails any of the checks (see flow 306), the input component 120 receives a detailed message explaining which checks failed and the new configuration is discarded without being submitted for deployment with the computing component (e.g., processing device) 110. There are more elements in this process, which will be explained in more details later in this document.

Upon receiving a configuration request 125 (e.g., query) with a unified programmable dynamic context-aware configuration file (e.g., dynamic configuration file 142) for the application setting in the configuration request 125 (e.g., query), the computing component (e.g., processing device) 110 will perform several tasks to handle and respond to the configuration request 125 (e.g., query) properly. In some embodiments, the operations (e.g., core operations) may include one or more of:

1. Check the cache in memory.
2. Failing to retrieve from the cache, the computing component (e.g., processing device) 110 refers to in-memory application settings of the computing component (e.g., processing device) 110 to know which dynamic configuration file 142 should be used to answer this configuration request 125 (e.g., query).
3. The dynamic configuration 142 file is loaded, the appropriate function (e.g., dynamic variable 144) that handles the specific application setting is called, and the context (e.g., environment data 127) of the configuration request 125 (e.g., query) is passed on to the function as an argument.
4. The function will perform computation of the function and return the configuration response 115 to the caller (e.g., client device (e.g., input component) 120).
5. If the application setting configuration is of a static nature, the configuration response 115 is stored in the cache (e.g., of the computing component (e.g., processing device) 110 with the indicated expiration set by the time-to-live (TTL) defined by the computing component (e.g., processing device) 110 for the record (e.g., configuration resource 163). If the function is of a dynamic nature, the client device (e.g., input component) 120 can choose to cache the configuration response 115 based on context rules.

6. The configuration response 115 is sent back to the client device (e.g., input component) 120.

FIG. 3B illustrates a system 300B associated with unified programmable dynamic context-aware configuration, according to certain embodiments. FIG. 3B may provide a schematic description of how a computing component (e.g., DNS server) 110 integrated with a unified programmable dynamic context-aware configuration language would process a request 124 (e.g., query) from a client device (e.g., input component) 120 under two possible scenarios: first when the computing component (e.g., DNS server) 110 is the authoritative name server for the domain in the request 124 (e.g., query), second when the computing component (e.g., DNS server) 110 is not the authoritative name server for the domain in the request 124 (e.g., query) and the computing component (e.g., DNS server) 110 uses the DNS protocol to resolve the request 124 (e.g., query) by finding the authoritative nameserver 310A-C for the domain and uses the authoritative nameserver 310A-C to respond the client device.

In the first scenario, the client device (e.g., input component) 120 directly queries the computing component (e.g., DNS server) 110 which also happens to be the authoritative name server for the domain in the request 124 (e.g., query). If the request 124 (e.g., query) is stored in cache 312 the answer is returned substantially immediately without passing the request 124 (e.g., query) any further. If the response 114 is not cached (see flow 314), the computing component (e.g., DNS server) 110 checks its index 316 to find whether the queried domain is in one of the dynamic configuration files 142. In this scenario, the request 124 (e.g., query) can be resolved with one of the indexed configurations and the request 124 (e.g., query) and client context 126 are passed on to the domain zone record configuration function 318 which will process the request 124 (e.g., query) with the given client context 126 and return a response 114 back to the caller, which is then returned back to the client device (e.g., input component) 120. At some point, the response 114 is also stored in the cache 312 for faster retrieval next time that a new request 124 (e.g., query) is a cache hit.

In the second scenario, the client device (e.g., input component) 120 directly queries the computing component (e.g., DNS server) 110 which is not the authoritative name server for the domain in the request 124 (e.g., query). If the request 124 (e.g., query) is stored in cache 312 the answer is returned immediately without passing the request 124 (e.g., query) any further. If the response 114 is not cached (see flow 314), the computing component (e.g., DNS server) 110 checks the index 316 of the computing component (e.g., DNS server) 110 to find whether the queried domain is in one of the dynamic configuration files 142. In this scenario, the request 124 (e.g., query) cannot be resolved with one of the indexed configurations and the computing component (e.g., DNS server) 110 starts the process of resolving the name (e.g., remote name resolution 320) through the DNS protocol by first checking with the root name server 310A for the location of the relevant top-level domain (TLD) nameservers 310B for the domain in the request 124 (e.g., query). With the location of the TLD nameservers 310B, the computing component (e.g., DNS server) 110 then queries one of the TLD nameservers 310B for the location of the authoritative nameservers 310C for the domain in the request 124 (e.g., query). With the location of the authoritative nameservers 310C, the computing component (e.g., DNS server) 110 then forwards the request 124 (e.g., query) to the authoritative nameservers 310C, receives a response 114 for that request 124 (e.g., query), and passes the response 114 back (see flow 322) to the client device (e.g., input component) 120. At some point, the response 114 is also stored in the cache 312 for faster retrieval next time that a new request 124 (e.g., query) is a cache hit.

FIG. 3B1 illustrates a system 300B1 associated with unified programmable dynamic context-aware configuration, according to certain embodiments. FIG. 3B may illustrate how the unified programmable dynamic context-aware configuration-enabled computing component (e.g., DNS server) 110 is fully compatible with the DNS protocol and capable responding to all types of requests 124 (e.g., DNS queries) regardless of whether or not the requests 124 are queries to a domain for which the computing component (e.g., DNS server) 110 is an authoritative nameserver.

The dynamic configuration file 142 can be loaded in different ways, including calling the dynamic configuration file 142 as a separate process, as a thread, importing and running inside the same environment, performing a remote call, using sockets for communication, or even running the configuration program in a sandboxed and isolated environment. The decision on how to execute the configuration program is based on the programming language capabilities, user requirements, and level of trust between the DNS service provider and the system administrator (e.g., DA) device 150.

The dynamic configuration file 142 can also be loaded in memory 326 and remain available at runtime throughout the life of the process of the computing component (e.g., DNS server) 110, or the dynamic configuration file 142 could be loaded on demand and removed from memory immediately or sometime after the response is produced.

FIG. 3B2 may illustrate a system 300B2 associated with unified programmable dynamic context-aware configuration, according to certain embodiments. FIG. 3B2 may provide a schematic description of a computing component (e.g., processing device) 110 integrated with a unified programmable dynamic context-aware configuration language processing a configuration request 125 (e.g., request) from a client device (e.g., input component) 120 demonstrating the interaction with the cache 312.

In some embodiments, the client device (e.g., input component) 120 sends a configuration request 125 to the computing component (e.g., processing device) 110. The dynamic configuration component 112 receives the configuration request 125 and checks whether the requested configuration is stored in cache 312. If the requested configuration response 115 is stored in cache 312, the configuration response 115 is returned substantially immediately without passing the configuration request 125 (e.g., request) any further. If the requested configuration response 115 is not cached (see flow 314), the computing component (e.g., processing device) 110 checks the configuration index 315 of the computing component 110 (e.g., processing device) to determine whether the requested configuration is in one of the dynamic configuration files 142 (e.g., indexed in the configuration index 315). If the requested configuration is in one of the dynamic configuration files indexed in the configuration index 315, the configuration request 125 (e.g., request) can be resolved with one of the indexed configurations and the configuration request 125 (e.g., request) and context 128 are passed on to the domain zone record configuration function 318 which then processes the configuration request 125 (e.g., request) with the given context 128 and return a configuration response 115 back to the caller, which is then returned back to the client device (e.g., input device) 120. At some point, the configuration response 115 is also stored in the cache 312 for faster retrieval next time that a new configuration request 125 (e.g., request) is received that matches the configuration response 115 (e.g., is a cache hit).

The dynamic configuration file 142 can be loaded in different ways, including as a separate process, as a thread, importing and running inside the same environment, performing a remote call, using sockets for communication, or even running the configuration program in a sandboxed and isolated environment. The decision on how to execute the configuration program is based on the type of application, programming language capabilities, user requirements, and other requirements.

The dynamic configuration file 142 can also be loaded in memory (e.g., memory 326 of FIG. 3C) and remain available at runtime throughout the life of the process of the computing component (e.g., processing device) 110, or the dynamic configuration file 142 could be loaded on demand and removed from memory immediately or sometime after the response is produced.

Figure 3C:
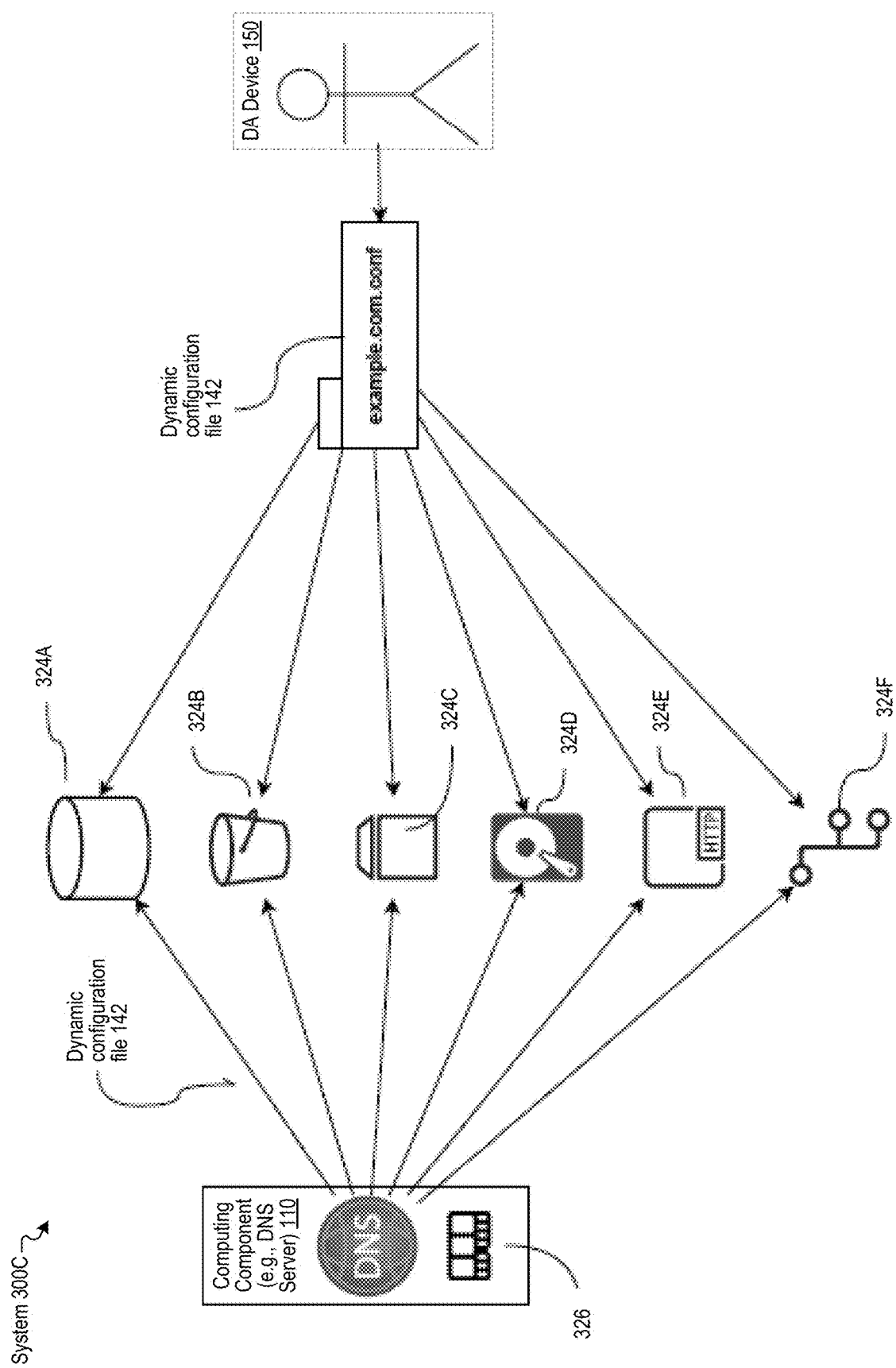

FIG. 3C illustrates some of the various ways in which the computing component (e.g., DNS server) 110 is capable of receiving new dynamic configuration files 142 from the system administrator (e.g., DA) device 150. Among multiple storage solutions, FIG. 3C lists the following alternatives as examples:

1. Relational and non-relational databases 324A can be used to store the contents of a dynamic configuration file 142. The manner in which this dynamic configuration file 142 is structured inside the database can vary, but in summary, the computing component (e.g., DNS server) 110 is able to query the database 324A and notice any configuration changes.

2. Object storage services 324B

3. Network Attached Volumes 324C

4. Local Hard or Solid State Disks 324D

5. Remote Web Server or API endpoint 324E that returns the dynamic configuration file 142 upon receiving an HTTP/S request.

6. Version control systems/repositories 324F such as Git, Subversion (SVN), Concurrent Versions System (CVS), etc.

Regardless of which alternative is used, a configuration repository 324 may be referred to as the place where the computing component (e.g., DNS server) 110 is configured to look for new dynamic configuration files 142.

Upon adopting a new configuration, the computing component (e.g., DNS server) 110 may be configured to keep the dynamic configuration file 142 stored in the configuration repository 324 or have the dynamic configuration file 142 loaded in memory 326 as a text, compiled application, byte code, containerized, or any other convenient format for fast retrieval and execution.

The form by which the computing component (e.g., DNS server) 110 determines whether there has been a change in the dynamic configuration file 142 includes but is not limited to: comparing the computed hash of existing configuration against the equivalent dynamic configuration file 142 in the configuration repository 324; comparing deltas between files (e.g., dynamic configuration files 142); and/or comparing the file creation or change date, or alternatives as simple as setting up flag attributes that manually indicate that a dynamic configuration file 142 has been changed.

In the dynamic configuration file 142, it is also possible that the system administrator (e.g., DA) device 150 had configured pre- and post-processing filters. A pre-processing filter is a function that is executed immediately before calling the domain record configuration function. The pre-processing filter is capable of manipulating the request 124 (e.g., query), the client context 126, or performing substantial identical routine algorithms that are to be performed against all or several domain records. The pre-processing filter is not a requirement but is made available to allow the system administrator (e.g., DA) device 150 to develop a more reusable and maintainable dynamic configuration file 142. After the pre-processing filter, the domain record function is called and the adjustments made by the pre-processing filter are available to the domain record function. Upon returning, a response 114 is also subject to being manipulated by a post-processing filter before the final response 114 is sent back to the computing component (e.g., DNS server) 110. This post-processing has a similar goal as the pre-processing filter, except that the post-processing filter has the ability to manipulate the response 114 before the response 114 is sent back to the computing component (e.g., DNS server) 110, whereas the pre-processing filter is intended to manipulate the request 124 (e.g., query) before the request 124 is sent to the domain zone record function (e.g., dynamic variable 144).

Figure 3D:
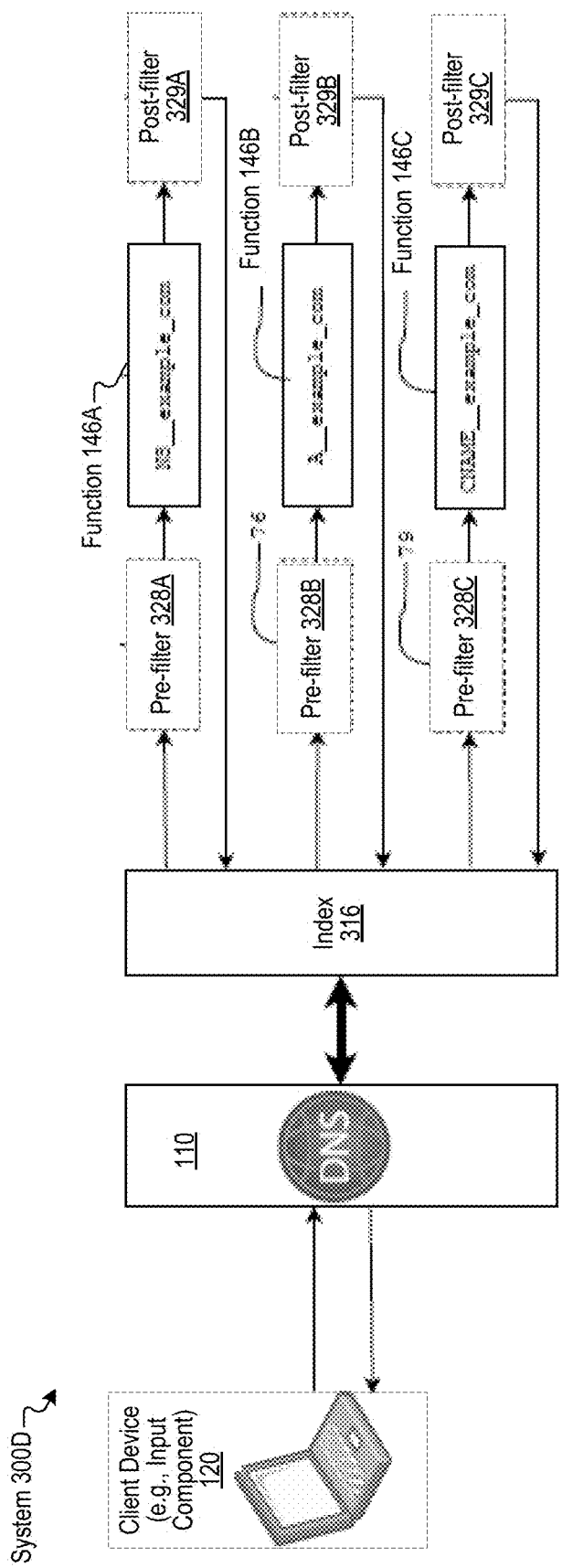

FIGS. 3D-E illustrate system 300D-E associated with unified programmable dynamic context-aware configurations, according to certain embodiments. FIGS. 3D-E illustrate two of the many possible uses of pre- and post-processing filters in dynamic configuration files 142.

FIG. 3D illustrates how optional distinct pre-processing filters 328A-C can be added in front of each respective domain zone record configuration function 146A-C. FIG. 3D further depicts the optional use of distinct post-processing filters 329A-C receiving the return of each respective domain zone record configuration function 146A-C for processing before returning the final response back to the Index 315, which then returns each respective domain zone record configuration function 146A-C to the main computing component (e.g., DNS server) 110 process to be finally returned back to the client device (e.g., input component) 120.

FIG. 3E1 illustrates another possible application of pre- and post-processing filters. In this example, the system administrator (e.g., DA) device 150 has prepared a single generic pre-processing filter 328 that is meant to intercept all requests and treat the requests prior to sending the requests to select domain zone record configuration functions 146A-C. The system administrator (e.g., DA) device 150, in this example, has also set up a single generic post-processing filter 329 responsible for intercepting the return of all domain zone record configuration functions 146A-C and performing post-processing operations before sending the final response back to the Index 315, which then passes all domain zone record configuration functions 146A-C back to the main computing component (e.g., processing device) 110 process to return back to the client device (e.g., input component) 120.

A combination of these scenarios is also possible, with some pre-processing filters 328 interfacing with a single domain zone record configuration function while another pre-processing filter 328 interfaces with multiple distinct domain zone record configuration functions. The use of a pre-processing filter 328 does not require the use of a post-processing filter 329 for the same domain zone record configuration function and vice-versa.

A system administrator (e.g., DA) device 150 can label a domain zone record configuration as static, fully dynamic, or semi-dynamic. The computing component (e.g., DNS server) 110 may always try to cache the responses 114, but there is a difference in behavior between the types of domain zone record functions. A static function is substantially always cached after responding successfully, following the expiration time defined by the System administrator (e.g., DA) device 150 in the TTL. A fully dynamic function is cached with a strict context, also following the expiration defined by the system administrator (e.g., DA) device 150 in the TTL. In order for a strict context to be a cache hit, the context must strictly match with the cached response. In a semi-dynamic function, the system administrator (e.g., DA) device 150 can configure what parts of the context must be a match for a cache hit. Since cached responses offer significantly lower latency over running a domain zone record function to retrieve the response, the system administrator (e.g., DA) device 150 has the ability to fine-tune how caching is done to each domain zone record to maximize performance and other goals.

FIG. 3E2 illustrates another possible application of pre- and post-processing filters. In this example, the client device (e.g., input component) 120 has prepared a single generic pre-processing filter 328 that is meant to intercept all requests and treat the requests prior to sending the requests to select application setting configuration functions 146A-C. The client device (e.g., input component) 120, in this example, has also set up a single generic post-processing filter 329 responsible for intercepting the return of all application setting configuration functions 146A-C and performing post-processing operations before sending the final response back to the computing component (e.g., processing device) 110, which then passes back to the client device (e.g., input component) 120.

A combination of these scenarios is also possible, with some pre-processing filters 328 interfacing with a single application setting configuration function while another pre-processing filter 328 interfaces with multiple distinct application setting configuration functions. The use of a pre-processing filter 328 does not require the use of a post-processing filter 329 for the same application setting configuration function and vice-versa.

A client device (e.g., input component) 120 can label an application setting configuration as static, fully dynamic, or semi-dynamic. The computing component (e.g., processing device) 110 may always try to cache the configuration responses 115, but there is a difference in behavior between the types of application setting configuration functions. A static function is substantially always cached after responding successfully, following the expiration time defined by the client device (e.g., input component) 120. A fully dynamic function is cached with a strict context, also following the expiration defined by the client device (e.g., input component) 120. In order for a strict context to be a cache hit, the context must strictly match with the cached response. In a semi-dynamic function, the client device (e.g., input component) 120 can configure what parts of the context must be a match for a cache hit. Since cached responses offer significantly lower latency over running an application setting configuration function to retrieve the response, the client device (e.g., input component) 120 has the ability to fine-tune how caching is done to each application setting to maximize performance and other goals.

FIG. 3F1 illustrates a system 300F1 associated with unified programmable dynamic context-aware configuration, according to certain embodiments. FIG. 3F1 shows an example of a computing component (e.g., DNS server) 110 with an embedded cache system 330 that keeps available the most recent unexpired responses from domain zone record configuration function responses and makes the responses more readily available to queries received by a client device (e.g., input component) 120. In this example, one of the cached responses is from a static domain zone record configuration function 146A. Any client device (e.g., input component) 120, from anywhere in the world, querying a name resolution for an A record on example.com will be served a response 114 directly from the cache of function 146A regardless of context because the original domain zone record configuration function was also static and the response 114 would not have changed based on the context of the client device (e.g., input component) 120. This may be the current behavior observed in all DNS servers. Another cached response in FIG. 3F is from a semi-dynamic domain zone record configuration function 146B. Client devices 120 that have an IP address inside the 145.0.0.0/8 network range querying a name resolution for A record on api.example.com will receive a response 114 straight from the cache of function 146B no matter where they're located in the world. The cache system mimics the behavior of the domain zone record configuration function that generated the cached response. If a client device (e.g., input component) 120 that has an IP in any other network queries this Computing component (e.g., DNS server) 110 for an A record on api.example.com, the client device (e.g., input component) 120 may not receive a response 114 from the cache. Instead, the Computing component (e.g., DNS server) 110 may consider the request 124 (e.g., query) a cache miss and may proceed with processing as previously demonstrated in FIG. 3B (flow 314). Another cached response in FIG. 3F1 is from a dynamic domain zone record configuration function 146C. In this case, only client devices 120 that are geolocated in Austin Texas, and have an IP address within the network 145.67.89.0/24 querying a name resolution for A record on app.example.com will be served a response straight from the cache. Everyone else, even client devices 120 within that network but outside of Austin Texas are going to follow the regular response processing described in FIG. 3B (flow 314). This cache system gives the system administrator (e.g., DA) device 150 the ability to use a unified programmable dynamic context-aware configuration language while at the same time making smart use of cache systems to reduce latency where possible without compromising on some aspects of the dynamic nature of the system.

As for the programming language used for the computing component (e.g., DNS server) 110 or the dynamic configuration files 142, the programming languages could be similar or dissimilar, interpreted, compiled, run inside a Java virtual machine (JVM), run inside a container, or executed under any other runtime environment. In some embodiments, the dynamic configuration file 142 is accessible by the computing component (e.g., DNS server) 110, and the computing component (e.g., DNS server) 110 has the capability to process a request 124 (e.g., query) through the dynamic configuration file 142 and extract the response 114 that the System administrator (e.g., DA) device 150 intended for a given context (e.g., client context 126). The programming language may afford all the conveniences that a regular programming language provides to a software engineer. The system administrator (e.g., DA) device 150 may not be required to use any of these capabilities if the capabilities are not required. Examples of capabilities and conveniences include, but are not limited to:

1. Communication with databases and other backend services;
2. Exception handling;
3. Use of appended hardware such as Network Interface Cards, GPUs, Storage devices, and others;
4. Ability to interface with various application programming interfaces (APIs);

5. Multi-threading and concurrency control;
6. Access to system-level functions and configurations;
7. Dynamic memory allocation and garbage collection;
8. Integration with external libraries or frameworks;
9. Object-oriented programming features like inheritance, polymorphism, and encapsulation;
10. Support for cryptographic functions and security protocols;
11. Conditional statements, loops, and other control structures;
12. File system operations such as reading, writing, and streaming;
13. Data serialization and deserialization capabilities;
14. Support for regular expressions and text manipulation functions;
15. Real-time data processing and event-driven programming features;
16. Networking capabilities for sending, receiving, and processing data packets;
17. Use of various data structures like arrays, lists, dictionaries, and trees;
18. Ability to interact with other software components through middleware;
19. Integration with logging, monitoring, profiling, tracing, and debugging tools;
20. Support for internationalization and localization features;
21. Procedural, functional, declarative, logic, imperative, or array programming features;
22. Event-driven or data-driven programming features;
23. All other features and capabilities found in low and high-level programming languages.

In some embodiments, the system administrator (e.g., DA) device 150 can implement and configure health checks for host devices 160 referred to in the domain zone configuration. These health checks are performed regularly at scheduled intervals according to the configuration provided by the system administrator (e.g., DA) device 150 determining the format of the health check and the interval of execution. Host devices 160 that fail the health check are made unavailable for name resolution until the host devices 160 become healthy again, as confirmed by the health check configuration provided by the system administrator (e.g., DA) device 150.

FIG. 3F2 illustrates a system 300F2 associated with unified programmable dynamic context-aware configuration, according to certain embodiments. FIG. 3F2 shows an example of a computing component (e.g., processing device) 110 executing an embedded cache system 330 (e.g., memory) that keeps available the most recent unexpired configuration responses and makes the responses more readily available to configuration requests received by a client device (e.g., input component) 120. In this example, one of the cached responses is from a static configuration function 146A. Any client device (e.g., input component) 120, requesting a configuration response for this configuration will be returned a configuration response 115 directly from the cache of function 146A regardless of context because the original configuration function was also static and the configuration response 115 would not have changed based on the context 128 and or environment data 127 of the client device (e.g., input component) 120. This may be the current behavior observed in all traditional configuration systems. Another cached response in FIG. 3F2 is from a semi-dynamic configuration function 146B. Client devices (e.g., input components)120 requesting a configuration response for this configuration will receive a configuration response 115 straight from the cache of function 146B if certain aspects of the configuration context 128 and or environment data 127 matches the expectations of the cached response. The cache system mimics the behavior of the configuration function that generated the cached response. If a client device (e.g., input device) 120 requests a configuration response with a context 128 and or environment data 127 that does not match the expectations to retrieve a cached response, the client device (e.g., input device) 120 may not receive a configuration response 115 from the cache. Instead, the computing component (e.g., processing device) 110 may consider the configuration request 125 (e.g., request) a cache miss and may proceed with processing as previously demonstrated in FIG. 3B2 (flow 314). Another cached response in FIG. 3F2 is from a dynamic configuration function 146C. In this case, only client devices 120 that sends a configuration request 125 that perfectly overlaps with the context 128 and or environment data 127 from a previously cached configuration response 115 will be served a response straight from the cache. Everyone else, even client devices 120 with an almost perfect overlap in the context 128 and or environment data 127 are going to follow the regular response processing described in FIG. 3B2 (flow 314). This cache system gives ability to use a unified programmable dynamic context-aware configuration language while at the same time making smart use of cache systems to reduce latency where possible without compromising on some aspects of the dynamic nature of the system.

FIG. 3G1 illustrates a system 300G1 associated with unified programmable dynamic context-aware configuration, according to certain embodiments. FIG. 3G1 illustrates a computing component (e.g., DNS server) 110 health check function 336 (see lines 1-6) which defines the manner in which the computing component (e.g., DNS server) 110 performs health checks 332 against a series of servers 332A-D (e.g., host devices 160) registered in one of the domain zone record configuration functions 338 for which the computing component (e.g., DNS server) 110 is an authoritative nameserver. In this example, one of the servers 334C became unavailable, and that was detected by the computing component (e.g., DNS server) 110. Upon detecting that one of the servers 334C has become unhealthy, the computing component (e.g., DNS server) 110 temporarily and automatically removes the unhealthy server 334C from name resolutions, and automatically adds the host back in once the server 334C becomes healthy again.

FIG. 3G2 illustrates a system 300G2 associated with unified programmable dynamic context-aware configuration, according to certain embodiments. FIG. 3G2 illustrates a computing component (e.g., processing device) 110 health check function 336 (see lines 1-6) which defines the manner in which the computing component (e.g., processing device) 110 performs health checks 332 against a series of servers 332A-D (e.g., host devices 160) registered in one of the dynamic configuration functions 338 for which at least one of the computing component (e.g., processing device) 110 configurations refer to in order to return a configuration response. In this example, one of the servers 334C became unavailable, and that was detected by the computing component (e.g., processing device) 110. Upon detecting that one of the servers 334C has become unhealthy, the computing component (e.g., processing device) 110 temporarily and automatically removes the unhealth server 334C from dynamic configuration functions, and automatically adds the host back in once the server 334C becomes healthy again.

In some embodiments, the system administrator (e.g., DA) device 150 would be able to write test suites to check each one of the configuration functions (e.g., domain zone record configurations, domain zone configurations). This feature allows for the system administrator (e.g., DA) device 150 to allow that substantially up to 100% of the domain zone configuration is covered with tests and that substantially all configuration conforms to the standards required by the business. The test suite can be provided inside the dynamic configuration file 142, or through separate test files. The advantage of providing the test suite separate from the dynamic configuration files 142, is that the system administrator (e.g., DA) device 150 has the ability to set up the tests and allow other members of the team to create the domain zone record configurations without also giving the ability to change the test suites. For this application, the tests of the system administrator (e.g., DA) device 150 are able to allow (e.g., guarantee) that the domain zone record configurations are following pre-determined standards and that the team member did not introduce bugs, malicious code, or otherwise infringe on pre-determined rules and namespacing for the domain zone configuration. On the other hand, the system administrator (e.g., DA) device 150 may also allow other team members to implement individual domain zone records and test suites to confirm expected behavior and performance.

An example of a test case in the context of a DNS server is shown in Table 5.

TABLE 5

```
1: function A__example_com(request):
2:    return closest_of(request,
3:          {"45.23.129.8",
4:           "178.56.241.12"})
7:
8: function test__A__example_com( ):
9:    mock_request = Request("45.23.130.42")
10:   check(A__example_com,
11:      mock_request,
12:      "45.23.129.8")
13:
14:   mock_request = Request("178.56.2.58")
15:   check(A__example_com,
16:      mock_request,
17:      "178.56.241.12")
18:
19: function check__A__example_com(request):
20    return tcp_check(port=443,
21:          {"45.23.129.8",
22:           "178.56.241.12",
23:           "202.7.89.154",
24:           "11.145.203.77"})
```

Table 5 is a simplified test case that confirms that the domain zone record configuration function A__example_com (lines 1-4 of Table 5) returns the appropriate IP address based on the location of the client device (e.g., input component) 120 in each one of the mock requests (lines 9, 14 of Table 5). Still in Table 5, it is possible to observe the presence of a health check function (lines 19-24 of Table 5) called check__A__example_com which defines that health checks should be performed by testing whether port 443 is open (line 20 of Table 5) in the given list of host IP addresses (lines 21-24 of Table 5).

A substantially similar example may be illustrated in Tables 6-8, yielding substantially the same result (e.g., the exact same result) but separating the test case (Table 7), the health check function (Table 8), and the domain zone configuration (Table 6) into different files. Other more complex test cases and health checks can be implemented to test for other behaviors depending on the needs of the system administrator (e.g., DA) device 150.

TABLE 6

```
1: function A__example_com(request):
2:    return closest_of(request,
3:          {"45.23.129.8",
4:           "178.56.241.12"})
```

TABLE 7

```
1: function_test__A__example_com( ):
2:    mock_request = Request("45.23.130.42")
3:    check(A__example_com,
4:       mock_request,
5:       "45.23.129.8")
6:
7:    mock_request = Request("178.56.2.58")
8:    check(A__example_com,
9:       mock_request,
10:      "178.56.241.12")
```

TABLE 8

```
1: function check__A__example_com(request):
2:    return tcp_check(port=443,
3:          {"45.23.129.8",
4:           "178.56.241.12",
5:           "202.7.89.154",
6:           "11.145.203.77"})
```

In some embodiments, the computing component (e.g., DNS server) 110 is capable of separating configuration, health check, and test suite file changes into revisions. This allows for the system administrator (e.g., DA) device 150 to keep track of all changes made to the domain zone configuration and enables easy rollback of the dynamic configuration files 142 and test suites to a previous version. The computing component (e.g., DNS server) 110 would also allow the system administrator (e.g., DA) device 150 to verify the differences between the dynamic configuration files 142 and test suite files when needed.

Tables 9-11 and Tables 12-14 depict two different configuration revisions for the domain zone example.com.

TABLE 9

```
1: function A__example_com(request):
2:    return closest_of(request,
3:          {"45.23.129.8",
4:           "178.56.241.12"})
```

TABLE 10

```
1: function test__A__example_com( ):
2:    mock_request = Request("45.23.130.42")
3:    check(A__example_com,
4:       mock_request,
5:       "45.23.129.8")
6:
7:    mock_request = Request("178.56.2.58")
8:    check(A__example_com,
9:       mock_request,
10:      "178.56.241.12")
```

TABLE 11

```
1: function check__A__example_com(request):
2:   return tcp_check(port=443,
3:     {"45.23.129.8",
4:      "178.56.241.12"})
```

TABLE 12

```
1: function A__example_com(request):
2:   return closest_of(request,
3:     {"202.7.89.154",
4:      "11.145.203.77"})
```

TABLE 13

```
 1: function test__A__example_com( ):
 2:   mock_request = Request("202.3.0.91")
 3:   check(A__example_com,
 4:     mock_request,
 5:     "202.7.89.154")
 6:
 7:   mock_request = Request("11.145.3.89")
 8:   check(A__example_com,
 9:     mock_request,
10:     "11.145.203.77")
```

TABLE 14

```
1: function check__A__example_com(request):
2:   return tcp_check(port=443,
3:     {"202.7.89.154",
4:      "11.145.203.77"})
```

The first configuration revision (Tables 9-11) is an old revision that pointed to old IP addresses (Table 9, lines 3-4; Table 10, lines 5, 10; Table 11, lines 3-4) that the system administrator (e.g., DA) device 150 is planning to retire. Upon receiving the necessary changes from the system administrator (e.g., DA) device 150 to the domain zone record configuration (Table 12), test suite (Table 13), and health check (Table 14) files, the computing component (e.g., DNS server) 110 creates a new revision for this new set of files to perform sanity checks, execute the test suite, health checks, and confirm that the new configuration is ready for deployment. Any number of revisions can co-exist inside the same computing component (e.g., DNS server) 110, but that may not mean that all of the revisions are to be active. Moreover, more than one revision can be active at the same time if the computing component (e.g., DNS server) 110 is implementing traffic directing or performing coordinated rollout strategies.

In some embodiments, the computing component (e.g., DNS server) 110 has a dynamic configuration file watcher. This file watcher monitors the configuration source for configuration, health checks, and test suite file changes. Once changes are detected, the computing component (e.g., DNS server) 110 attempts to deploy the changes by first creating a new revision for the new files, then verifying that there are no syntax errors in those dynamic configuration files 142 and that they are in apparent good working condition. If the dynamic configuration files 142 fail this check, the changes are ignored and an error is generated. If the changes pass this sanity check and test suites are provided, the computing component (e.g., DNS server) 110 will execute the tests. All tests are to pass for the configuration to be accepted into production. If any test fails, an error message is generated and the changes are ignored. If all tests pass, or if no tests were provided by the configuration passed sanity checks, the computing component (e.g., DNS server) 110 performs all health checks according to the specifications of the system administrator (e.g., DA) device 150. If at least one server for each domain record zone with a health check configuration passes the health check, the new revision is substantially immediately deployed to production. If at least one domain zone record configuration is left without healthy hosts, the new revision will remain pending until at least one host is confirmed healthy. If after deployment, any of the domain zone records throw an error during execution, the computing component (e.g., DNS server) 110 is to substantially automatically generate an error message and revert the configuration files back to the latest working revision.

Figure 4A:
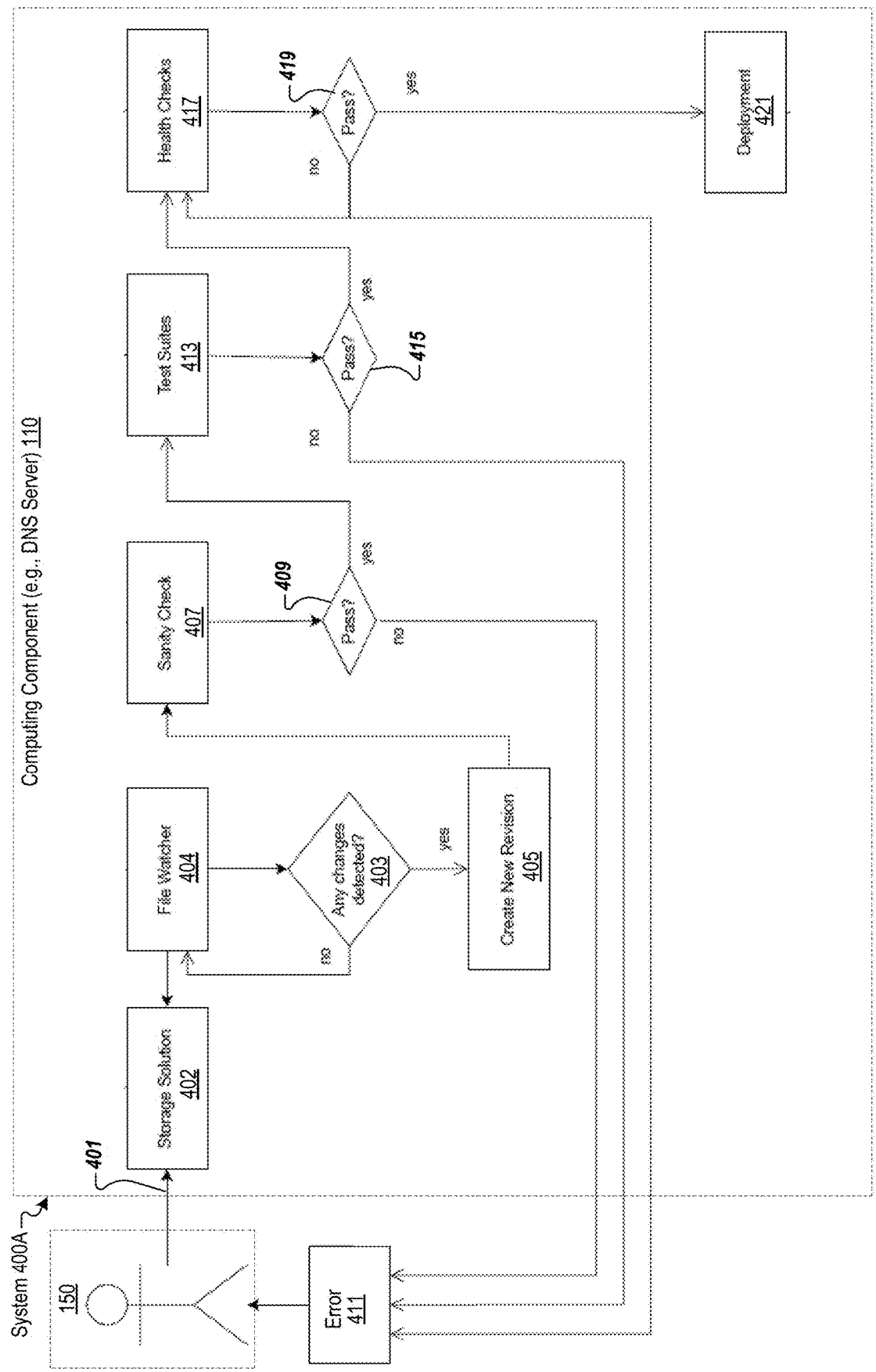
FIGS. 4A-C illustrate flow diagrams of methods associated with unified programmable dynamic context-aware configurations, according to certain embodiments.
Figure 4B:
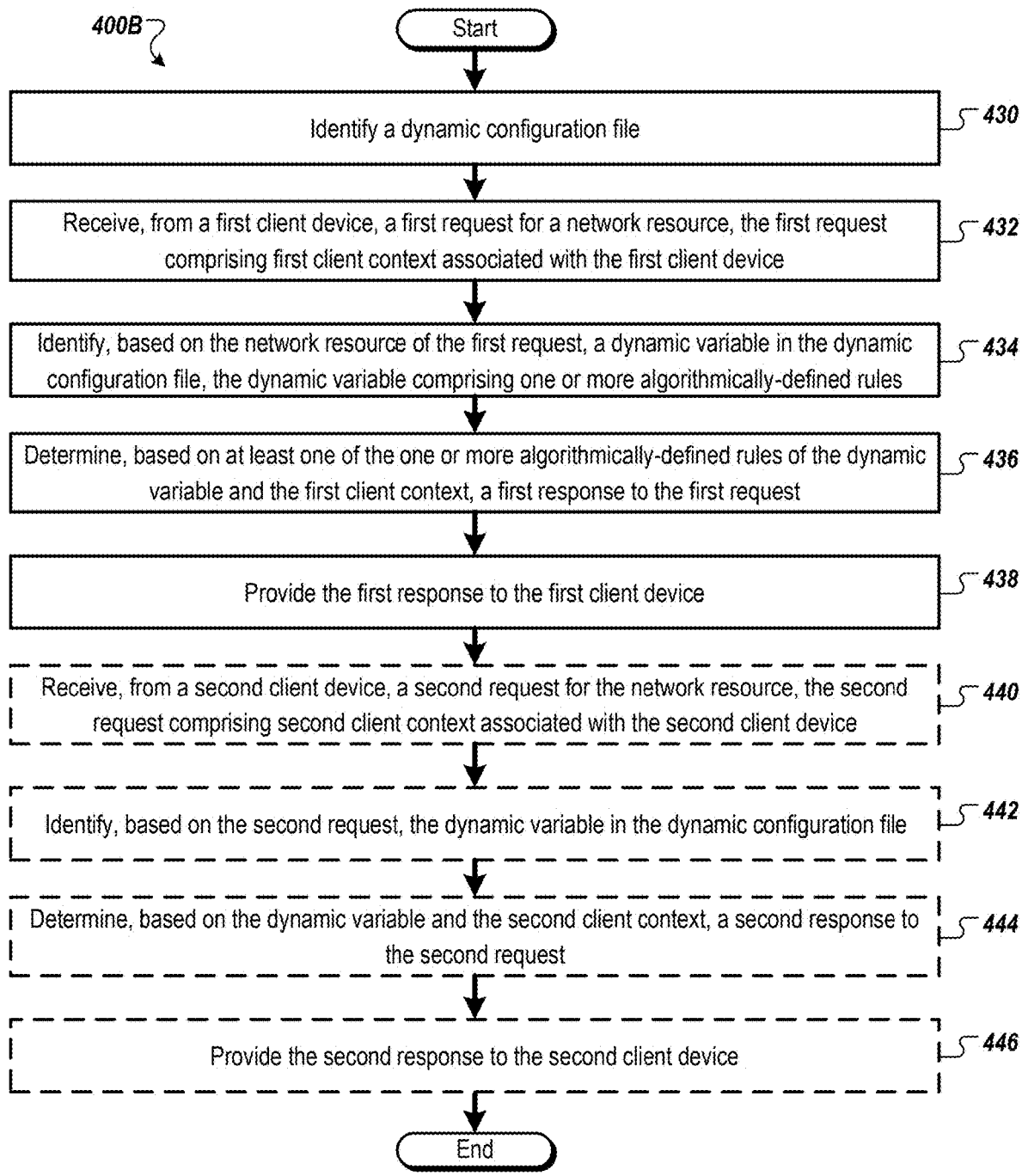
Figure 4C:
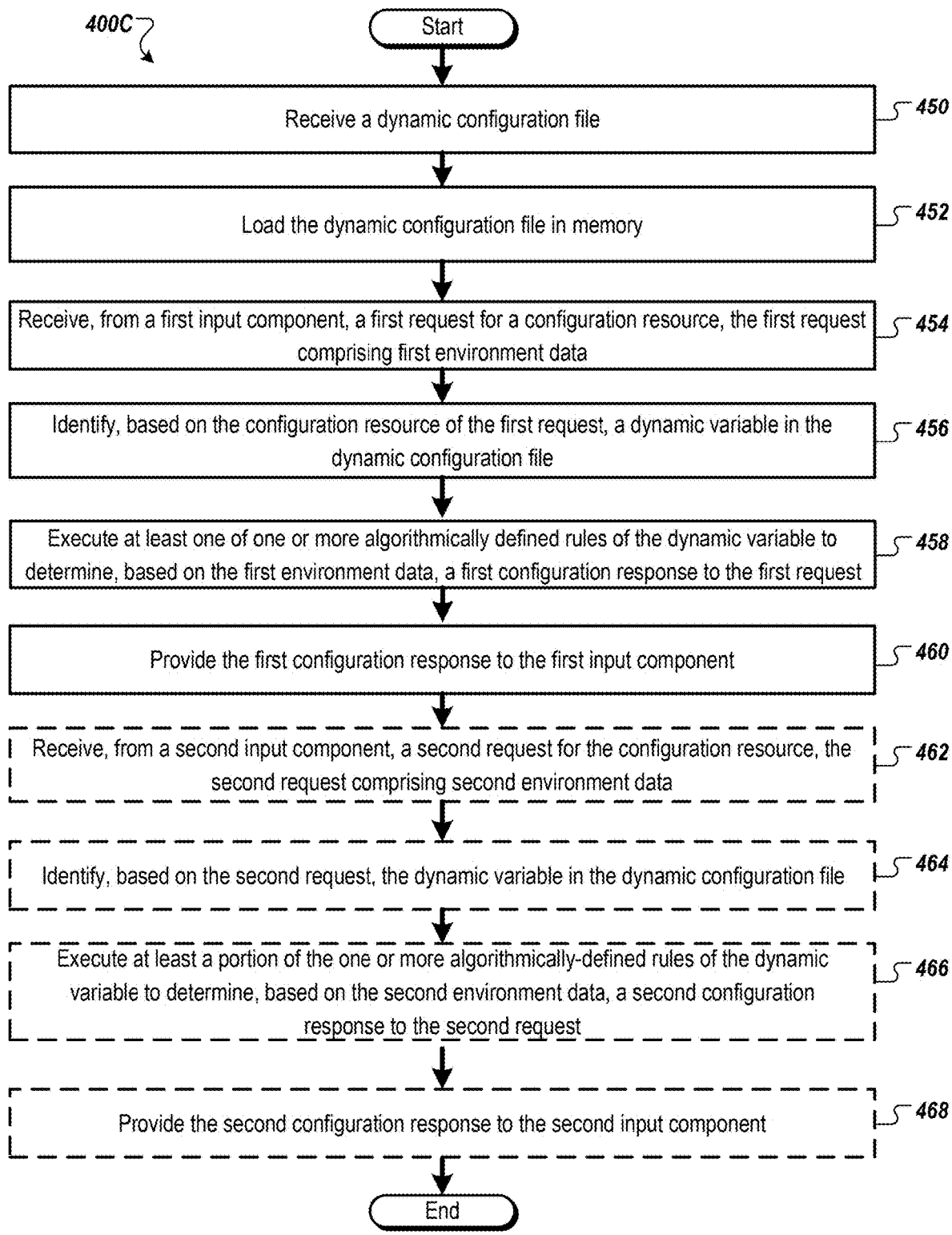

FIGS. 4A-C illustrate flow diagrams of methods 400A-C associated with unified programmable dynamic context-aware configurations, according to certain embodiments. In some embodiments, one or more operations of one or more of methods 400A-C are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, one or more operations of one or more of methods 400A-C are performed, at least in part, by a device (e.g., computing component (e.g., DNS server) 110, computing component (e.g., processing device) 110, system administrator (e.g., DA) device 150, client device (e.g., input component) 120, client device (e.g., input component) 120, processing device, etc.) of at least one or more of FIGS. 1A1-1F, 3A-G, or 5A-C of the present disclosure. In some embodiments, a non-transitory machine-readable storage medium stores instructions that when executed by a processing device, cause the processing device to perform one or more operations of one or more of methods 400A-C.

For simplicity of explanation, one or more of methods 400A-C is depicted and described as a series of operations. However, operations in accordance with this disclosure can occur in various orders and/or concurrently with other operations not presented and described herein. Furthermore, in some embodiments, not all illustrated operations are performed to implement one or more of methods 400A-C in accordance with the disclosed subject matter. In addition, those skilled in the art will understand and appreciate that one or more of methods 400A-C could alternatively be represented as a series of interrelated states via a state diagram or events.

Referring to FIG. 4A, at block 401, processing logic (e.g., of computing component (e.g., DNS server) 110) receives (e.g., from system administrator (e.g., DA) device 150) changes to dynamic configuration file 142. Processing logic may receive the changes to the dynamic configuration file 142 at a storage solution 402 (e.g., of Computing component (e.g., DNS server) 110) monitored by the file watcher 404 (e.g., of Computing component (e.g., DNS server) 110).

At block 403, processing logic determines whether changes are detected. Responsive to determining no changes, flow returns to file watcher 404 motoring storage solution 402 for changes to dynamic configuration file 142 received at block 401. Responsive to determining there are changes in the dynamic configuration file 142, flow continues to 405 where processing logic (e.g., via file watcher 404) causes creation of a new revision.

At block 407, processing logic (e.g., via file watcher 404 performs a sanity check.

At block 409, processing logic determines whether the new revision passes the sanity check. Responsive to not passing the sanity check (e.g., the sanity check failing), flow proceeds to block 411 where an error is generated and provided to system administrator (e.g., DA) device 150 (e.g., system administrator (e.g., DA) device 150 is notified and the revision remains inactive).

Responsive to passing the sanity checks, flow proceeds to block 413 where processing logic executes the test suites, if any are provided in this revision.

At block 415, processing logic determines whether the revision passes the test suites. Responsive to not passing any of the test suites (e.g., if any of the test cases fail), flow proceeds to block 411 and an error is generated and the system administrator (e.g., DA) device 150 is notified.

Responsive to passing all of the test suites (e.g., if all of the test cases pass), flow proceeds to block 417 where processing logic begins executing the health checks if any were provided in this revision.

At block 419, processing logic determines whether the revision passes the heath checks. Responsive to not passing any of the health checks (e.g., if at least one health check fails with no healthy servers), flow continues to block 411 and an error is generated and system administrator (e.g., DA) device 150 is notified and block 417 of executing the health checks continue in a loop until the host devices 160 become available. As soon as at least one host device 160 for each health check is healthy (e.g., at block 417, processing logic executes health checks and at block 419, processing logic determines a host device 160 passes all of the health checks).

Responsive to passing the health checks (e.g., if at least one host device 160 for each health check passes the health check), at block 421 processing logic deploys the new revision to production.

In some embodiments, the system administrator (e.g., DA) device 150 can define rollout strategies for new revisions. A system administrator (e.g., DA) device 150 could, for example, instruct the computing component (e.g., DNS server) 110 to serve one revision to clients in Europe, while another revision would be used for the rest of the world. It is also possible to define that a certain revision will be randomly served to a pre-determined proportion of the traffic, while another revision is served to the remainder of the traffic. It would also be possible to allow multiple revisions to be served at the same time, with different proportions or rules, according to the instructions provided by the system administrator (e.g., DA) device 150.

FIG. 4B illustrates a flow diagram of a method 400B associated with a unified programmable dynamic context-aware configuration, according to certain embodiments. Method 400B may be performed by processing logic of computing component (e.g., DNS server) 110.

At block 430 of method 400B, processing logic (e.g., of a computing component (e.g., DNS server) 110) identifies a dynamic configuration file 142.

At block 432, processing logic receives, from a first client device (e.g., input component) 120A, a first request 124A for a network resource 162. The first request 124A includes first client context 126A associated with the first user device 120A. In some embodiments, the network resource 162 is a domain record, media file, or other content item.

At block 434, processing logic identifies, based on the network resource 162 of the first request 124A, a dynamic variable 144 in the dynamic configuration file 142. The dynamic variable 144 includes one or more algorithmically-defined rules.

At block 436, processing logic determines, based on at least one of the one or more algorithmically-defined rules of the dynamic variable 144 and the first client context 126A, a first response 114A to the first request 124A. In some embodiments, the algorithmically-defined rule could determine the response stochastically (e.g., Random selection, etc.) or deterministically (e.g., Round-robin, Proximity-based selection, etc.), based on the client context 126A.

At block 438, processing logic provides the first response 114A to the first client device (e.g., input component) 120A. In some embodiments, the first client device (e.g., input component) 120A is to access a first instance of the network resource 162 based on the first response 114A.

In some embodiments, the first request 124A is associated with resolving a domain name to access the network resource 162 via a network. The first response 114A may be associated with a first domain name resolution to obtain the network resource 162 from a first location (e.g., host device 160A). The first client device (e.g., input component) 120A may obtain the network resource 162 via the network from the first location based on the first domain name resolution.

In some embodiments, processing logic may update a cache in memory of the computing component (e.g., DNS server) 110 with the first domain name resolution associated with the domain name to be used for a subsequent request 124 to access the network resource 162. The subsequent request 124 may include subsequent client context 126 similar to the first client context 126A.

In some embodiments, at block 440, processing logic receives, from a second client device (e.g., input component) 120B, a second request 124B for a network resource 162. The second request 124B includes second client context 126B associated with the second client device (e.g., input component) 120B.

In some embodiments, at block 442, processing logic identifies, based on the network resource 162 of the second request 124B, the dynamic variable 144 in the dynamic configuration file 142.

In some embodiments, at block 444, processing logic determines, based on at least one of the one or more algorithmically-defined rules of the dynamic variable 144 and the second client context 126B, a second response 114B to the second request 124B.

In some embodiments, at block 446, processing logic provides the second response 114B to the second client device (e.g., input component) 120B.

In some embodiments, the first client device (e.g., input component) 120A is to access a first instance of the network resource 162 based on the first response 114A and the second client device (e.g., input component) 120B is to access a second instance of the network resource 162 based on the second response 114B. The first instance may be located at a first location (e.g., first host device 160A) and the second instance may be located at a second location (e.g., second host device 160B) that is different from the first location.

In some embodiments, prior to the determining of the first response 114A, the processing logic adapts, via a pre-processing filter, at least one of the first request 124A or the first client context 126A. In some embodiments, subsequent to the determining of the first response 114A, the processing logic modifies, via a post-processing filter, the first response 114A.

In some embodiments, the determining of the first response 114A is based on proximity of available servers (e.g., host devices 160) to a location of the first client device (e.g., input component) 120A.

In some embodiments, the dynamic variable 144 further includes a one or more load-balancing rules. The determining of the first response 114A may be further based on at least one of the one or more load-balancing rules.

In some embodiments, the determining of the first response 114A is further based on a status of static status, fully dynamic status, or semi-dynamic status. The static status may be associated with a first domain name resolution that is saved to cache subsequent to successful domain name resolution. The fully dynamic status may be associated with the first domain name resolution that is saved to the cache based on the first client context 126A of the first request 124A. The semi-dynamic status may be associated with one or more cache saving rules that are determined by a Domain Administrator (e.g., system administrator (e.g., DA) device 150).

In some embodiments, the dynamic variable 144 is a dynamic domain zone record configuration associated with a plurality of network resource hosts. In some embodiments, the processing logic further determines one or more first hosts (e.g., host devices 160) of the network resource hosts that pass health checks and indicates the first hosts as being eligible to be considered for the first response 114A.

In some embodiments, the processing logic, further stores the first response 114A in a cache memory to be used for a subsequent request 124 for the network resource 162. The subsequent request 124 may include subsequent client context 126 similar to the first client context 126A.

In some embodiments, the processing logic further monitors monitoring changes to the dynamic configuration file 142 and deploys the changes responsive to determining that the changes are eligible for deployment.

Although some embodiments of the present disclosure are directed to unified programmable dynamic context-aware configurations for DNS, in some embodiments, the present disclosure can be used for unified programmable dynamic context-aware configurations for other services, systems, and/or networks.

FIG. 4C illustrates a flow diagram of a method 400C associated with a unified programmable dynamic context-aware configuration, according to certain embodiments. Method 400C may be performed by processing logic of computing component (e.g., processing device) 110.

At block 450 of method 400C, processing logic (e.g., of a computing component (e.g., processing device) 110) receives a dynamic configuration file 142.

At block 452, processing logic loads the dynamic configuration file 142 in memory.

At block 454, processing logic receives, from a first client device (e.g., input component) 120A, a first configuration request 125A for a configuration resource 163. The first configuration request 125A includes first environment data 127A associated with the first client device (e.g., input component) 120A. In some embodiments, the configuration resource 163 is an application setting or other content item.

In some embodiments, the first input component is a hardware device that communicates with the processing device (e.g., processing logic of a computing component 110) over a network. In some embodiments, the processing device executes the first input component (e.g., the processing device and the first input component are part of the same system and/or device).

At block 456, processing logic identifies, based on the configuration resource 163 of the first configuration request 125A, a dynamic variable 144 in the dynamic configuration file 142. The dynamic variable 144 includes one or more algorithmically-defined rules.

At block 458, processing logic determines, based on at least one of the one or more algorithmically-defined rules of the dynamic variable 144 and the first environment data 127A, a first configuration response 115A to the first configuration request 125A. In some embodiments, the algorithmically-defined rule could determine the response stochastically or deterministically, based on the environment data 127A.

At block 460, processing logic provides the first configuration response 115A to the first client device (e.g., input component) 120A. In some embodiments, the first client device (e.g., input component) 120A is to access a first instance of the configuration resource 163 based on the first configuration response 115A.

In some embodiments, the first configuration request 125A is associated with using a configuration value to access the configuration resource 163. The first configuration response 115A may be associated with a first configuration value calculation to obtain the configuration resource 163 from a first configuration value. The first client device (e.g., input component) 120A may obtain the configuration resource 163 from the first configuration value based on the first configuration value calculation.

In some embodiments, processing logic may update a cache in memory of the computing component (e.g., processing device) 110 with the first configuration value calculation associated with the configuration value to be used for a subsequent configuration request 125 to access the configuration resource 163. The subsequent configuration request 125 may include subsequent environment data 127 similar to the first environment data 127A.

In some embodiments, at block 462, processing logic receives, from a second client device (e.g., input component) 120B, a second configuration request 125B for a configuration resource 163. The second configuration request 125B includes second environment data 127B associated with the second client device (e.g., input component) 120B. In some embodiments, the second client device (e.g., input component) 120B may be the same input component as the first client device (e.g., input component) 120A.

In some embodiments, at block 464, processing logic identifies, based on the configuration resource 163 of the second configuration request 125B, the dynamic variable 144 in the dynamic configuration file 142.

In some embodiments, at block 466, processing logic executes at least a portion of the one or more algorithmically-defined rules of the dynamic variable to determine, based on the second environment data 127B, a second configuration response 115B to the second configuration request 125B.

In some embodiments, at block 468, processing logic provides the second configuration response 115B to the second client device (e.g., input component) 120B.

In some embodiments, the first client device (e.g., input component) 120A is to access a first instance of the configuration resource 163 based on the first configuration response 115A and the second client device (e.g., input component) 120B is to access a second instance of the configuration resource 163 based on the second configuration response 115B. The first instance may be associated with a first configuration value and the second instance may be associated with a second configuration value that is different from the first configuration value.

In some embodiments, prior to the determining of the first configuration response 115A, the processing logic adapts, via a pre-processing filter, at least one of the first configuration request 125A or the first environment data 127A. In some embodiments, subsequent to the determining of the first configuration response 115A, the processing logic modifies, via a post-processing filter, the first configuration response 115A.

In some embodiments, the determining of the first configuration response 115A is based on the configuration value of the first input component.

In some embodiments, the dynamic variable 144 further includes a one or more configuration rules. The determining of the first configuration response 115A may be further based on at least one of the one or more configuration rules.

In some embodiments, the determining of the first configuration response 115A is further based on a status of static status, fully dynamic status, or semi-dynamic status. The static status may be associated with a first configuration value calculation that is saved to cache subsequent to successfully determining the first configuration response. The fully dynamic status may be associated with the first configuration value calculation that is saved to the cache based on the first environment data 127A of the first configuration request 125A. The semi-dynamic status may be associated with one or more cache saving rules that are determined by an application user.

In some embodiments, the dynamic variable 144 is a dynamic application setting configuration associated with a software application. In some embodiments, the processing logic further determines one or more application setting configurations as being eligible to be considered for the first configuration response 115A.

In some embodiments, the processing logic, further stores the first configuration response 115A in a cache memory to be used for a subsequent configuration request 125 for the configuration resource 163. The subsequent configuration request 125 may include subsequent environment data 127 similar to the first environment data 127A.

In some embodiments, the processing logic further monitors changes to the dynamic configuration file 142 and deploys the changes responsive to determining that the changes are eligible for deployment.

Although some embodiments of the present disclosure are directed to unified programmable dynamic context-aware configurations for processing devices configured to execute software applications, in some embodiments, the present disclosure can be used for unified programmable dynamic context-aware configurations for other services, systems, and/or networks.

Figure 5A:
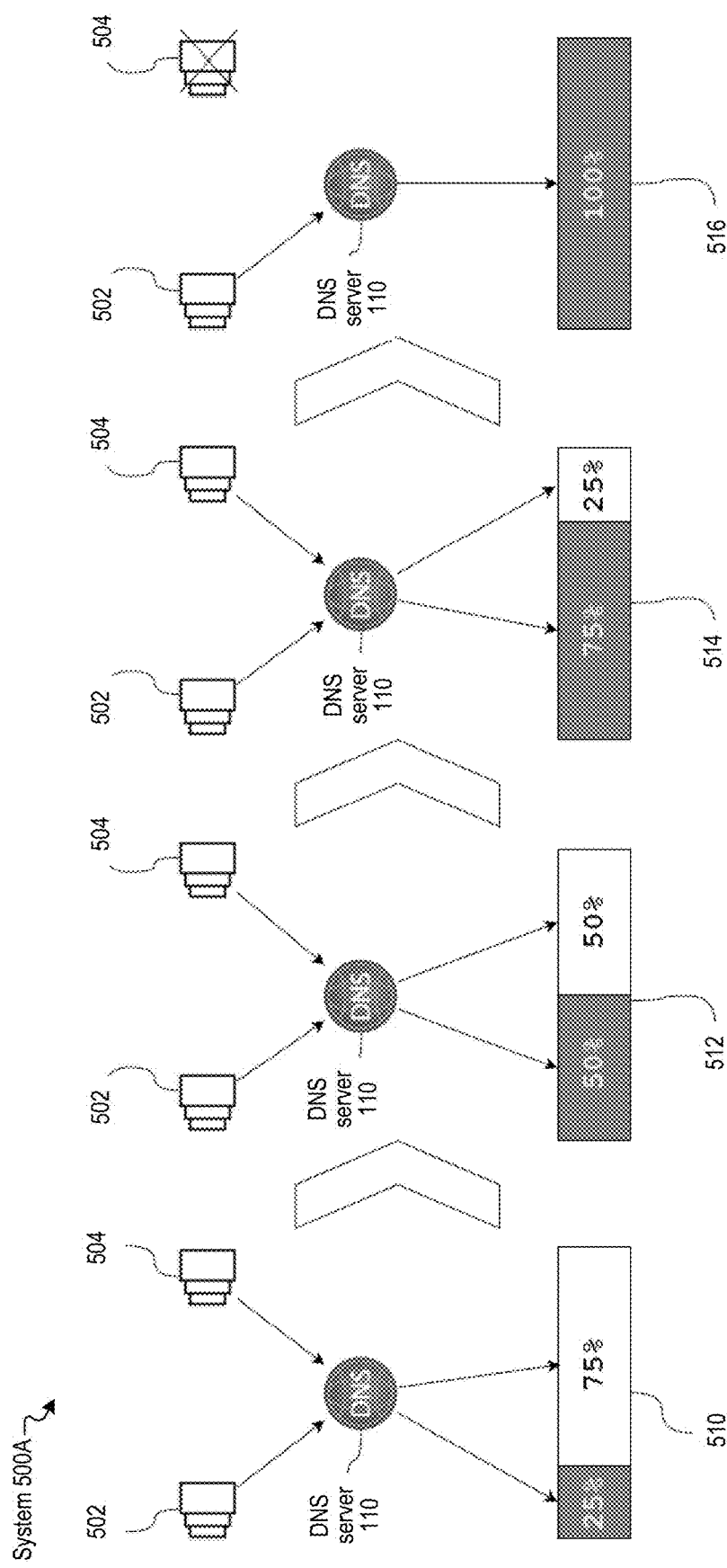
FIGS. 5A-C illustrate systems associated with unified programmable dynamic context-aware configurations, according to certain embodiments.
Figure 5B:
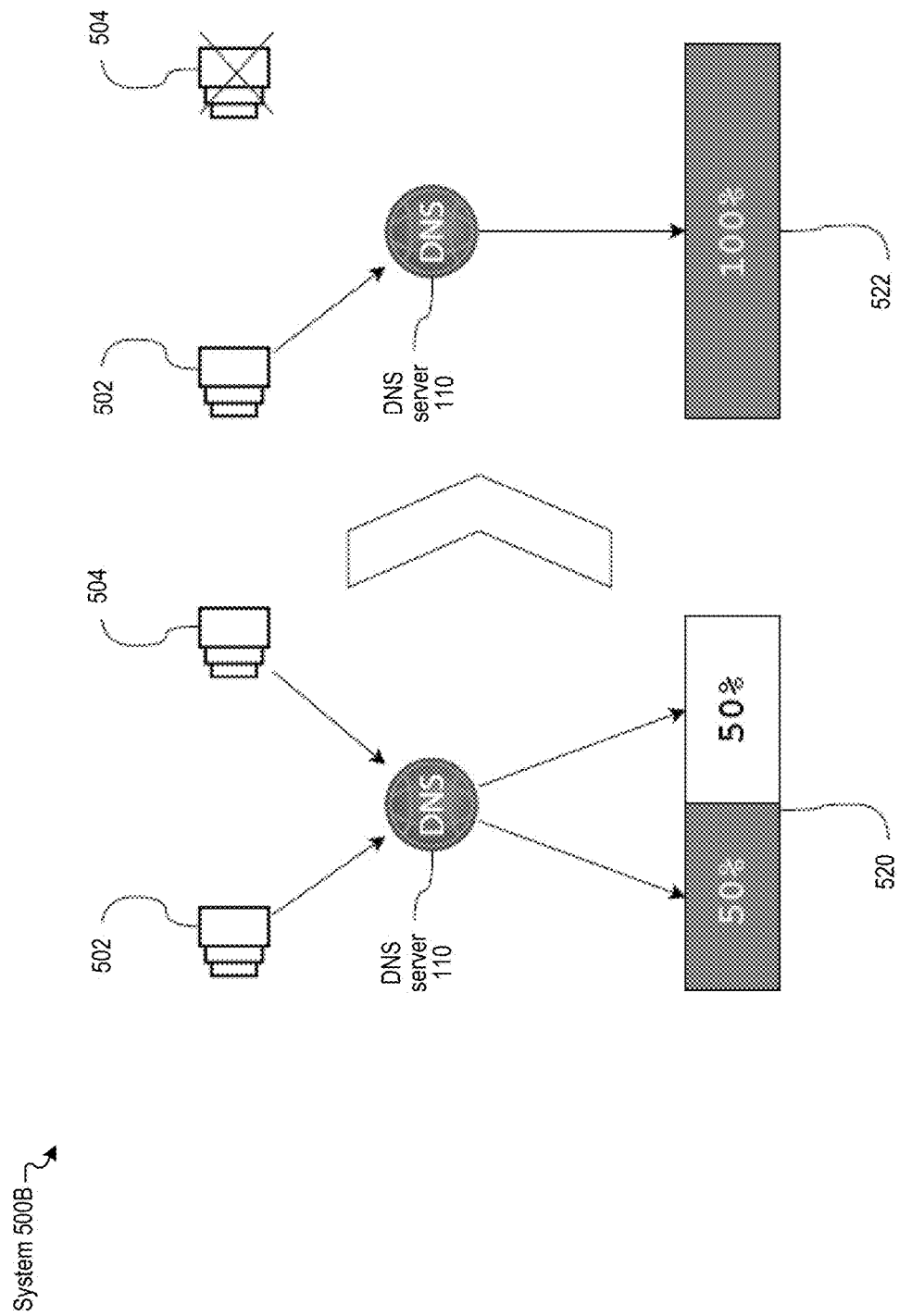
Figure 5C:
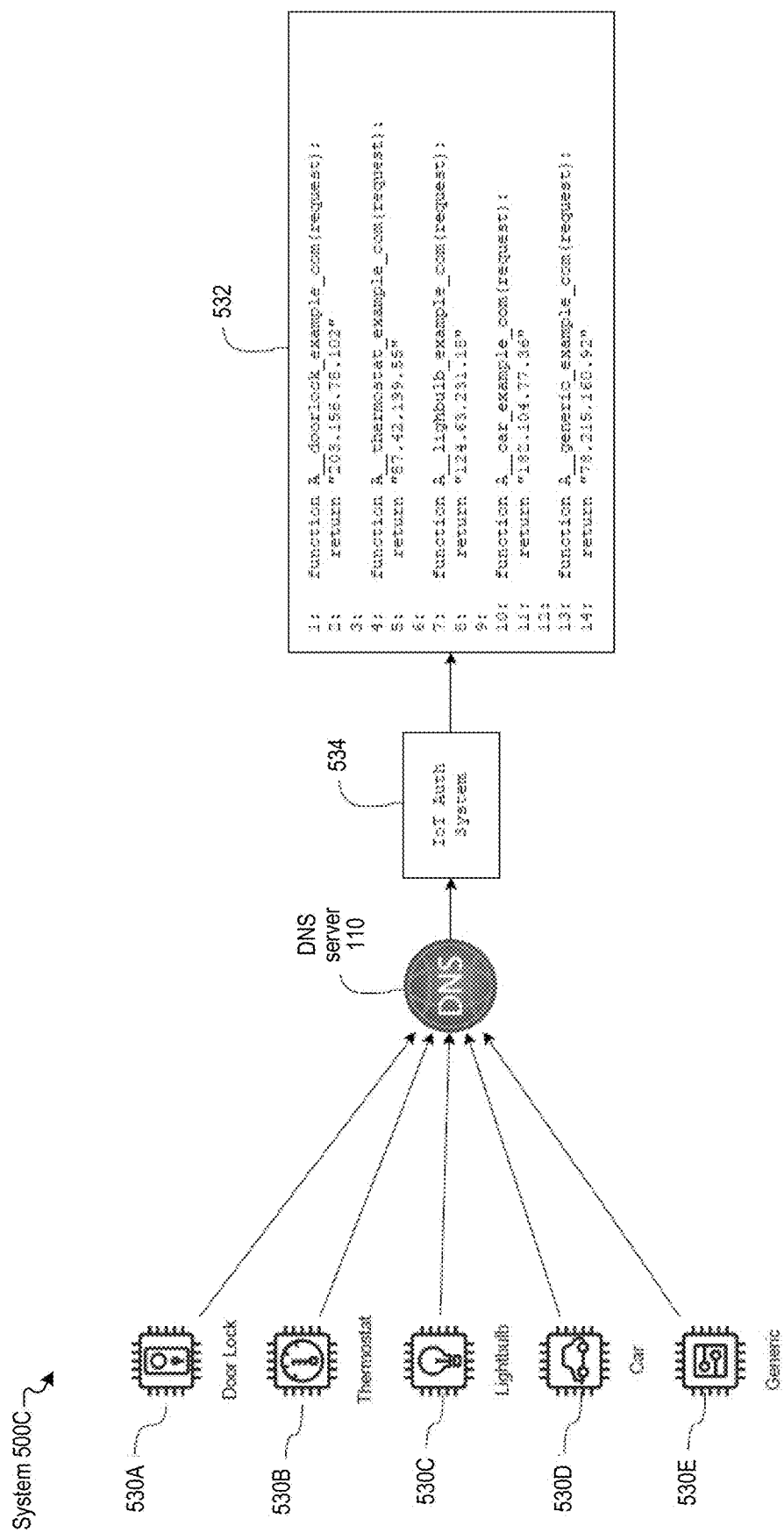

FIGS. 5A-C illustrate systems associated with unified programmable dynamic context-aware configurations, according to certain embodiments.

FIG. 5A illustrates a computing component (e.g., processing device) 110 executing an operation-by-operation canary deployment strategy of a new configuration revision 502 (e.g., of dynamic configuration file 142). In a first operation 510, the current configuration revision 504 (e.g., of dynamic configuration file 142) is served concurrently with the new configuration revision 502, with 25% of the traffic being randomly picked to get responses 114 as configured by the new configuration revision 502 and the remaining 75% of the traffic receiving the current revision 504. After executing this strategy for a period determined by the system administrator (e.g., DA) device 150 without generating any errors, the roll-out strategy progresses to the second operation 512. In the second operation 512, the traffic is evenly split between the current configuration revision 502 and the new configuration revision 502. After executing this strategy for a period determined by the System administrator (e.g., DA) device 150 without generating any errors, the roll-out strategy progresses to the third operation 414. In the third operation 414, the traffic is split randomly such that 75% of users are exposed to the new configuration revision 502 and the remaining 25% of the users are exposed to the current configuration revision 504. After executing this strategy for a period determined by the system administrator (e.g., DA) device 150 without generating any errors, the roll-out strategy progresses to the fourth and final operation 516. In the final operation, all traffic is served by the new configuration revision 502 and the current revision 504 is retired. The canary deployment strategy may be used in the context of a unified programmable dynamic context-aware configuration-enabled computing component (e.g., DNS server) 110.

FIG. 5B illustrates a computing component (e.g., DNS server) 110 executing a Blue/Green deployment strategy of a new configuration revision 502. In the initial state, the new configuration revision 502 (called the green revision) is deployed alongside the current configuration revision 504 (called the blue revision). Approximately half of the traffic is split between the two versions, and after executing this strategy 520 for a period determined by the system administrator (e.g., DA) device 150 without the new configuration revision 502 generating any errors, all traffic is directed to the new configuration revision 502 and the current configuration revision 504 is retired. The blue/green deployment strategy may be used in the context of a unified programmable dynamic context-aware configuration-enabled computing component (e.g., DNS server) 110.

In some embodiments, the system administrator (e.g., DA) device 150 could use the dynamic nature to implement Deny, Allow, and Throttle lists and rules for clients. These lists could be generated automatically based on rules defined by the system administrator (e.g., DA) device 150 or provided in a separate file that would be consumed by the dynamic configuration file 142 during runtime to check a client against the list. This solution is useful for DA devices 150 looking to better control access to the name resolution service or mitigate attacks and abusive behavior.

These lists could be stored in any of the dynamic configuration files 142 or in separate files accessible to the computing component (e.g., DNS server) 110. The logic that checks these lists can be implemented inside domain zone record configuration functions, pre-processing filters, or even as a separate global function according to the needs of an administrator of the system administrator (e.g., DA) device 150 or of the computing component (e.g., DNS server) 110.

In some embodiments, the system administrator (e.g., DA) device 150 could use secure authentication mechanisms to allow IoT devices to submit individual domain zone record configurations to be easily accessible over the internet. The authenticated and securely submitted domain zone record configuration would need to pass test suites created by the system administrator (e.g., DA) device 150 and would only be allowed to manipulate the record associated with the IoT device. This is a useful solution for devices connected to the internet under a dynamic IP address configuration. This functionality allows the client to submit changes directly to the computing component (e.g., DNS server) 110 (e.g., without using an intermediary API that then executes the configuration changes in the domain zone configuration). A benefit of this new approach is that new domain zone record configurations are made available in production more expediently, and IoT device developers do not need to create intermediary APIs to update DNS records, relying instead upon a single standard that all IoT devices can easily follow.

FIG. 5C illustrates how IoT devices 530A-E may be able to maintain records within a domain zone configuration 532. Upon an update event, in which the device name or IP address is changed, the device 530 retrieves the IP address of the authoritative nameserver (e.g., computing component (e.g., DNS server) 110) of the domain by querying for a nameserver (NS) record on the domain example.com. Upon retrieving the IP address of the authoritative nameserver (e.g., computing component (e.g., DNS server) 110), the IoT device proceeds to authenticate with the computing component (e.g., DNS server) 110 and/or IoT authentication system 534. Upon authentication, the computing component (e.g., DNS server) 110 and/or IoT authentication system 534 is now capable of recognizing which domain zone record that device is allowed to control and applies the changes requested by the IoT device in the domain zone record associated with it. For example, the name and/or IP address associated with the door lock device 530A may be changed (domain zone configuration 532, lines 1-2), but may not change anything else in the domain zone configuration 532. Similarly, the its name and/or IP address associated with thermostat device 530B may be changed (domain zone configuration 532, lines 4-5) but no other record in the domain zone configuration 532. This allows for a better integrated and standardized solution for all sorts of IoT devices, which today, rely on custom intermediary services to replicate the same effect.

Combined, or separate, the unified programmable dynamic context-aware configuration may allow system administrator (e.g., DA) devices 150 to unlock the potential of the DNS protocol, implement intelligent load balancing through computing component (e.g., DNS server) 110, reduce costs, save compute resources, and significantly reduce latency for clients. If the technology is widely adopted and is properly used, the technology has the capability of positively impacting by reducing unnecessary routing and limiting traffic to specific regions, providing a needed relief against the exponential growth of consumption demands of internet resources. The technology will also provide system administrator (e.g., DA) devices 150 with a tool that can be used to make novel uses of DNS servers 110 to promote business interests, mitigate attacks, reduce downtime, and several other benefits.

Figure 6:
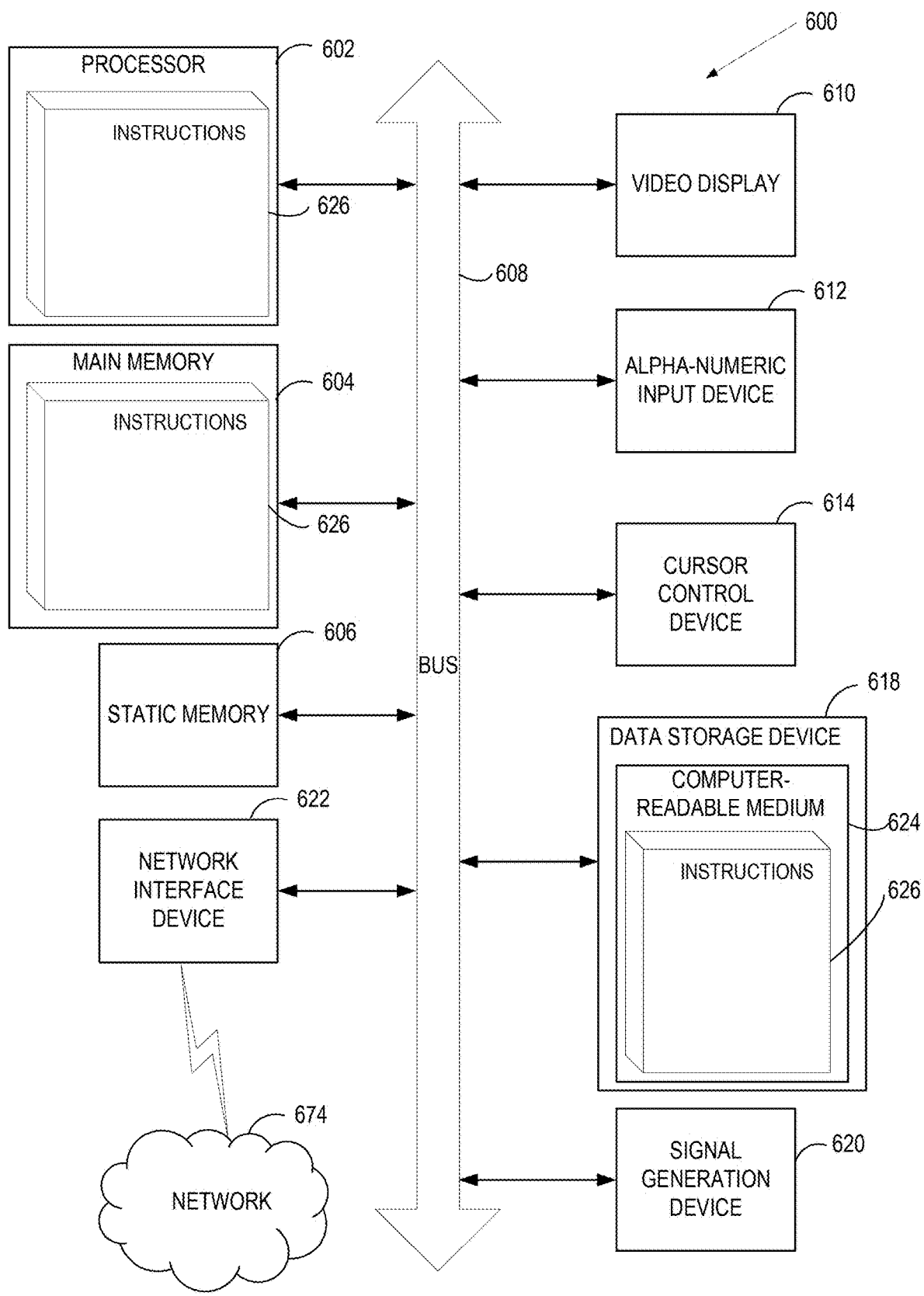
FIG. 6 is a block diagram illustrating a computer system, according to certain embodiments.

FIG. 6 is a block diagram illustrating a computer system 600, according to certain embodiments. In some embodiments, the processor 602 is device (e.g., client device, server, DNS server, processing device, etc.) of one or more of the FIGS. of the present disclosure. In some embodiments, the processor is associated with unified programmable dynamic context-aware configurations for domain name service (DNS).

In some embodiments, computer system 600 is connected (e.g., via a network, such as a Local Area Network (LAN), an intranet, an extranet, or the Internet) to other computer systems. In some embodiments, computer system 600 operates in the capacity of a server or a client computer in a client-server environment, or as a peer computer in a peer-to-peer or distributed network environment. In some embodiments, computer system 600 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein (e.g., one or more of methods 400A-C of FIGS. 4A-C).

In a further aspect, the computer system 600 includes a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 616, which communicate with each other via a bus 608.

In some embodiments, processing device 602 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 600 further includes a network interface device 622 (e.g., coupled to network 674). In some embodiments, computer system 600 also includes a video display unit 610 (e.g., a liquid-crystal display (LCD)), an alphanumeric input component 612 (e.g., a keyboard), a cursor control device 614 (e.g., a mouse), and a signal generation device 620.

In some implementations, data storage device 616 includes a non-transitory computer-readable storage medium 624 on which store instructions 626 encoding any one or more of the methods or functions described herein, including instructions for implementing methods described herein.

In some embodiments, instructions 626 also reside, completely or partially, within volatile memory 604 and/or within processing device 602 during execution thereof by computer system 600, hence, in some embodiments, volatile memory 604 and processing device 602 also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICs, FPGAs, DSPs, or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "identifying," "receiving," "transmitting," "determining," "providing," "accessing," "resolving," "obtaining," "adapting," "modifying," "storing," "causing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein or includes a general-purpose computer system selectively programmed by a computer program stored in the computer system. Such a computer program is stored in a computer-readable tangible storage medium.

Some of the methods and illustrative examples described herein are not inherently related to any particular computer or other apparatus. In some embodiments, various general-purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, a dynamic configuration file;
   loading, by the processing device, the dynamic configuration file in memory;
   receiving, by the processing device from a first input component, a first request for a configuration resource, the first request comprising first environment data associated with the first input component;
   identifying, by the processing device based on the configuration resource of the first request, a dynamic variable in the dynamic configuration file, the dynamic variable comprising one or more algorithmically-defined rules;
   executing, by the processing device, at least one of the one or more algorithmically-defined rules of the dynamic variable to determine, based on the first environment data, a first configuration response to the first request; and providing, by the processing device, the first configuration response to the first input component.

2. The method of claim 1, wherein the first input component is to access a first instance of the configuration resource based on the first configuration response.

3. The method of claim 1 further comprising:
receiving, by the processing device from a second input component, a second request for the configuration resource, the second request comprising second environment data associated with the second input component;
identifying, by the processing device based on the second request, the dynamic variable in the dynamic configuration file;
executing, by the processing device, at least a portion of the one or more algorithmically-defined rules of the dynamic variable to determine, based on the second environment data, a second configuration response to the second request; and
providing, by the processing device, the second configuration response to the second input component.

4. The method of claim 3, wherein:
the first input component is to access a first instance of the configuration resource based on the first configuration response; and
the second input component is to access a second instance of the configuration resource based on the second configuration response; and
the first instance being associated with a first configuration value and the second instance being associated with a second configuration value that is different from the first configuration value.

5. The method of claim 1, wherein:
the first request is associated with using a configuration value to access the configuration resource;
the first configuration response is associated with a first configuration value calculation for a first configuration value; and
the first input component is to obtain the configuration resource from the first configuration value based on the first configuration value calculation.

6. The method of claim 5 further comprising updating a cache of the first input component with the first configuration value calculation associated with the first configuration value to be used for a subsequent request to access the configuration resource, wherein the subsequent request comprises subsequent environment data similar to the first environment data.

7. The method of claim 1, wherein the first input component is a hardware device that communicates with the processing device over a network.

8. The method of claim 1, wherein the processing device executes the first input component.

9. The method of claim 1, further comprising:
prior to the executing of the at least one of the one or more algorithmically-defined rules of the dynamic variable to determine the first configuration response, adapting, via a pre-processing filter, at least one of the first request or the first environment data; and
subsequent to the executing of the at least one of the one or more algorithmically-defined rules of the dynamic variable to determine the first configuration response, modifying, via a post-processing filter, the first configuration response.

10. The method of claim 1, wherein the executing of the at least one of the one or more algorithmically-defined rules of the dynamic variable to determine the first configuration response is based on a configuration value of the first input component.

11. The method of claim 1, wherein:
the dynamic variable further comprises a one or more configuration rules; and
the executing of the at least one of the one or more algorithmically-defined rules of the dynamic variable to determine the first configuration response is further based on at least one of the one or more configuration rules.

12. The method of claim 1, wherein:
the executing of the at least one of the one or more algorithmically-defined rules of the dynamic variable to determine the first configuration response is further based on a status of static status, fully dynamic status, or semi-dynamic status;
the static status is associated with a first configuration value calculation that is saved to cache subsequent to successfully determining the first configuration response;
the fully dynamic status is associated with the first configuration value calculation that is saved to the cache based on the first environment data of the first request; and
the semi-dynamic status is associated with one or more cache saving rules that are determined by an application user.

13. The method of claim 1, wherein:
the dynamic variable is a dynamic application setting configuration associated with a computing component; and
the method further comprises determining one or more computing component configuration sections as being eligible to be considered for the first configuration response.

14. The method of claim 1 further comprising storing the first configuration response in a cache memory to be used for a subsequent request for the configuration resource, wherein the subsequent request comprises subsequent environment data similar to the first environment data.

15. The method of claim 1 further comprising;
monitoring changes to the dynamic configuration file; and
deploying the changes responsive to determining that the changes are eligible for deployment.

16. A non-transitory machine-readable storage medium storing instructions which, when executed, causes a processing device to perform operations comprising:
receiving a dynamic configuration file;
loading the dynamic configuration file in memory;
receiving, from a first input component, a first request for a configuration resource, the first request comprising first environment data associated with the first input component;
identifying, based on the configuration resource of the first request, a dynamic variable in the dynamic configuration file, the dynamic variable comprising one or more algorithmically-defined rules;
executing at least one of the one or more algorithmically-defined rules of the dynamic variable to determine, based on the first environment data, a first configuration response to the first request; and
providing the first configuration response to the first input component.

17. The non-transitory machine-readable storage medium of claim 16, wherein the operations further comprise:
receiving, from a second input component, a second request for the configuration resource, the second request comprising second environment data associated with the second input component;
identifying, based on the second request, the dynamic variable in the dynamic configuration file;
executing at least a portion of the one or more algorithmically-defined rules of the dynamic variable to determine, based on the second environment data, a second configuration response to the second request; and
providing the second configuration response to the second input component.

18. The non-transitory machine-readable storage medium of claim 17, wherein:
the first input component is to access a first instance of the configuration resource based on the first configuration response; and
the second input component is to access a second instance of the configuration resource based on the second configuration response; and
the first instance being associated with a first configuration value and the second instance being associated with a second configuration value that is different from the first configuration value.

19. A system comprising:
memory; and
a processing device coupled to the memory, the processing device to:
receive a dynamic configuration file;
load the dynamic configuration file in the memory;
receive, from a first input component, a first request for a configuration resource, the first request comprising first environment data associated with the first input component;
identify, based on the configuration resource of the first request, a dynamic variable in the dynamic configuration file, the dynamic variable comprising one or more algorithmically-defined rules;
execute at least one of the one or more algorithmically-defined rules of the dynamic variable to determine, based on the first environment data, a first configuration response to the first request; and
provide the first configuration response to the first input component.

20. The system of claim 19, wherein the processing device is further to:
receive, from a second input component, a second request for the configuration resource, the second request comprising second environment data associated with the second input component;
identify, based on the second request, the dynamic variable in the dynamic configuration file;
execute at least a portion of the one or more algorithmically-defined rules of the dynamic variable to determine, based on the second environment data, a second configuration response to the second request; and
provide the second configuration response to the second input component.

* * * * *